(12) United States Patent
Armstrong

(10) Patent No.: US 6,310,606 B1
(45) Date of Patent: *Oct. 30, 2001

(54) MULTI-PLANE SHEET CONNECTED SENSORS

(76) Inventor: Brad A. Armstrong, P.O. Box 2048, Carson City, NV (US) 89702

( * ) Notice: Subject to any disclaimer, the term of this patent is extended or adjusted under 35 U.S.C. 154(b) by 0 days.

This patent is subject to a terminal disclaimer.

(21) Appl. No.: 09/721,090

(22) Filed: Nov. 21, 2000

Related U.S. Application Data

(63) Continuation of application No. 08/677,378, filed on Jul. 5, 1996, now Pat. No. 6,222,525, and a continuation-in-part of application No. 07/847,619, filed on Mar. 5, 1992, now Pat. No. 5,589,828.

(51) Int. Cl.⁷ ................................................. G06F 3/033
(52) U.S. Cl. ......................... 345/161; 345/156; 345/157
(58) Field of Search ................................... 345/156, 157, 345/161, 167, 168, 173, 184; 341/27; 463/30, 37, 38; 434/454; 244/223; 318/568.11, 568.25

(56) References Cited

U.S. PATENT DOCUMENTS

| | | |
|---|---|---|
| D. 342,740 | 12/1993 | Parker . |
| 3,611,068 | 10/1971 | Fujita . |
| 3,771,037 | 11/1973 | Bailey . |
| 3,806,471 | 4/1974 | Mitchell . |
| 3,952,173 | 4/1976 | Tsuji . |
| 3,988,556 | 10/1976 | Hyodo . |
| 4,224,602 | 9/1980 | Anderson . |
| 4,313,113 | 1/1982 | Thornburg . |
| 4,315,238 | 2/1982 | Eventoff . |
| 4,552,360 | 11/1985 | Bromley . |
| 4,673,919 | 6/1987 | Kataoka . |

(List continued on next page.)

FOREIGN PATENT DOCUMENTS

| | | |
|---|---|---|
| 3031484 | 11/1982 | (DE) . |
| 3543890 | 6/1987 | (DE) . |
| 4013227 | 5/1991 | (DE) . |
| 0337458 | 10/1989 | (EP) . |
| 0470615 | 7/1992 | (EP) . |
| 0579448 | 1/1994 | (EP) . |
| 1080753 | 3/2001 | (EP) . |
| 2058462 | 4/1981 | (GB) . |
| 2113920 | 1/1983 | (GB) . |
| 5-87760 | 11/1993 | (JP) . |
| 6154422 | 6/1994 | (JP) . |
| 7281824 | 10/1995 | (JP) . |
| 7302159 | 11/1995 | (JP) . |
| 9218737 | 8/1997 | (JP) . |
| wo9532776 | 12/1995 | (WO) . |
| wo9957630 | 11/1999 | (WO) . |

OTHER PUBLICATIONS

IBM Technical Disclosure Bulletin pp230–235 Feb. 1990 Mouse Ball–Actuating Device With Force And Tactile Feedback.

Research Disclosure Nov. 1987 28373 Joystick with Tactile Feedback.

S.F. Kambic, IBM Technical Disclosure Bulletin, vol. 20 No. 5 Oct. 1977.

*Primary Examiner*—Jeffery Brier

(57) ABSTRACT

A sheet material connecting sensors in multiple-axes image controllers having at least two-axes input members and also including finger depressible buttons. In some embodiments at least some of the sensors are pressure-sensitive variable sensors for variable output representative of the level of applied pressure. In some embodiments the variable sensors include resilient dome caps structured to provide passive tactile feedback to a human hand. Other preferred embodiments additionally include an active tactile feedback for providing vibration to be felt by a hand operating the controller.

24 Claims, 40 Drawing Sheets

U.S. PATENT DOCUMENTS

| | | |
|---|---|---|
| 4,733,214 | 3/1988 | Andersen . |
| 4,786,895 | 11/1988 | Castaneda . |
| 4,866,542 | 9/1989 | Shimada . |
| 5,103,404 | 4/1992 | McIntosh . |
| 5,164,697 | 11/1992 | Kramer . |
| 5,189,355 | 2/1993 | Larkins . |
| 5,200,597 | 4/1993 | Eastman . |
| 5,203,563 | 4/1993 | Loper . |
| 5,207,426 | 5/1993 | Inoue . |
| 5,287,089 | 2/1994 | Parsons . |
| 5,311,779 | 5/1994 | Teruo . |
| 5,315,204 | 5/1994 | Park . |
| 5,364,108 | 11/1994 | Esnouf . |
| 5,365,494 | 11/1994 | Lynch . |
| 5,376,913 | 12/1994 | Pine . |
| 5,396,235 | 3/1995 | Maeshima . |
| 5,440,237 | 8/1995 | Brown . |
| 5,457,478 | 10/1995 | Frank . |
| 5,565,891 | 10/1996 | Armstrong . |
| 5,589,828 | 12/1996 | Armstrong . |
| 5,640,566 | 6/1997 | Victor . |
| 5,670,955 | 9/1997 | Thorne . |
| 5,673,237 | 9/1997 | Blank . |
| 5,675,329 | 10/1997 | Barker . |
| 5,689,285 | 11/1997 | Asher . |
| 5,764,219 | 6/1998 | Rutledge . |
| 5,778,404 | 7/1998 | Capps . |
| 5,790,102 | 8/1998 | Nassima . |
| 5,847,305 | 12/1998 | Yoshikawa . |
| 5,854,624 | 12/1998 | Grant . |
| 5,883,619 | 3/1999 | Ho . |
| 5,889,236 | 3/1999 | Gillespie . |
| 5,895,471 | 4/1999 | King . |
| 5,910,798 | 6/1999 | Kim . |
| 5,943,044 | 8/1999 | Martinelli . |
| 5,948,066 | 9/1999 | Whalen . |
| 5,974,238 | 10/1999 | Chase . |
| 5,995,026 | 11/1999 | Sellers . |
| 5,999,084 | 12/1999 | Armstrong . |
| 6,020,884 | 2/2000 | MacNaughton . |
| 6,049,812 | 4/2000 | Bertram . |
| 6,102,802 | 8/2000 | Armstrong . |
| 6,118,979 | 9/2000 | Powell . |
| 6,135,886 | 10/2000 | Armstrong . |
| 6,157,935 | 12/2000 | Tran . |
| 6,185,158 | 2/2001 | Ito . |
| 6,198,473 | 3/2001 | Armstrong . |
| 6,208,271 | 3/2001 | Armstrong . |
| 6,222,525 | 4/2001 | Armstrong . |

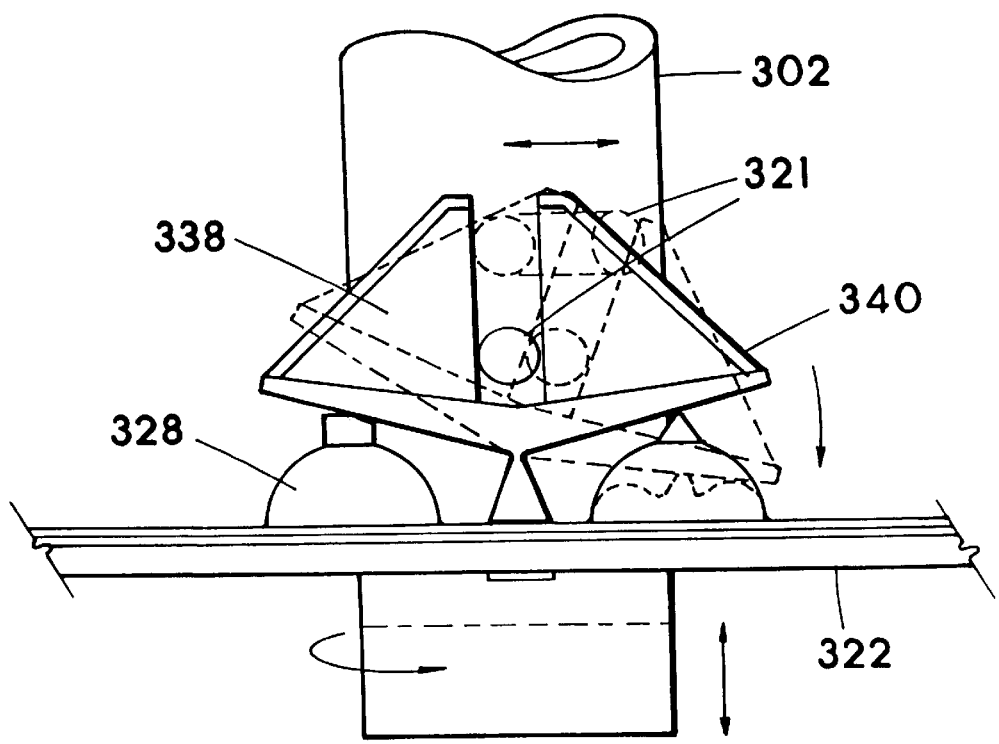
FIG. 25
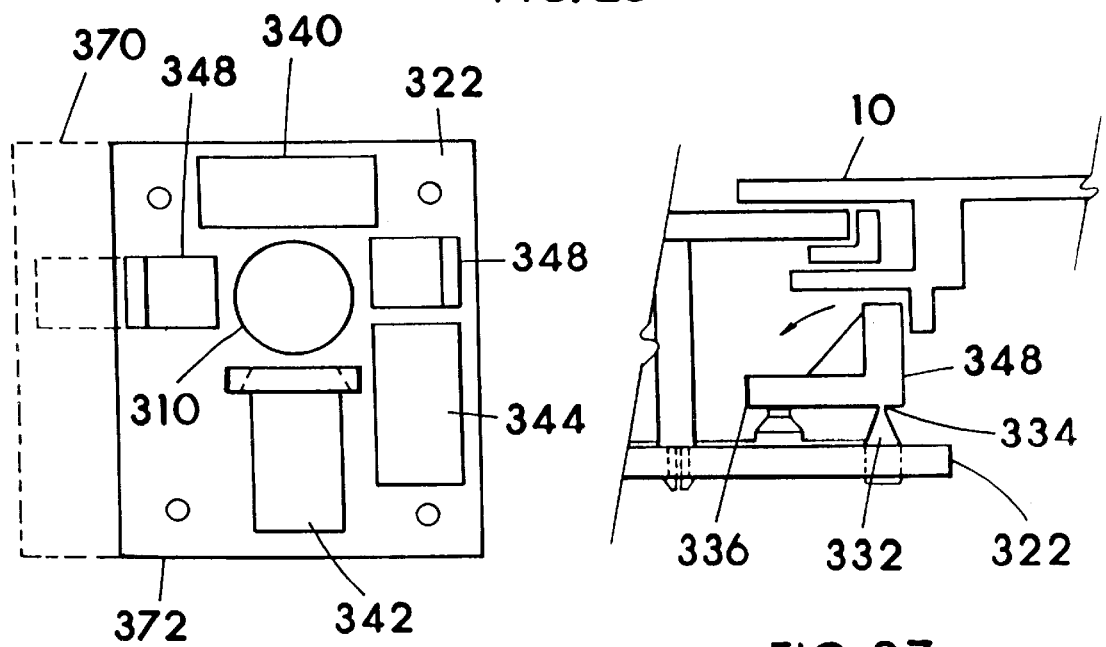
FIG. 26
FIG. 27

MULTI-PLANE SHEET CONNECTED SENSORS

CROSS REFERENCE TO RELATED APPLICATION(S)

This application is a Rule 1.53(b) continuation application of U.S. application Ser. No. 08/677,378 filed Jul. 5, 1996, now U.S. Pat. No. 6,222,525; and U.S. application Ser. No. 08/677,378 is a continuation in part of U.S. application Ser. No. 07/847,619 filed Mar. 5, 1992, now U.S. Pat. No. 5,589,828 to which the benefit(s) under 35 U.S.C. 120 are claimed.

BACKGROUND OF THE INVENTION

1. Field of the Invention

This invention relates to structuring for sheet supported sensors and associated circuitry in hand-operated graphic image controllers, and particularly six degree of freedom (3D) computer image controllers which serve as interface input devices between the human hand(s) and graphic image displays such as a computer or television display, a head mount display or any display capable of being viewed or perceived as being viewed by a human.

2. Description of the Prior Art

Although there are many related physical-to-electrical hand-controlled interfacing devices interfacing with computers, game consoles and the like image generation machines connected to image displays and the like shown and described in prior art, no disclosures or documents teach or suggest singularly or in reasonable combination the present claimed invention.

SUMMARY OF THE INVENTION

The following summary and detailed description is of best modes and preferred structures for carrying out the invention, and although there are clearly changes which could be made to that which is specifically herein described and shown in the included drawings, for the sake of brevity of this disclosure, all of these changes which fall within the true scope of the present invention have not herein been detailed.

In order that 6 DOF (3D) controllers be more affordable, and for a user to be easily able to control objects and/or navigate a viewpoint within a three-dimensional graphics display, I have developed improved, low-cost hand operated 6 DOF (3D) controllers for use with a computer or computerized television or the like host device. The controllers provide structuring for converting full six degrees of freedom physical input provided by a human hand on a hand operable single input member into representative outputs or signals useful either directly or indirectly for controlling or assisting in controlling graphic image displays. The present controllers sense hand inputs on the input member via movement or force influenced sensors, and send information describing rotation or rotational force of the hand operable input member in either direction about three mutually perpendicular bi-directional axes herein referred to as yaw, pitch and roll, (or first, second and third); and information describing linear moment of the hand operable input member along the axes to a host computer or like graphics generation device for control of graphics of a display, thus six degrees of freedom of movement or force against the input member are converted to input-representative signals for control of graphics images.

The present controllers include the hand operable input member defined in relationship to a reference member of the controller. The input member can be a trackball operable relative to a housing (reference member) or alternatively, the input member can be any handle fit to be manipulated by a human hand, such as a joystick type handle, but in either case, the input member accepts hand input relative to the reference member, and the converter acts or operates from the hand inputs to cause influencing of the sensors which inform or shape electricity to be used as, or to produce such as by way of processing, an output signal suitable for a host device to at least in part control the image on the display of the host device.

The present 6 DOF (3D) controller provides structuring for sensors to be located, in some embodiments, in a generally single plane, such as on a substantially flat flexible membrane sensor sheet, or a circuit board sheet. The use of flat sheet mounted or positioned sensors preferably electrically connected with fixed-place trace circuitry provides the advantages of very low cost sensor and associated sensor circuit manufacturing; ease in replacing a malfunctioning sensor or conductor by entire sheet replacement, and increased reliability due to the elimination of individually insulated wires to the sensors. Clearly, an image controller need not provide a full 6 DOF (3D) to be benefited by the application of the flexible sheet connected to the sensors as herein taught.

The use of sheet supported sensors and associated circuits enable the use of highly automated circuit and sensor defining and locating, resulting in lower manufacturing costs and higher product reliability. The utilization of flat sheet substratum supporting the sensors, and preferably sensor circuitry in conductive fixed-place trace form, provides many advantages, with one being the allowance of a short or low profile 6 DOF (3D) controller, and another, as previously mentioned, lower cost in manufacturing. In at least one preferred embodiment, all sensors for 6 DOF (3D) are positioned on one substantially flat sheet member, such as a circuit board sheet or membrane sensor sheet, and electrically conductive traces are applied to the sheet members and engaging the sensors. The conductive traces can be used to bring electricity to the sensors, depending on the sensor type selected to be utilized, and to conduct electricity controlled, shaped or informed by the sensor to an electronic processor or cable-out lead or the like.

As will be detailed in reference to a present embodiment of 6 DOF (3D) controller, the sensors and conductive traces can be manufactured on a generally flat flexible membrane sensor sheet material such as a non-conductive plastic sheet, which then may or may not be bent into a three dimensional configuration, even a widely-spread 3-D sensor constellation, thus sheet supported sensor structuring provides the advantages of very low cost sensor and associated sensor circuit manufacturing; ease in replacing a malfunctioning sensor or conductor by entire sheet replacement, and increased reliability due to the elimination of individually insulated wires to the sensors.

The present invention solves the aforementioned prior art problems associated with 6 DOF (3D) controllers having one 6 DOF input member, with multiple, individually hand mounted and positioned sensors or sensor units in widely-spread three dimensional constellations, and the problems of hand applied wiring of individually insulated wire to the individual sensors or sensor units. The present 6 DOF (3D) controller solves these problems primarily with sheet supported sensor structuring and most associated circuitry on the sheet which is at least initially flat when the sensors and conductive circuit traces are applied; the sheet circuitry and sensors being an arrangement particularly well suited for automated manufacturing, and well suited for fast and simple test-point trouble shooting and single board or "sheet" unit replacement if malfunction occurs. Hand applying of the sensors and associated electrical conductors onto the flat sheet is not outside the scope of the invention, but is not as great of an advancement, for reasons of cost and reliability, compared to utilizing automated manufacturing processes that are currently in wide use.

Automated manufacturing of circuit boards with fixed-place trace conductors, sensors, discrete electronic components and integrated chips is in wide use today for television, computer, video and stereo manufacturing for example, and can employ the plugging-in of sensor and electrical components with computer controlled machinery, and the application of conductive trace conductors onto the otherwise non-conductive circuit board sheets is usually performed using automatic machinery, wherein the solder or conductive material adheres to printed fluxed or non-etched areas where electrical connections and conductive traces are desired, although other processes are used. Automated manufacturing of flat, flexible membrane sensor sheets is in wide use today for computer keyboards, programmable computer keypads, and consumer electronics control pads, to name just a few for example. Flexible membrane sensor sheets are currently being manufactured by way of utilizing non-conductive flexible plastics sheets, and printing thereon with electrically conductive ink when the sheets are laying flat, to define circuit conductors and contact switches (sensors). Usually, and this is believed well known, printed contact switches on flexible membranes utilizes three layers of plastic sheets for normal contact pair separation, with a first contact on one outer sheet, and a second contact of the pair on the opposite outer sheet, and a third inner sheet separating the aligned contact pair, but with a small hole in the inner sheet allowing one contact to be pressed inward through the hole to contact the other aligned contact of the pair, thus closing the circuit. A conductor trace of printed conductive ink is printed on each of the outer sheets and connects to the contact of that sheet. The contacts are also normally defined with conductive ink. Although this flexible membrane sensor structure in formed of multiple sheets stacked upon one another, it will herein generally be referred to as a membrane sensor sheet since it functions as a single unit. The printed conductive inks remain, or can be formulated to remain flexible after curing, and this allows the flexible membrane sensor sheet to be bent without the printed circuits breaking. Flexible membrane sensor sheets can be cut into many shapes before or after the application of the sensors and associated circuits.

For the purposes of this teaching, specification and claims, the term "sensor" or "sensors" is considered to include not only simple on/off, off/on contact switches, but also proportional sensors such as, proximity sensors, variable resistive and/or capacitive sensors, piezo sensors, variable voltage/amperage limiting or amplifying sensors, potentiometers, resistive and optical sensors or encoders and the like, and also other electricity-controlling, shaping or informing devices influenced by movement or force. Pressure sensitive variable resistance materials incorporated into sensors applied directly on flexible membranes, circuit boards and sensor packages mounted on sheet structures are anticipated as being highly useful as proportional sensors and desirable in 6 DOF (3D) controllers of the types herein disclosed.

A primary object of the invention is to provide a 6 DOF (3D) image controller (physical-to-electrical converter), which includes a single input member being hand operable relative to a reference member of the controller, and the controller providing structure with the advantage of mounting the sensors in a generally single area or on at least one planar area, such as on a generally flat flexible membrane sensor sheet or circuit board sheet, so that the controller can be highly reliable and relatively inexpensive to manufacture.

Another object of the invention is to provide an easy to use 6 DOF (3D) controller (physical-to-electrical converter) which includes a single input member being hand operable relative to a reference member of the controller, and which provides the advantage of structure for cooperative interaction with the sensors positioned in a three dimensional constellation, with the sensors and associated circuit conductors initially applied to flexible substantially flat sheet material, which is then bent or otherwise formed into a suitable three dimensional constellation appropriate for circuit trace routing and sensor location mounting.

Another object of the invention is to provide an easy to use 6 DOF (3D) controller, which includes a single input member hand operable relative to a reference member of the controller, and which has the advantage that it can be manufactured relatively inexpensively using sensors and associated circuits of types and positional layout capable of being assembled and/or defined with automated manufacturing processes on flat sheet material.

Another object of the invention is to provide an easy to use 6 DOF (3D) controller, which includes a single input member hand operable relative to a reference member of the controller, and which has the advantage that it can be manufactured using highly reliable automated manufacturing processes on flat sheet material, thus essentially eliminating errors of assembly such as erroneously routed wiring connections, cold or poor solder connections, etc.

Another object of the invention is to provide an easy to use 6 DOF (3D) controller, which includes a single input member hand operable relative to a reference member of the controller, and which has the advantage that it can be manufactured using sensors and associated circuits on flat sheet material so that serviceability and repair are easily and inexpensively achieved by a simple sheet replacement.

Another object of the invention is to provide a 6 DOF (3D) controller which is structured in such a manner as to allow the controller to be made with a relatively low profile input member, which offers many advantages in packaging for sale, operation in various embodiments and environments (such as a low profile 6 DOF (3D) handle integrated into a keyboard so that other surrounding keys can still be easily accessed) and function of the device (such as still allowing room for active tactile feedback means within a still small low handle shape). An example of an active tactile feedback means is an electric motor with shaft and offset weight within a handle for providing active tactile feedback, as shown in drawing FIG. 21.

Another object of the invention is to provide and meet the aforementioned objects in a 6 DOF (3D) controller which allows for the application and advantage of sensor choice. The invention can be constructed with sensors as simple as electrical contacts or more sophisticated proportional and pressure-sensitive variable output sensors, or the like. The printed circuit board provides great ease in using a wide variety of sensor types which can be plugged into or formed onto the board with automated component installing machinery, and the flexible membrane sensor sheet can also utilize a variety of sensors such as contact pairs and pressure-sensitive variable output sensors (pressure-sensitive variable resistors) printed or otherwise placed onto flexible membrane sensor sheets.

Another object of the invention is to provide and meet the aforementioned objects in a six degree of freedom controller providing the advantage of versatility of complex movements wherein all three perpendicular Cartesian coordinates (three mutually perpendicular axes herein referred to as yaw, pitch and roll) are interpreted bi-directionally, both in a linear fashion as in movement along or force down any axis, and a rotational fashion as in rotation or force about any axis. These linear and rotational interpretations can be combined in every possible way to describe every possible interpretation of three dimensions.

These, as well as further objects and advantages of the present invention will become better understood upon consideration of the remaining specification and drawings.

BRIEF DESCRIPTION OF THE DRAWINGS

FIGS. 23–25 show various side views of two-armed rocker arm actuators in operation.

FIG. 26 shows a top view of a rocker arm layout and its reduced area by using two one-armed actuators.

FIG. 27 shows a side view of a one-armed rocker actuator.

BEST MODES FOR CARRYING OUT THE INVENTION

Figure 1:
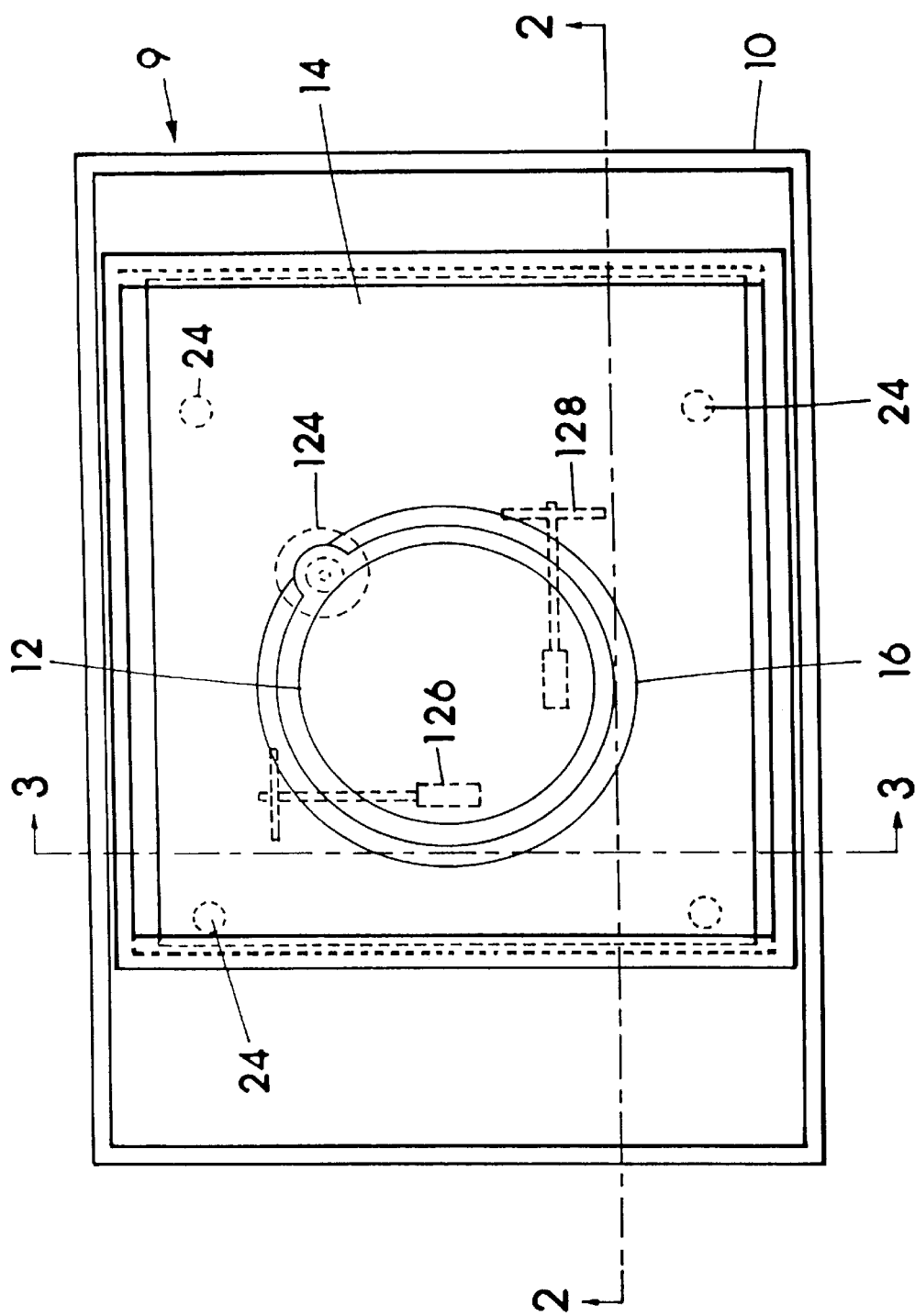
FIG. 1 is a top view of a trackball type embodiment of the invention within a housing specific for a carriage and the trackball.

Referring now to the drawings in general, and particularly to drawing FIGS. 1 through 11 for a description a trackball-type embodiment 9 exemplifying principles of the invention. Joystick-type embodiments further exemplifying the principles of the invention are then described as additional preferred embodiments of the invention.

Figure 2:
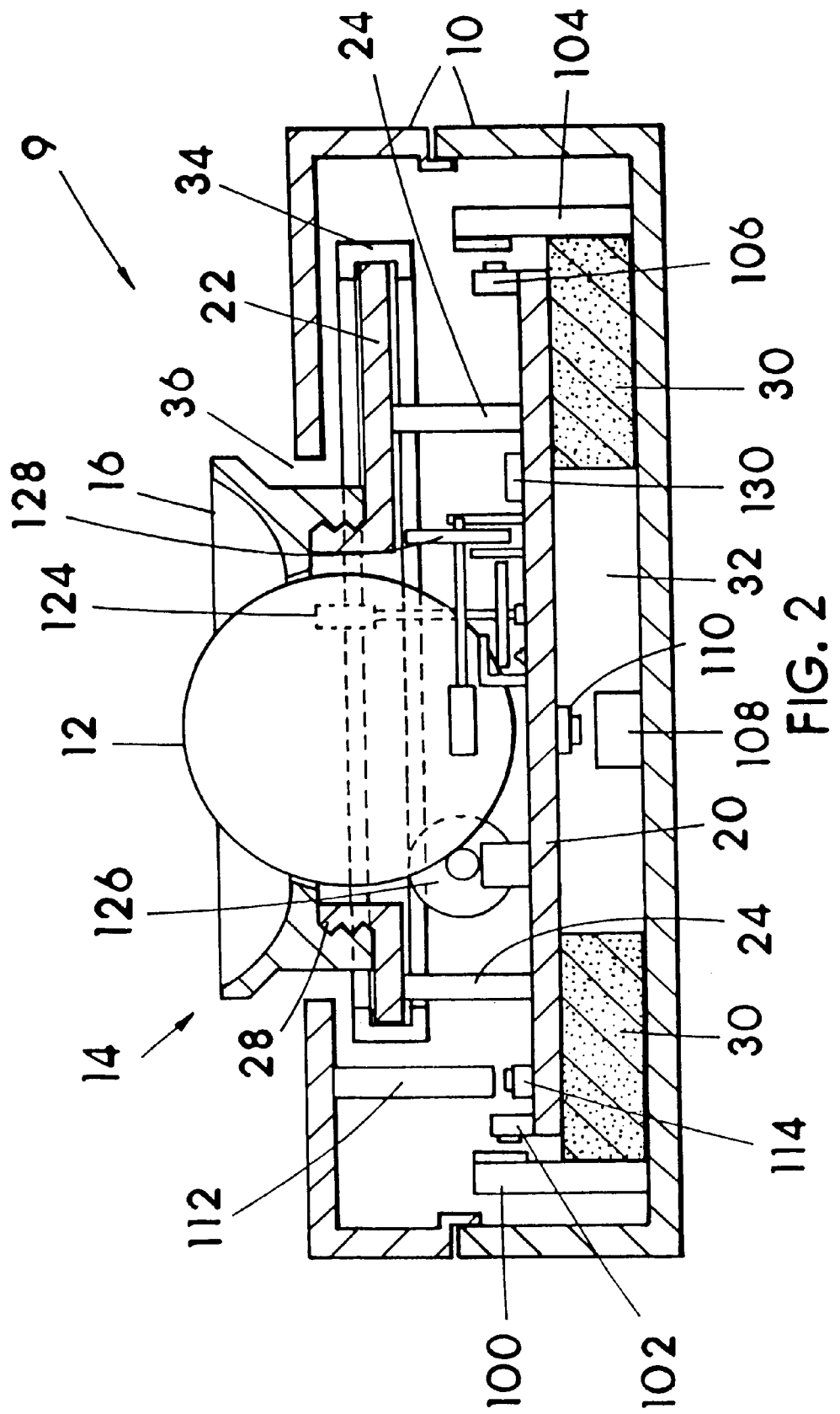
FIG. 2 is a cross-sectional side view of the FIG. 1 embodiment taken at line 2.
Figure 3:
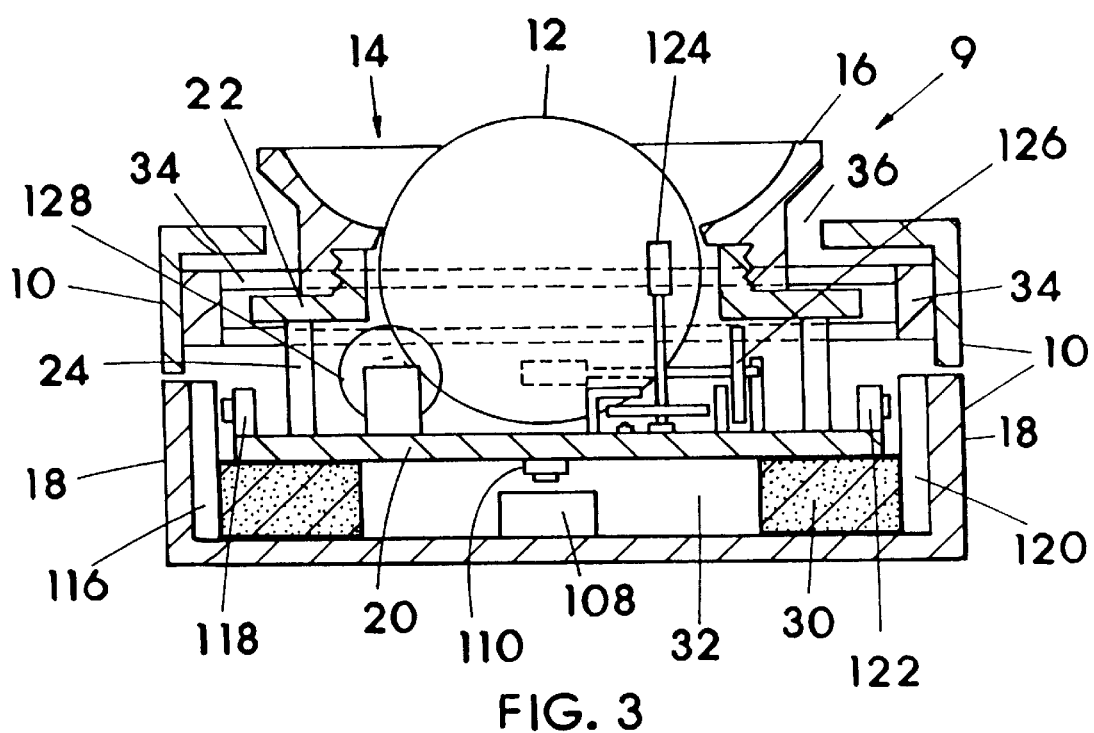
FIG. 3 is a cross-sectional end view taken at line 3 of FIG. 1.

With reference to FIGS. 1–4 in particular wherein trackball-type embodiment 9, being a hand operable 6 DOF (3D) controller for outputting control information is illustrated showing a rectangular housing 10 which is considered a reference member relative to which is operated trackball 12 which in this example is the hand operable single input member operable in full six degrees of freedom. FIGS. 2–3 being cross-sectional views of the FIG. 1 embodiment showing housing 10 which can at least in part support, retain and protect moveable carriage 14.

Figure 8:
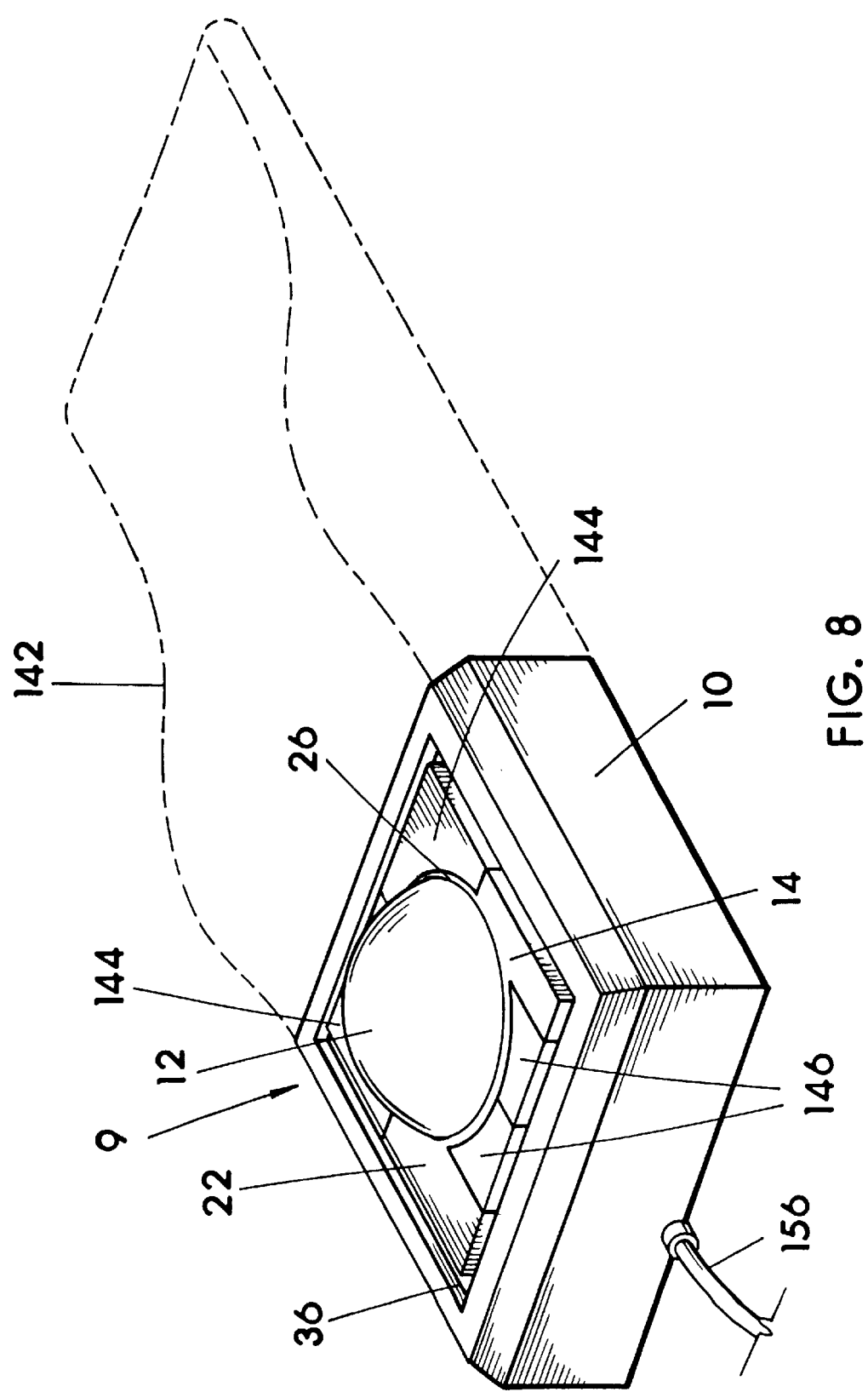
FIG. 8 is an illustration of a housing structured specific for the carriage and trackball, and one which is generally flat-bottomed and thus structured suitably to rest upon a support surface such as a table or desk when utilized. A broken outline indicates the possibility of an additional extension which is ergonomically designed as a wrist and forearm rest.
Figure 9:
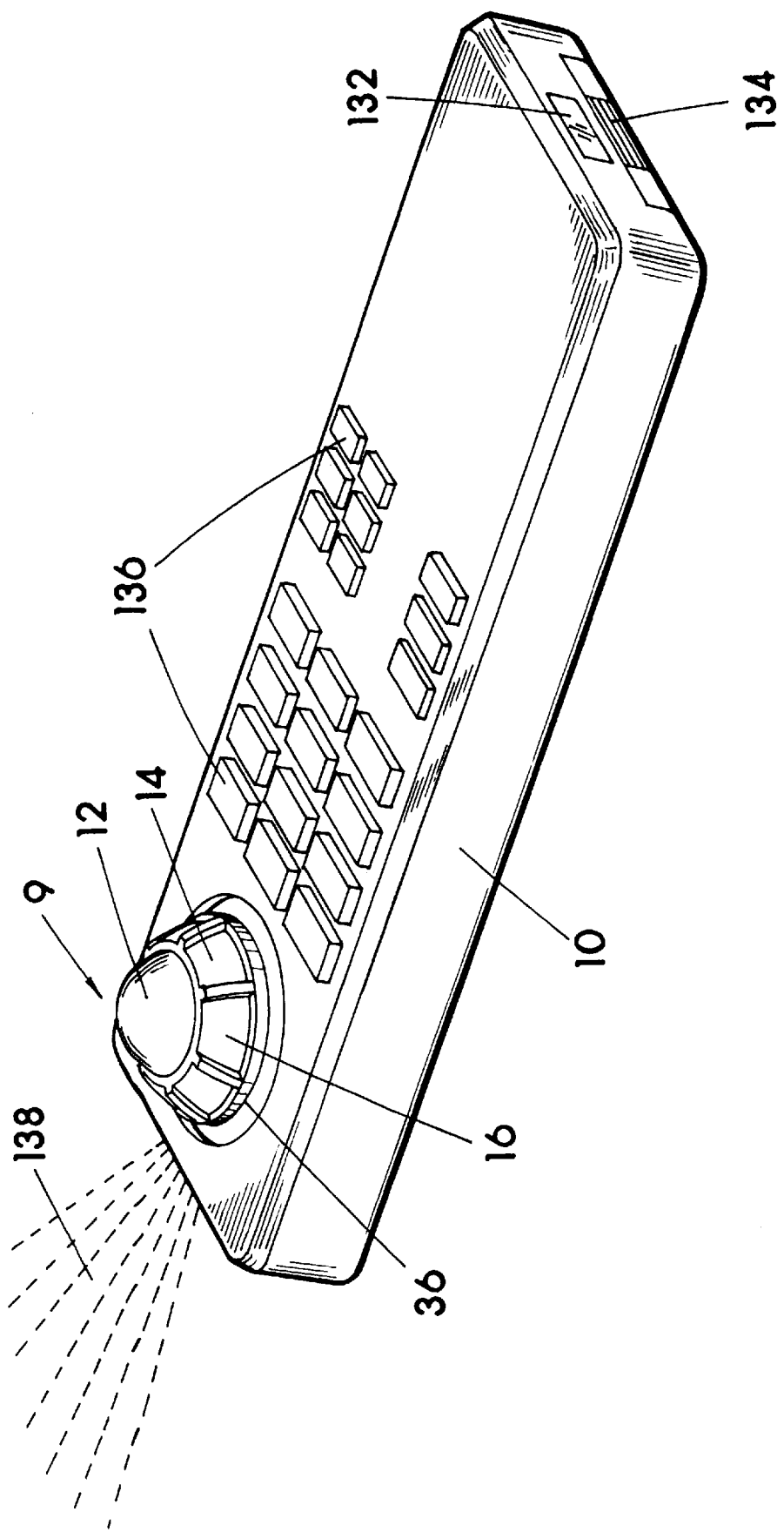
FIG. 9 is the carriage and trackball in a hand held housing sized and shaped to be grasped in a hand of a user while the user controls graphic images with the controller.
Figure 10:
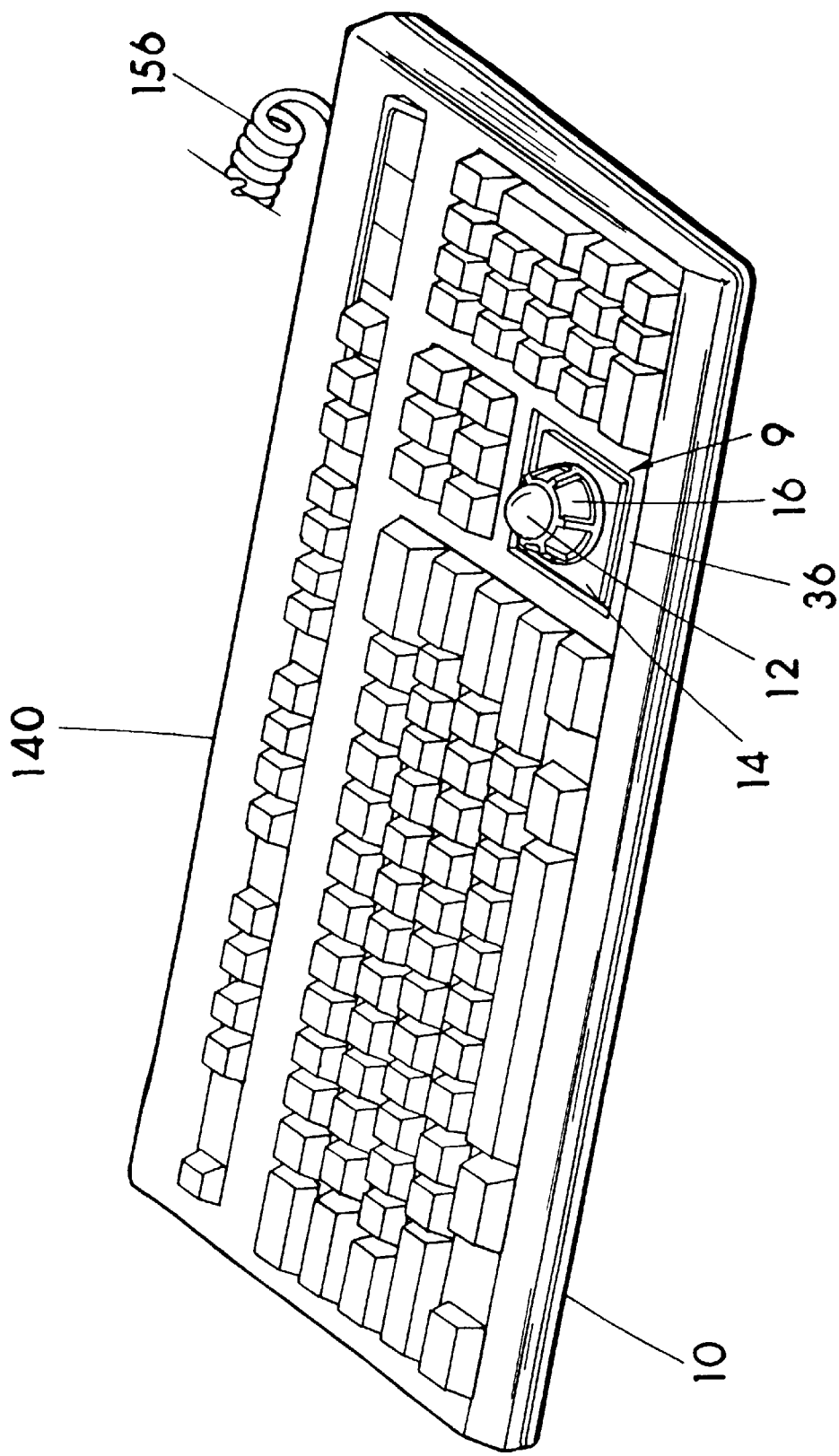
FIG. 10 is the carriage and trackball housed in an otherwise relatively conventional computer keyboard having well over 40 keys for the alphabet, numbers 1–9, a spacebar and other function keys.

As may be appreciated already from the above writing and drawings, carriage 14 is supported at least in part within housing 10 and with structuring for allowing carriage 14 to be moveable or moved in all linear directions relative to housing 10, for example, left, right, forward, rearward, up and down, and in the possible combinations thereof. Furthermore, housing 10 may be specific for the present six degree of freedom controller as exemplified in FIGS. 1–3 and 8, or the housing 10 of another functional device such as an otherwise typical hand held remote control housing or computer keyboard housing as shown in FIGS. 9 and 10 respectively, and offering or including functions such as keyboarding, cursor control, on/off, volume control, channel control and the like in addition to that offered by the present six degree of freedom controller. Housing 10 may be in effect the panel or panels of a control console of a vehicle or machine. Housing 10 may be any size within reason, although trackball 12, any exposed part of carriage 14 or housing 10 intended to be manually controlled or hand held should of course be correctly sized to interface with the human hand or hands. When housing 10 is too large to allow easy use of the housing walls upon which to place carriage movement stops (stationary walls or posts to limit movement of the carriage) or sensor actuators or sensor supports such as would be likely with the keyboard housing of FIG. 10 wherein the housing side walls are a substantial distance apart, then walls, partitions or posts specific for these purposes may be placed in any desired and advantageous location within housing 10 as shown for example in FIG. 2 wherein actuators 100 and 104 are shown extending vertically upward from the interior bottom of housing 10, inward of the interior side walls of the housing, and supporting or serving as a switch/sensor actuator, or a second component of the sensor, such as a second component of a two piece proximity sensor for example. Actuator 100 functions in conjunction with forward sensor 102, and actuator 104 functions in conjunction with rearward sensor 106 in this example. FIG. 3 illustrates for example the use of side walls 18 of housing 10 as the sensor actuators 116 and 120 or press plates for right sensor 118 and left sensor 122. Housing 10 in most all applications will be made of rigid or semi-rigid plastics for cost, weight and strength considerations, although other materials might be functionally suitable.

Although it must be noted that within the scope of the invention carriage 14 functions may conceivably be provided with numerous structures, carriage 14 is shown in the drawings as including a lower member 20 and an upper member 22 positioned above lower member 20. In this example, lower member 20 is shown as a rigid sheet member such as a circuit board, but could be structured as a rigid sheet supporting a flexible membrane sensor sheet having at least circuitry in the form of electrically conductive circuit traces which are stationary on the sheet member. Lower and upper members 20, 22 in this example are each plate-like and rectangular, are in spaced parallel relationship to one another, are horizontally disposed, and are rigidly connected to one another via vertically oriented rigid connecting posts 24. Upper member 22 and lower member 20 are preferably of rigid materials such as rigid plastics, as are connecting posts 24 which may be integrally molded as one part with upper member 22 and connected to lower member 20 utilizing a mushroom-head shaped snap connector end on each posts 24 snapped through holes in member 20, or with screws passed upward through holes in member 20 and threadably engaged in holes in the bottom terminal ends of posts 24. Glue or adhesives could be used to connect posts 24 to lower member 20. Typically four connecting posts 24 would be used as indicated in dotted outline in FIG. 1 although the posts could easily be substituted with equivalent structures such as two walls, etc. The separate lower member 20 which is then attached to upper member 22, allows member 20 to be flat on each side and more suitably shaped and structured to allow circuit traces and sensors to be applied utilizing automated machinery, without upper member 22 being in the way. Upper member 22 includes an opening 26 in which trackball 12 resides and extends partly therethrough, and opening 26 may include an annular raised lip or ring such as a threaded ring 28 or the like for engaging a cooperatively structured collet 16 such as one having threading at the bottom edge thereof, or it may be an opening absent any raised lip or extending collet as illustrated in FIG. 8 wherein trackball 12 is shown extending upward through opening 26 in upper member 22. Trackball 12 also might be exposed in great part (more than 50 percent) without using collet 16 by utilizing an arm extending upward from carriage 14 and partially over trackball 12 is such a manner as to retain trackball 12 in unison with carriage 14 for all linear movements. Collet 16, if utilized, serves as an easily gripped member allowing the human hand to move carriage 14 and thus trackball 12 in any linear direction desired, although when collet 16 is not utilized, trackball 12 can be grasped by the fingers of the hand to also move carriage 14 in any linear direction. If a graspable collet is not used, then the exposed portion of trackball 12 is available for grasping with the fingers to apply force in any linear direction, much like a basketball player grasps a basketball in one hand or in the fingers.

Lower member 20 of carriage 14 preferably physically supports wheels, rollers, bearing or slide members or smooth surfaces which otherwise aid in supporting trackball 12 in a freely spherically rotatable manner, and in the example illustrated, three mutually perpendicular encoders (sensors) 124, 126, 128 mounted on the upper surface of lower member 20 for sensing rotation, direction and amount of rotation of trackball 12 about the yaw, pitch and roll axes include rotatable wheels upon and against which trackball 12 rests, and is thereby rotatably supported. In most applications, the weight of trackball 12 and its most common positioning within the supporting rotatable wheels of the encoders causes sufficient frictional engagement between the encoder wheels and trackball 12 so that rotation of the trackball causes rotation of one or more of the encoders, depending upon the axis about which trackball 12 is rotated. The structure of carriage 14 and collet 16 if the extending collet is used, is sufficiently close in fit to trackball 12 to render a substantial link in linear movement between carriage 14, collet 16 and trackball 12. In other words, linear movements in trackball 12 are substantially equal to linear movement of carriage 14 and collet 16. It should be noted that I consider collet 16 as shown in FIG. 2 and some other drawings, whether it is a fixed or rotatable collet (to be detailed) to be part of carriage 14 since it is supported or fastened to carriage 14 and moves therewith. As previously stated, carriage 14 is supported with structuring for allowing movement in all linear directions relative to housing 10, for example, left and right which is linear movement along the pitch axis in this example; forward and rearward which is linear movement along the roll axis in this example; up and down which is linear movement along the yaw axis in this example; and in the possible combinations thereof, and sensors are positioned to detect and provide (output) information related to such linear movements of carriage 14 relative to housing 10. Clearly since trackball 12 and collet 16 are linked to move linearly with carriage 14, trackball 12 can be moved linearly in all directions relative to housing 10, wherein housing 10 is considered the reference member. I prefer carriage 14 to be not rotatable relative to housing 10 since rotation interpretations about the three mutually perpendicular axes (see FIG. 7) are provided via trackball 12 and encoders 124, 126, 128 for sensing spherical rotation of trackball 12 about yaw, pitch and roll. Therefore, I prefer carriage 14 to be supported or retained in such a manner and by appropriate structure to allow carriage 14 to be moved linearly in all possible directions, but prevented from being axially rotated relative to housing 10 so that trackball 12 can be rotated when desired without carriage 14 unintentionally being rotated, and this so the encoders (or whatever rotational sensors which may be utilized) will be rotated. I would consider it to be within the scope of the invention if carriage 14 was to be supported in a manner which would allow limited axial rotation thereof, although I believe this to be an undesirable aspect.

Figure 6:
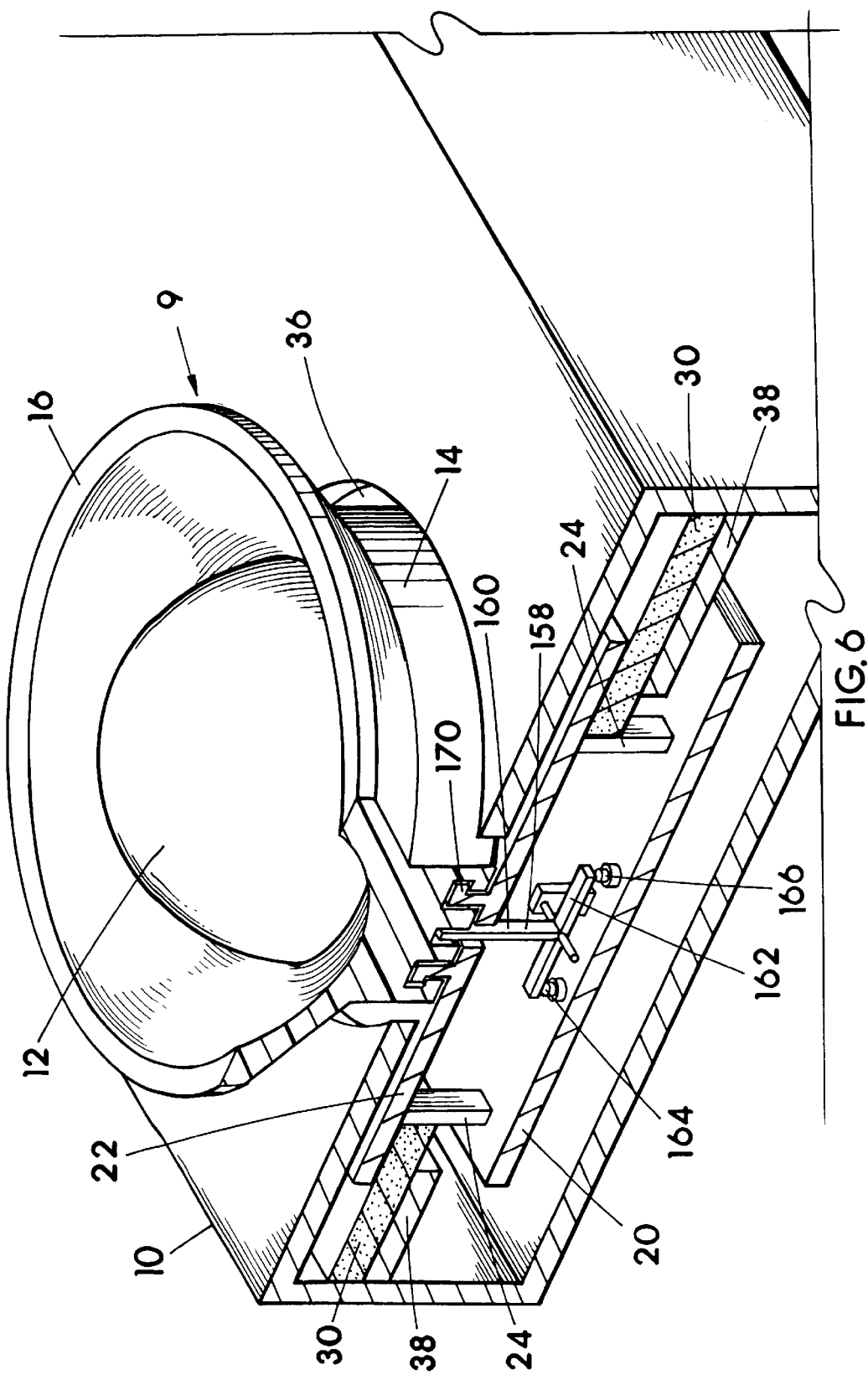
FIG. 6 is an illustration basically showing another form of the rotatable collet.
Figure 7:
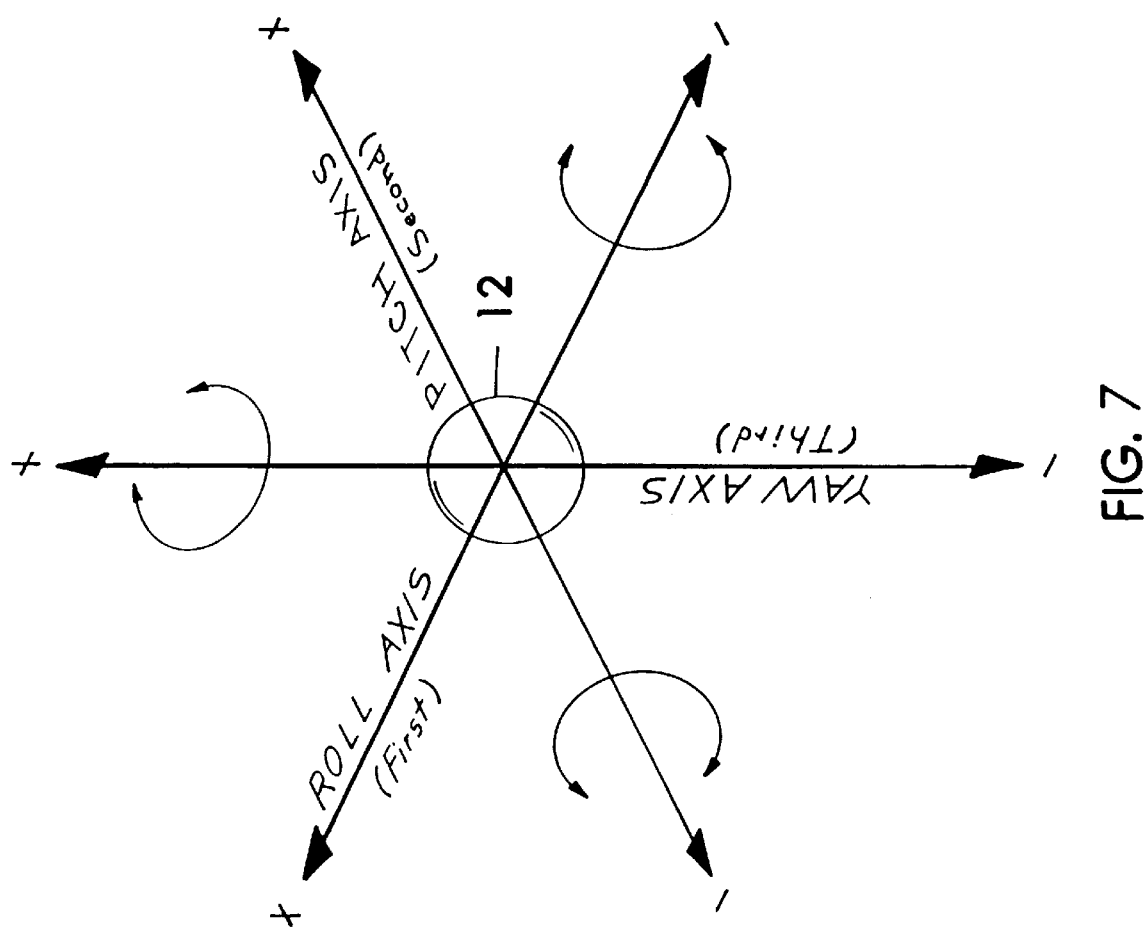
FIG. 7 shows three mutually perpendicular axes herein referred to as first, second and third, or respectively roll, pitch and yaw axes, which are shown having a mutual point of intersection at the center of the input member which is shown as a trackball but may be any hand manipulated input member.

Although the structuring to physically support carriage 14 so it can be moved in any linear direction can conceivably be accomplished through numerous structural arrangements, two are illustrated for example, with a first shown in FIGS. 1–4, and a second shown in FIG. 6. I prefer there be a return-to-center aspect regarding carriage 14, and preferably a center null associated with this return-to-center wherein no significant linear sensor activation occurs. This carriage return-to-center and to center null can conceivably be accomplished with numerous structures, but one structure which should be readily understandable and therefore makes a good example is to simply utilize on/off switches as the carriage position linear sensors for moment related information output, with the switches including activation buttons which are outwardly spring biased, wherein carriage 14 can be pushed against one of the switches to the point of activating the switch (closing or opening a set of electrical contacts), which of course sends or outputs information relating to this event via allowing or interrupting current flow, and the button spring being depressed by carriage 14 would then push carriage 14 back toward the center and the null position upon the user releasing pressure toward that particular switch. Furthermore, as mentioned above, if such an on/off switch using spring biasing were to be of a type which made a detectable click or snap upon being activated by pressure from carriage 14, and this is a commonly available snap switch, then this click or snap could be felt or heard by the user, and thus the user would be provided information alerting him of the activation or possibly deactivation of the switch. Snapping or clicking mechanisms which are not sensors can of course be installed when sensors of a type which are silent are used, and tactile or audible signals indicating sensor activation or deactivation is desired.

With reference to FIGS. 2–3, expanded foam rubber 30 is shown placed against the bottom interior of housing 10 and underneath lower member 20 of carriage 14. Snap or spring biased switches as described above may be used in conjunction with foam rubber 30. Foam rubber 30 is a resiliently compressible and thus spring material. Foam rubber 30, and other spring materials such as coiled compression springs, leaf springs and the like could conceivably be used instead of foam rubber, however foam rubber functions well, is inexpensive, readily available and easily shaped or cut. I have even considered suspending carriage 14 on tension springs hung from the underside interior of housing 10, but this seems to be an excessively complicated structure compared to using foam rubber as shown and described. Foam rubber 30 in the example of FIGS. 2–3 is a rectangular piece having a center cut-out or opening at 32 to allow for the interaction of down sensor 110 shown mounted on the underside of lower member 20 with actuator 108 specific for interaction with down sensor 110 located beneath the sensor 110. The actuator 108 for down sensor 110 is sized to allow the abutment or actuation of the down sensor 110 no matter where carriage 14 has been moved laterally when the user wishes to push down on carriage 14 to activate the sensor 110. Foam rubber 30 being compressible will allow the user to push down on trackball 12 or collet 16, or possibly the exposed top of carriage 14 (upper member 22) to push carriage 14 downward to activate the down sensor 110. This pushing downward compresses the foam rubber 30, and when the user releases the downward pressure, the foam rubber 30 being resilient pushes carriage 14 upward again to deactivate the down sensor 110 and to move carriage 14 into the center null position. Foam rubber 30 in the example shown in FIGS. 2–3 is rectangular and slightly larger in all dimensions than the size of lower member 20, and the foam rubber 30 is affixed to the underside of lower member 20 such as by glue or mechanical fasteners so that the foam is securely affixed to the lower member (carriage). Since the foam rubber 30 is slightly larger than the lower member 20, the foam rubber 30 extends outward laterally beyond all peripheral sides of the lower member 20. This extending portion of the foam rubber 30 serves as a spring bumper which as shown in FIG. 2 is compressed against actuators 100, 104 (or housing side walls 18 under some circumstances) prior to the sensors 102, 106 shown on the left and right being activated, and in the case of the FIG. 3 drawing is compressed against the side walls 18 of housing 10 prior to the sensors 118, 122 shown on the left and right being activated. When the user releases the pushing pressure, the compressed foam rubber 30 will push carriage 14 back toward the center null position, as the foam rubber 30 is normally in a partially extended state, being able to be compressed and to then spring back. The up sensor 114 shown in FIG. 2 is shown mounted on the top of the lower member 20, and the weight of carriage 14 is normally sufficient to pull carriage 14 and sensor 114 downward away from its actuator 112 upon release of upward pulling pressure by the user, although a spring such as a foam rubber pad or the like could conceivably be placed between the underside of the housing top panel and the upper member 22 to push carriage 14 downward to deactivate the up sensor 114 if weight and gravity were insufficient or unavailable such as in outer space. The actuator 112 for the up sensor 114 is shown suspended from the interior underside of the housing top portion, and is a member which may be formed as an integral component of housing 10 if desired. The actuator 112 for the up sensor 114 may be simply a plate or panel against which a snap switch mounted on carriage 14 strikes or is pressed against, or it may be a second component of the sensor, or may be supporting a second component of the sensor such as the second component of a two piece proximity sensor, and this is generally true of all of the actuators shown and described. Also generally true of all of the actuators shown and described is that they must be sufficiently large and or properly positioned be useful even when carriage 14 is moved to any allowed extreme position.

Figure 4:
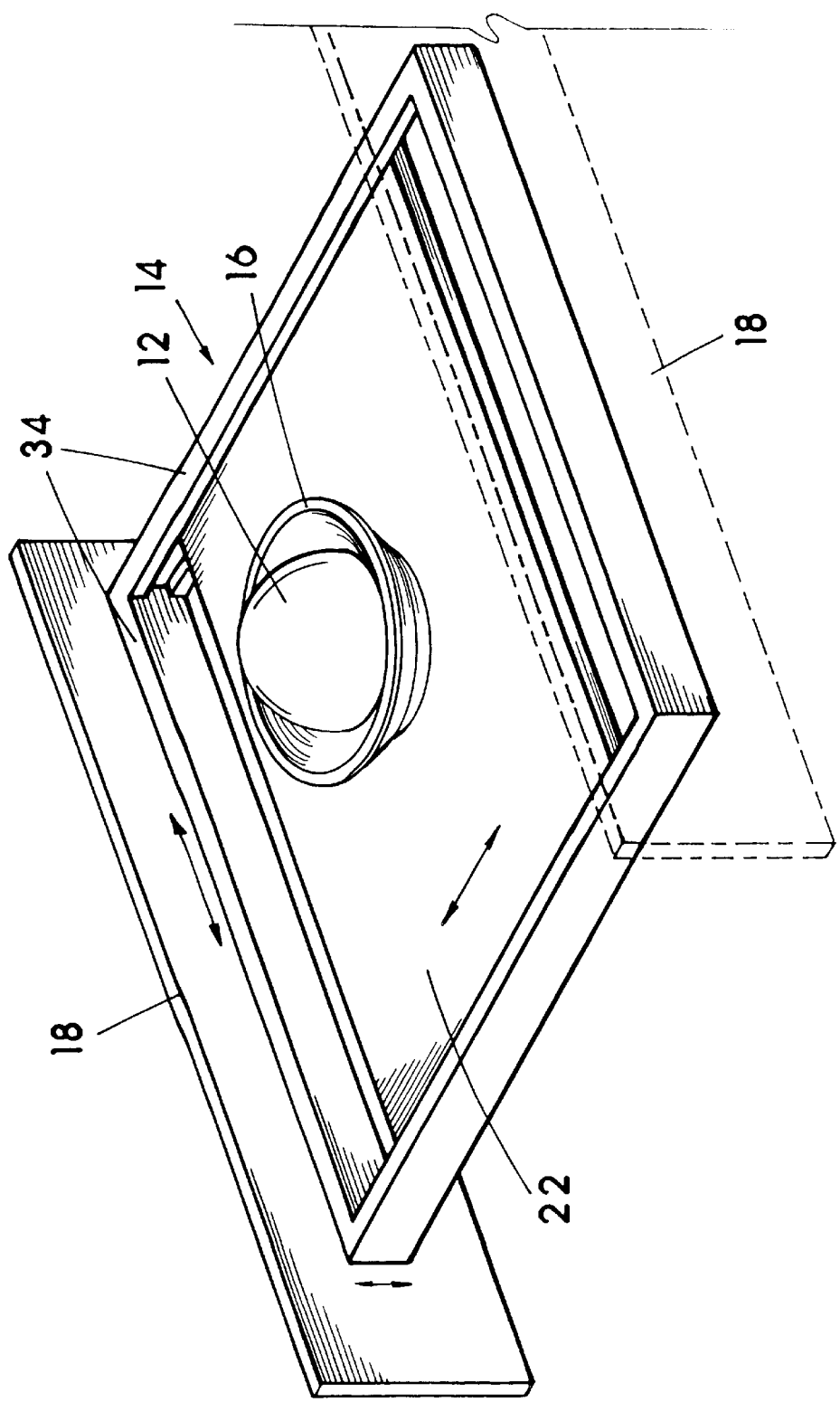
FIG. 4 is a partial illustration of the carriage, the trackball and a track frame between two walls.

In FIGS. 2–4 is track frame 34 located under the top of housing 10. Track frame 34 is free to be moved vertically within housing 10, which will allow carriage 14 to be moved vertically to activate the up or down sensors 114, 110. Additionally from FIGS. 2–3 it can be seen that carriage 14 is sized and shaped relative to housing 10 and components within housing 10 such as the actuators to allow carriage 14 to be moved in all linear directions, although only in small amounts in the example shown. I prefer the linear movement requirements from the center null to activating a sensor or sensors to be small, although the distances could be made substantial if desired. The track frame 34 is a structure which can be utilized to positively prevent axial rotation of carriage 14. The foam rubber 30 of FIGS. 2–3 being positioned tightly between either walls or actuators or both on the four peripheral sides of the foam normally serves to a satisfactory degree as an anti-axial rotation structure for carriage 14, however, for more positive prevention of axial rotation of carriage 14, track frame 34 or like structure may be applied. As shown in FIG. 4, track frame 34 is a rectangular frame opened centrally in which upper member 22 is slidably retained. Two oppositely disposed sides of frame 34 are abutted, but slidably so, against and between two stationary parallel walls which may be side walls 18 of housing 10 or partitions installed specific for this purpose. The lower member 20 in this arrangement would be supported by resting on foam rubber 30, and if upper member 22 were pushed forward or rearward for example, frame 34 would slide between the walls 18. Frame 34 can also move up and down sliding between the walls 18, but due to the close fit, the frame 34 will not axially rotate between the walls 18. The upper member 22 fits lengthwise snugly yet slidably between two oppositely disposed U-shaped track sides of frame 34 as can be seen in FIGS. 2 and 4, but is narrower than the width of the frame 34 as can be seen in FIGS. 3–4, and thus when upper member 22 is pushed forward and rearward (for example) it pushes frame 34 with it due to the close fit in this direction between the frame 34 and upper member 22, and when upper member 22 is pushed left and right (for example) it slides in the U-shaped track portion of frame 34, as the frame 34 cannot move in these directions due to its close abutment against the parallel walls 18. When upper member 22 is moved up and down, track frame 34 moves up and down also, as does the balance of carriage 14 and trackball 12. It should be remembered that in this example, upper member 22 and lower member 20 are rigidly tied together with connecting posts 24, and that the members 20 and 22 constitute components of carriage 14, and that the carriage is to be manually controlled linearly via a hand applying force to collet 16 or the trackball or both, or possibly an exposed portion of the upper member 22 as mentioned previously. It should be noted that a space 36 or clearance is provided between the upper portion of the housing surrounding trackball 12, carriage 14 or collet 16 to allow movement of carriage 14 laterally, since carriage 14 and trackball 12 move independent of housing 10. The space 36 or crack may be covered with flexible or rubbery sheet material or any suitable boot or seal arrangement to exclude debris, or the space 36 (crack) may be kept (manufactured) narrow or small to be less likely to collect debris.

Another example of using foam rubber 30 is shown in FIG. 6 wherein the foam 30 is located atop a stationary shelf 38 within housing 10, and directly under upper member 22 which rests atop of the foam rubber 30. Foam rubber 30 extends beyond shelf 38 inward as may be seen in the drawing. The inward most edges of the foam rubber 30 are abutted against the vertical connecting posts 24 of carriage 14. Carriage 14 being supported by foam rubber 30 being between the underside of upper member 22 and the top of the shelf 38 is allowed to be moved in all linear directions, and the foam rubber 30 abutting connecting posts 24 and abutting the interior of the housing walls as shown functions as a return-to-center and return to null arrangement much like that described for the FIGS. 2–3 structural arrangement. The shelf 38 in this example should be on all interior sidewalls of housing 10, or at least under some resilient foam placed about the periphery of carriage 14. It should be noted clearance above upper member 22 and the top interior surface of housing 10 must be provided to allow upward movement of carriage 14 with pulling action to activate the up sensor 114, and the support for carriage 14 such as the foam rubber must allow carriage 14 to move away and to clear the activation of the up sensor 114 upon the termination of the upward pulling pressure on carriage 14, and this principle applies in most if not all embodiments of the invention.

Figure 5:
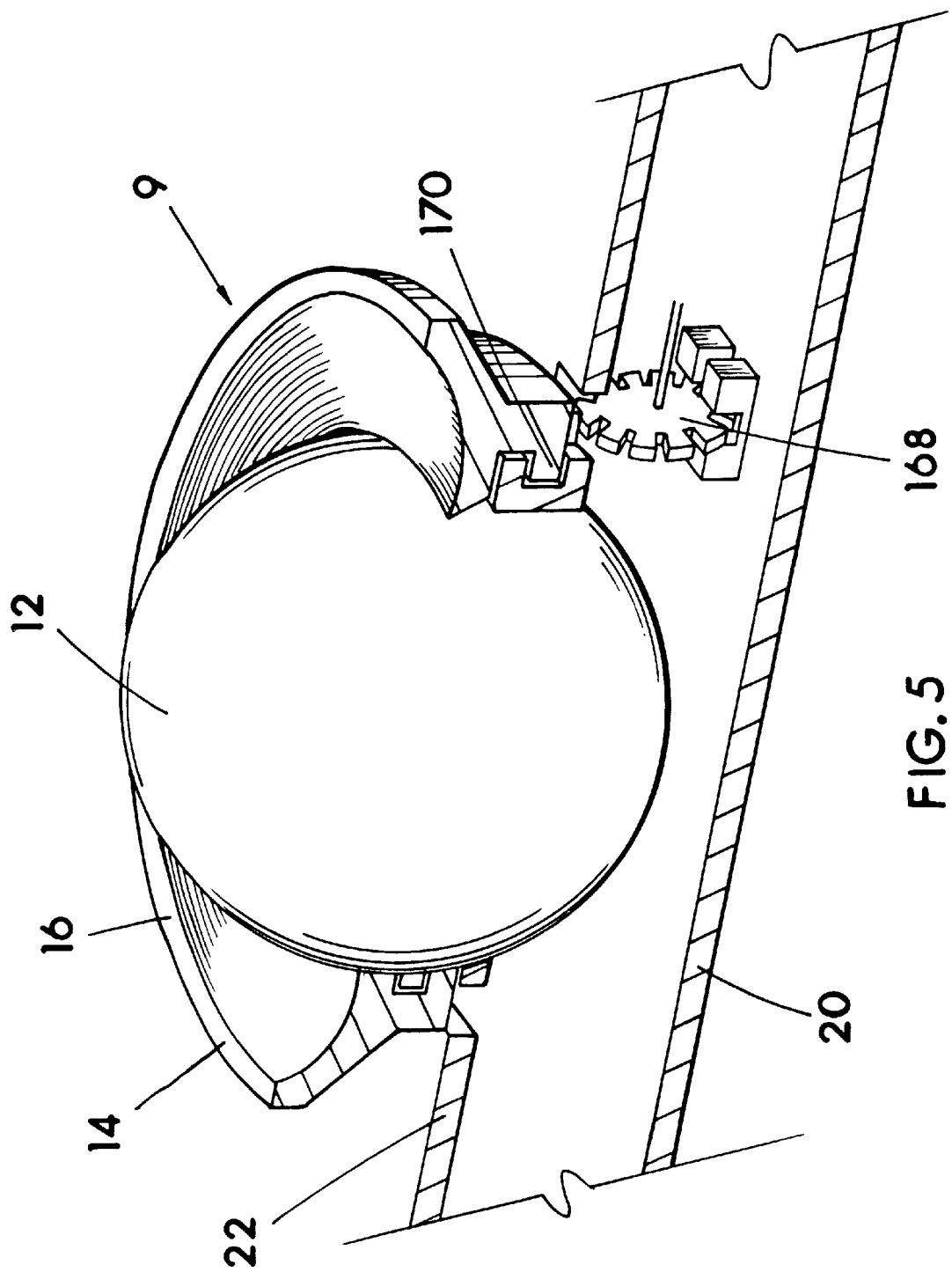
FIG. 5 is an illustration showing a portion of a slightly varied carriage, the trackball, and a collet which is rotatable about the trackball which can be used within the scope of the present invention. A rotary encoder is shown as an example of a sensor in contact with the bottom of the collet.

With reference to FIGS. 5–6 for a brief description of an optional arrangement wherein collet 16 can be rotatably attached to upper member 22 allowing collet 16 to be manually rotated about trackball 12, as opposed to being non-rotatably affixed to upper member 22 as in the FIGS. 1–3 embodiment. The rotatable collet of FIGS. 5–6 may at least for some users be an easier process to achieve rotation about the yaw axis as compared to rotating trackball 12 at least in terms of rotation about yaw. The rotating collet may be able to rotate 360 degrees as in FIG. 5, or only in part rotatable as in FIG. 6 wherein collet 16 can only move through a short arc back and forth, being limited such as by a multiple-position rocker style sensor 158. Both of the collets 16 shown in FIGS. 5–6 are connected to the upper member 22 via a loose fit tongue and groove connection shown for example at 170, the tongue being an upward extension of upper member 22 and the groove being a component of collet 16 and engaged over the tongue. In FIG. 5 an optical encoder 168 is shown as an example of a sensor in contact with the bottom of collet 16 so that rotation of collet 16 in either direction rotates the optical wheel of the encoder 168, this could be achieved by gear teeth around the outer periphery of a drive wheel of encoder 168 mated to gear teeth around the bottom of collet 16, and the encoder outputs information indicative of the direction and amount of rotation of collet 16 about the yaw axis. In FIG. 6 a rocker style sensor assembly 158 includes a T-shaped member and having a vertical center arm 160 engaged within a groove in the underside of collet 16, and the T-shaped member being pivotally supported at a lower center so that the two oppositely disposed lateral arms 162 may be pivotally moved up and down dependent upon the direction of rotation of the collet to interact with a direction indicating negative sensor 164 and a direction indicating positive sensor 166 shown mounted on lower member 20. The negative and positive sensors 164, 166 may be simple on/off switches, or may be more sophisticated sensors which indicate degree or pressure in addition to the direction collet 16 has been rotated, such as by varying voltage via resistance changes, or by varying electrical output such as with piezo electric material and the like. When a rotatable collet is used, a sensor is used to detect rotation of collet 16 as described above, but this does not bar still having a sensor (encoder) in communication with trackball 12 for detecting rotation of the trackball about the yaw axis, and this would give the user the option of rotating about yaw via the trackball or the rotatable collet. Further, the trackball 12 input member may be interpretable on all six axes as previously described, and the rotatable collet can serve as an additional secondary input member for whatever use may be desired by a software designer or end-user.

I prefer most all of the circuits, switches and sensors be mounted on carriage 14, and more particularly the lower member 20, which is a sheet member, and this being an advantage for maintaining low cost in manufacturing. Dependent upon the type and sophistication of the sensors utilized in the present controller, and the electronics and/or software and electronics of the host graphics image generation device which the present invention is intended to interface, and at least in part control, there may be little more than flexible electrical conductors connected to on/off switches mounted on the lower member 20, with the flexible conductors leaving the lower member to exit housing 10 via a cord 156 connectable to the host image generation device, or leaving circuitry on lower member 20 to connect to an emitter of electromagnetic radiation (not shown) mounted on housing 10 for communicating the linear moment and rotational information with the host device via wireless communication such as via infra red light or radio signals. Lower member 20 may be a printed circuit board having sensors, integrated and or discrete electronic components thereon, and in FIG. 2 an application specific integrated circuit chip is illustrated at 130 which could be utilized for computations, encoding, memory, signal translations such as analog to digital conversions, data formatting for communication to the host device, serial and/or parallel communications interfacing, and the like steps or processes. The specific circuitry and electronics built onto or into the present invention will in all likelihood be different when the invention is built primarily for use with a personal desk top computer than when it is built primarily for use with an interactive television or television based electronic game for example. Any required electrical power for electronics or sensors or output signals may be provided by batteries within housing 10, or via a connected cord or any other suitable power source. A combination of electrical power inputs may be used, and this would depend on the particular application for which the controller was designed.

As previously mentioned, housing 10 may be in numerous forms, for example, FIG. 8 is an illustration of housing 10 structured specifically for carriage 14 and trackball 12, and one which is structured to rest upon a support surface such as a table or desk when utilized, and this unit may be used to replace a typical mouse used with a computer. An optional extending portion 142 is shown indicated in dotted outline, and which is ergonomically designed as a wrist and forearm rest. The embodiment shown in FIG. 8 is also shown with two thumb select switches 144 and two finger select switches 146 (secondary input members) which may be included to be used as function select switches as is common on a trackball, mouse or joy stick. A further example of a useful housing 10 is shown in FIG. 9 wherein a hand held housing 10 sized and shaped to be grasped in a hand of a user while the user controls graphic images with the controller in accordance with the present invention is shown. This "remote control" style version of the invention may be direct wired with long flexible conductors to the host graphic image generation device (computer or television for example), but is preferably a wireless remote controller which sends information to the graphics generation device via wireless electromagnetic radiation indicated at 138. The FIG. 9 remote control is battery powered with a battery in compartment 134, and may include a scan or program window shown at 132 for allowing programming of internal electronics. This version may prove to be particularly useful with interactive television and interactive three-dimensional displays such as are commonly referred to as virtual reality displays, and most likely will include additional function keys 136 for on/off, volume, channel selection, special functions and the like.

FIG. 10 shows carriage 14 and trackball 12 (embodiment 9) housed in an otherwise relatively conventional computer keyboard 140. Embodiment 9 is shown replacing the arrow-keypad, although is can be incorporated into other areas of the keyboard 140. Embodiments 172 and 200, to be disclosed, can also be incorporated into a computer or like keyboard, and as will become appreciated.

Figure 11:
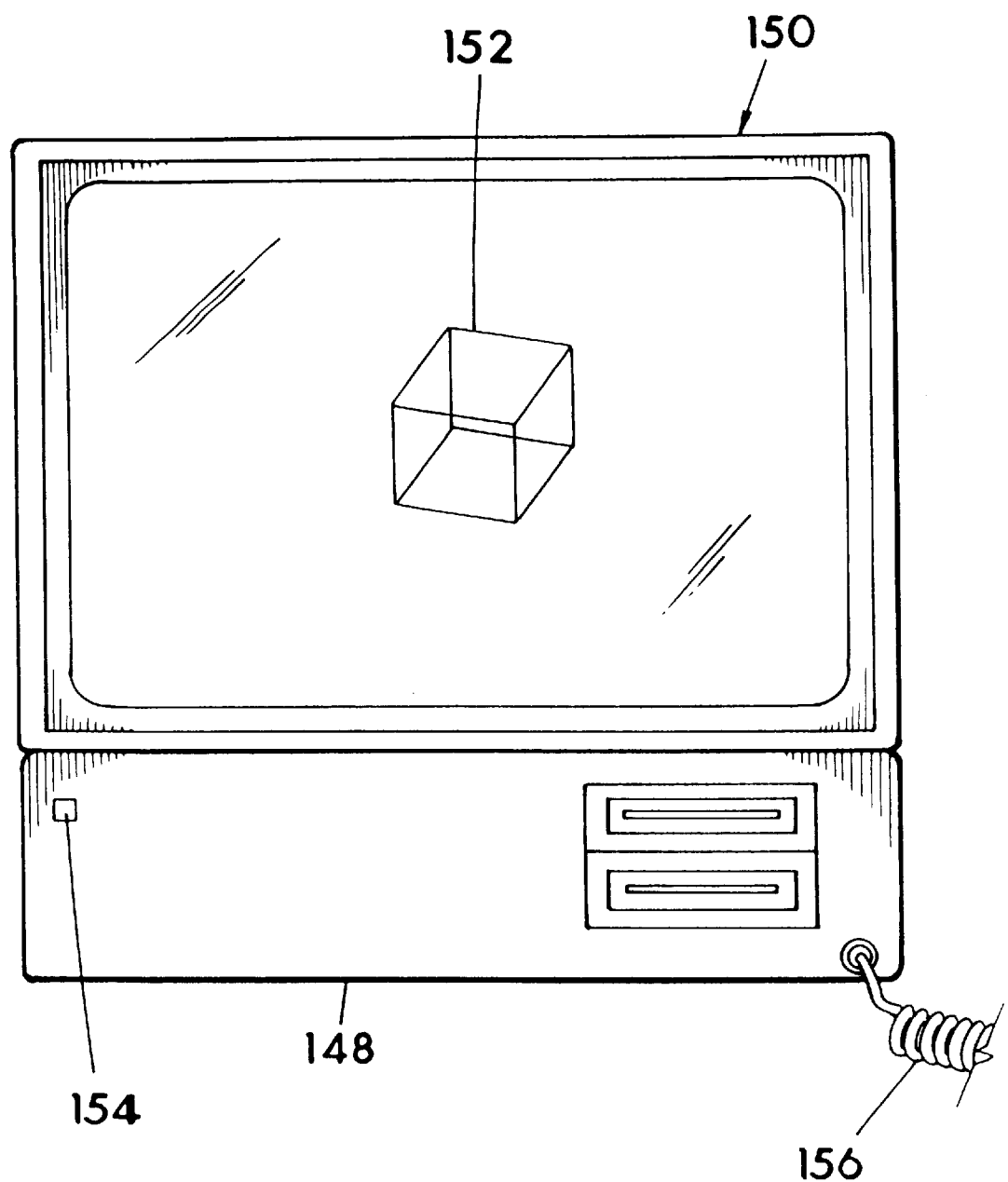
FIG. 11 represents a display such as a computer or television with display showing a cube displayed three dimensionally.

FIG. 11 represents a desk top computer 148 as an example of a graphic image generation device, and shown on the display 150 (computer monitor) is a cube 152 displayed three dimensionally. An electromagnetic signal receiver window is shown at 154 for receiving signals such as are sent via a wireless communicating version of the present invention such as that shown in FIG. 9. Alternatively the keyboard 140 of FIG. 10 could be connected to the host image generation device via flexible conductor set 156 to allow typical keyboarding when desired, and control of graphic images with the use of the present six degree of freedom controller when desired.

Figure 12:
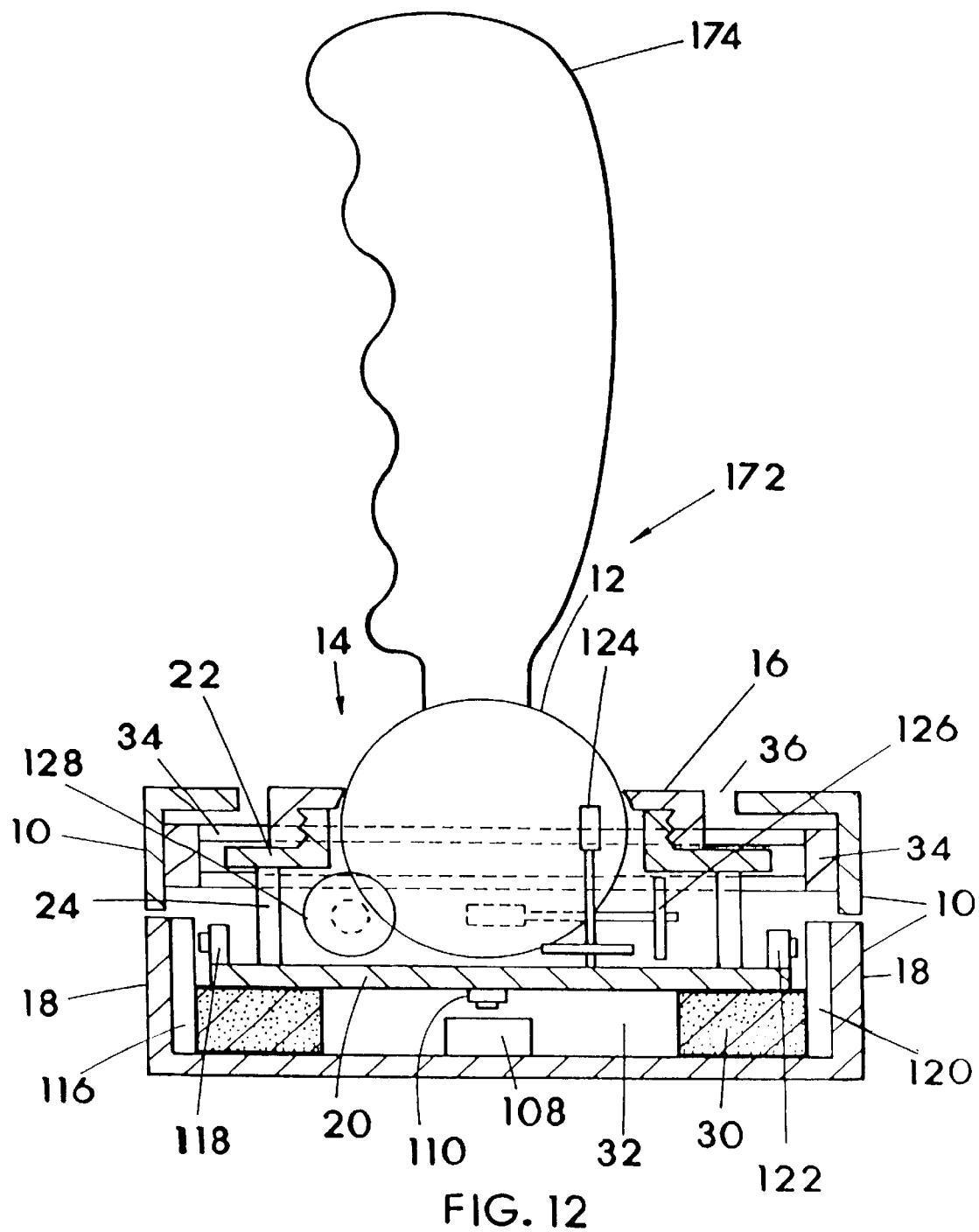
FIG. 12 is a partial cross-sectional end view of a joystick type embodiment of the invention. This embodiment is or can be structured identically to the FIG. 1 trackball embodiment, with the exception of an elongated graspable handle engaged on an exposed portion of the ball.

With reference now to FIG. 12, wherein a partial cross-sectional end view of a joystick type embodiment 172 of the invention is shown. Embodiment 172 is or can be structured identically to the FIGS. 1–3 trackball embodiment, with the exception of an elongated graspable handle 174 engaged, by any suitable connecting arrangement on an exposed portion of the ball 12, such as by integral molding or casting, or connecting with adhesives or screws, etc. Full 6 DOF (3D) is provided with embodiment 172, as the user grasps handle 174 and can control carriage 14 and ball 12 with linear and rotational forces applied to handle 174. The input member in embodiment 172 is considered handle 174, and the reference member is considered housing 10. Embodiment 172 can include housings in numerous shapes and sizes such as the housing 10 shown in FIGS. 8, 9 and 10 for example.

At this point in the description, it is believed those skilled in the art can build and use at least one embodiment of the invention, and further can build and use a trackball type and a joystick type embodiment in accordance with the present invention without having to resort to undue experimentation, however further joystick type embodiments in accordance with the present invention will be described to further exemplify the broad scope of the invention.

FIGS. 13–21 show variations on a joystick-type embodiment 200 which is a hand operated 6 DOF (3D) physical/mechanical to electrical converter for image control which has all 6 axes bi-directionally mechanically resolved in a pure fashion to the respective individual sensors representing each axis. Further embodiment 200 teaches all necessary sensors located within a handle 202. Embodiment 200 further teaches structuring enabling the possible location upon a single sheet of all necessary sensors for a 6 DOF (3D) controller device.

Figure 13:
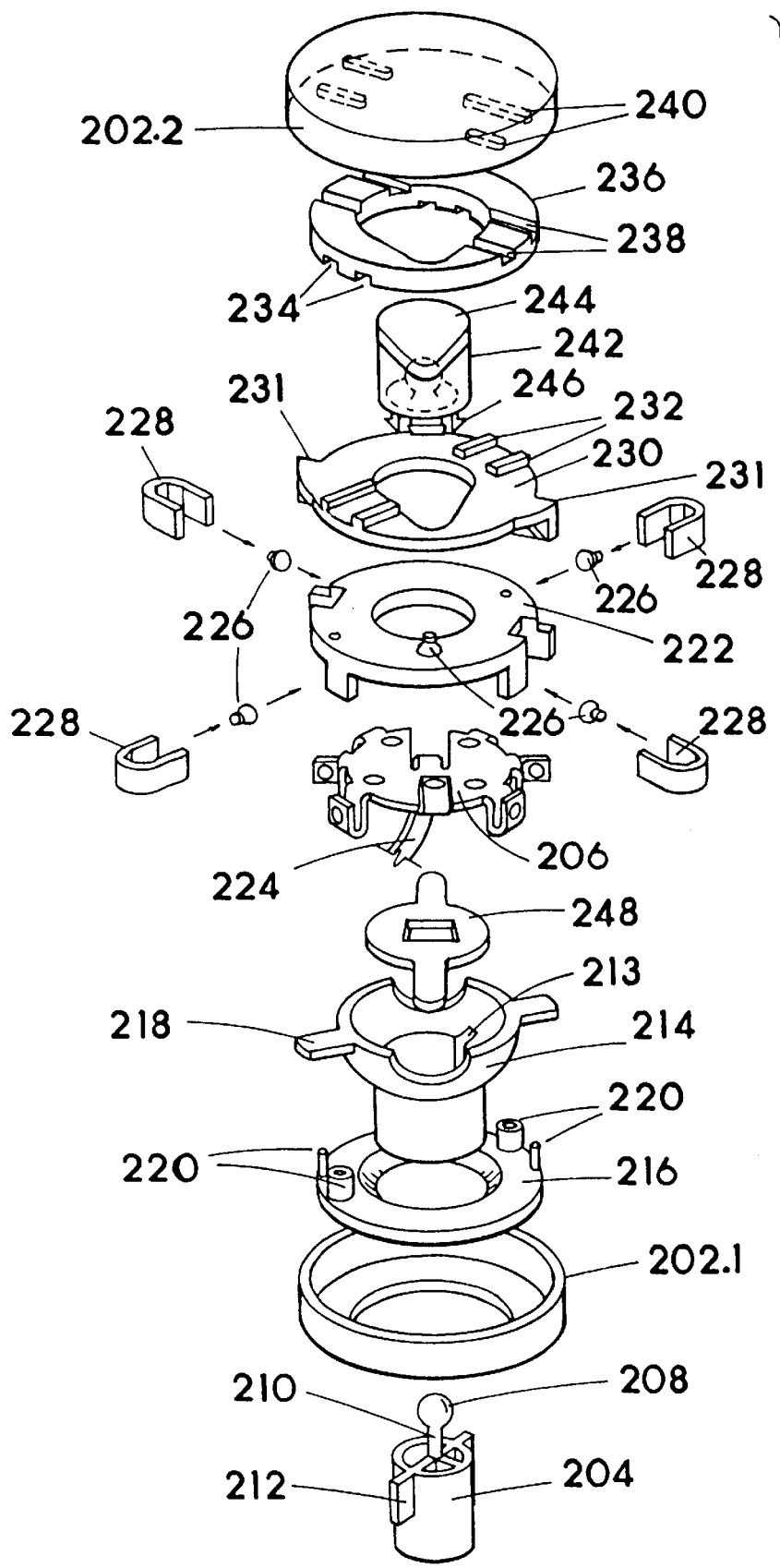
FIG. 13 shows an exploded view of another joystick embodiment of the current invention exhibiting structuring enabling use of a membrane sensor sheet.

FIG. 13 shows an exploded view of joystick embodiment 200 of the current invention exhibiting structuring enabling use of a membrane sensor sheet 206. All 6 DOF (3D) operations of the input member shown as joystick-type handle 202 (comprised of upper handle part 202.2 and lower handle part 202.1) relative to the reference member shown as shaft 204 are translated to specific locations on membrane sensor sheet 206.

Shown at the bottom of the drawing is shaft 204 which may or may not be mounted to many different base-type or other structures. Shaft 204 is shown as generally cylindrical and substantially aligned, for purposes of description, along the yaw axis. Shaft 204 is substantially hollow to allow passage of the membrane tail, wiring or electrically connecting material, and is made of a generally rigid and strong material such as injection molded acetal plastics or steel etc. Shaft 204 has fixed to one end a short extending pedestal 210 and fixed to pedestal 210 is pivot ball 208. Shaft 204 also has a yaw slide-rail 212. Slide-rail 212 is a component that serves to keep translator 214 from rotating relative to shaft 204 about the yaw axis while still allowing translator 214 to move vertically along the yaw axis. One skilled in the art will readily recognize variants in the specifically drawn and described structure after reading this disclosure. For example, slide rail 212 would not be necessary if shaft 204 were square shaped rather than cylindrically shaped.

Substantially surrounding but not directly connected to shaft 204 is a lower handle part 202.1 which is made of a substantially rigid material and is shown having a round short vertical outer wall and essentially flat bottom with a central large round cut out area to allow for movement of handle 202 relative to shaft 204. Lower handle part 202.1 is fixed, preferably by screws, to upper handle part 202.2 thus the two parts in unity form handle 202 which encompasses all the remaining parts of this embodiment. The flat bottom of lower handle part 202.1 is slidable horizontally along the pitch and roll axes relative to the essentially flat underside area of a first carriage member 216. First carriage member 216 has centrally disposed an aperture which is shown with edges forming a planar cut of a female spherical section which is rotatably slidably mated to a male spherical section of translator 214. Translator 214 has a vertical female cylindrical aperture and yaw slide rail slot 213 to mate with shaft 204 as previously described. Translator 214 additionally has at its upper edge two oppositely disposed anti-yaw tabs 218 which lay essentially in a horizontal plane described by the pitch and roll axes. Anti-yaw tabs 218 fit within substantially vertical slots formed by rising posts 220 which are fixed to and preferably mold integrally with carriage member 216. The functional result of anti-yaw tabs 218 working within the slots and the mating of the male spherical section of translator 214 with the female spherical section of carriage member 216 creates the mechanical result that while translator 218 is held substantially non rotatable relative to shaft 204, carriage member 216 is rotatable about the pitch and roll axes but not the yaw axis relative to both translator 214 and the general reference member shaft 204. Rising posts 220 fixedly connect first carriage member by screws, snap fit connectors, or other connecting means to a second carriage member 222 which may in some variations of this embodiment be a circuit board sheet supporting all necessary sensors, but as shown in the embodiment of FIG. 13 support sheet allows a formative and supportive backing for membrane sensor sheet 206. Second carriage member 222 is made of a rigid material such as, for example, injection molded acetal plastic and is shown in FIG. 13 as being essentially a flat circular plate with a circular cut out at its center and with six downwardly extending plate like structures (as shown) which serve as back supports for sensors located on flexible sensor membrane 206 which is bent or flexed (as shown) at appropriate locations to allow sensors to be positioned correctly between the second carriage member and the activating part for each individual sensor.

In association with the sensors, in a preferred embodiment, are resilient "tactile" return-to-center parts 226 (herein after "tactile RTCs 226") which are shown in FIG. 13 as rubber dome cap type activators. These tactile RTCs 226 are positioned between sensors and activating mechanical hardware so that when the input member is operated a specific piece of activating mechanical hardware, member, or part (which specific activating part depends on which specific sensor is being described) moves to impinge on the local tactile RTC 226 and compresses it. As the impinging/compressing force grows a force "break-over" threshold, inherent in the tactile RTC 226, is overcome and the force rapidly but temporarily decreases and the sensor is impinged and activated. This break-over tactile threshold can be achieved with numerous simple tactile structures, such as the rubber dome cap structures illustrated as RTCs 226 in FIG. 13, or metallic dome cap structures (which give an exceptionally strong clear feedback sensation) and other more complex spring based break over structures. These resilient break-over structures are typically used in the industry for simple on-off switches, such as the audible and tactile break-over switches commonly used to turn on and off lights in the home, and in the operation of typical computer keyboard keys.

I believe that my structuring enabling the use of this common break-over technology in a 6 DOF (3D) controller is a highly novel and useful improvement in the field of 3D graphic image controllers. Further, it can clearly be seen here, after study of this disclosure, that tactile break-over devices can also be used to great advantage in novel combination with proportional or variable sensors within my mechanically resolved 6 DOF (3D) controller structurings, and that this is a novel and very useful structure.

The resilient components RTCs 226, when compressed, are energized within their internal molecular structure, to return to the uncompressed state, thus when the user takes his hand off of the input member, or relaxes the force input to the input member then the resilient RTCs 226 push the mechanical parts of the controller back off of the sensor and toward a central null position of the input member. RTCs 226 serve to great advantage on all six axes in most joystick type controllers and on the three linear axes in the trackball type controller.

Figure 14:
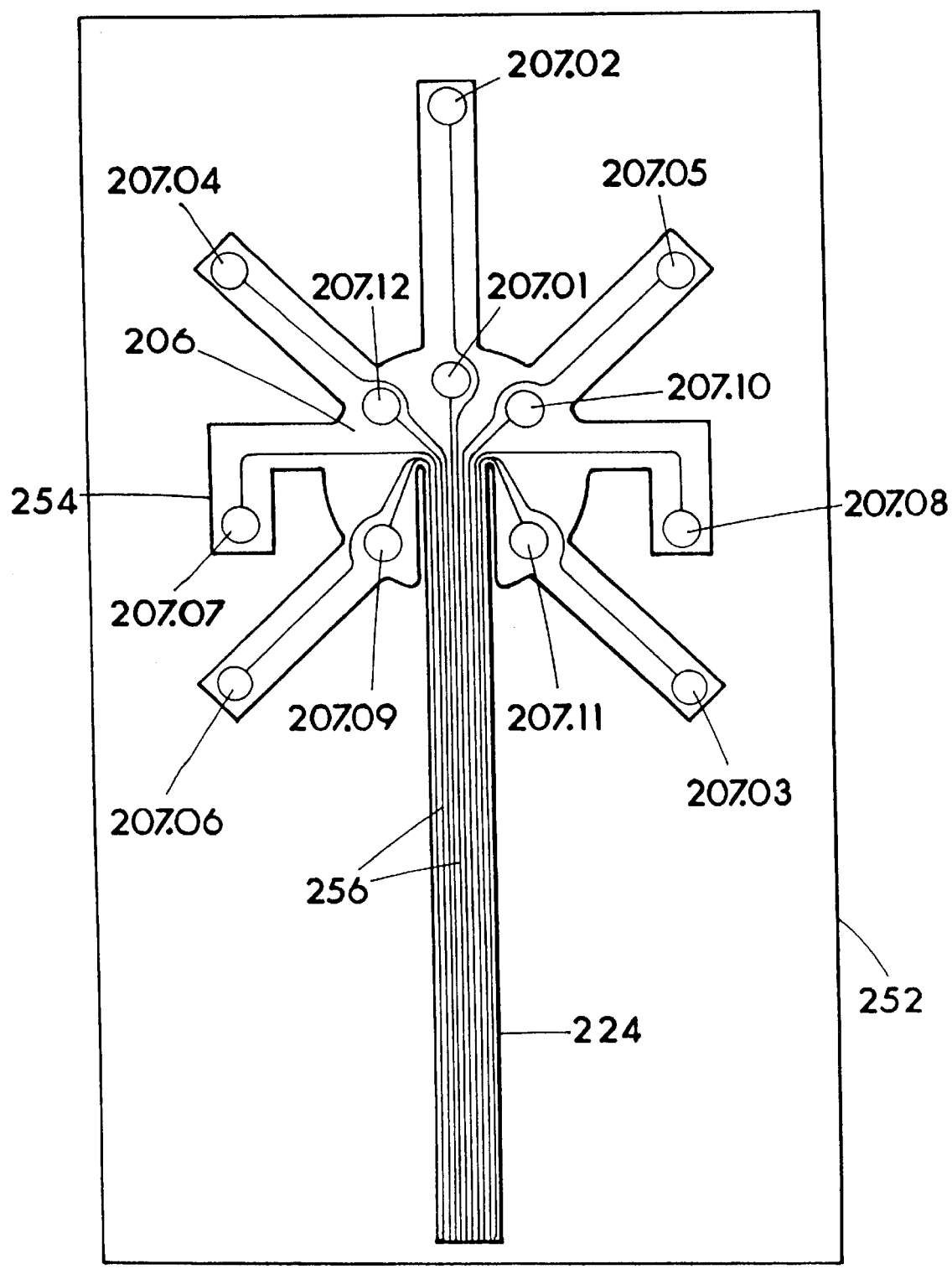
FIG. 14 shows a membrane sensor sheet in flat form.
Figure 15:
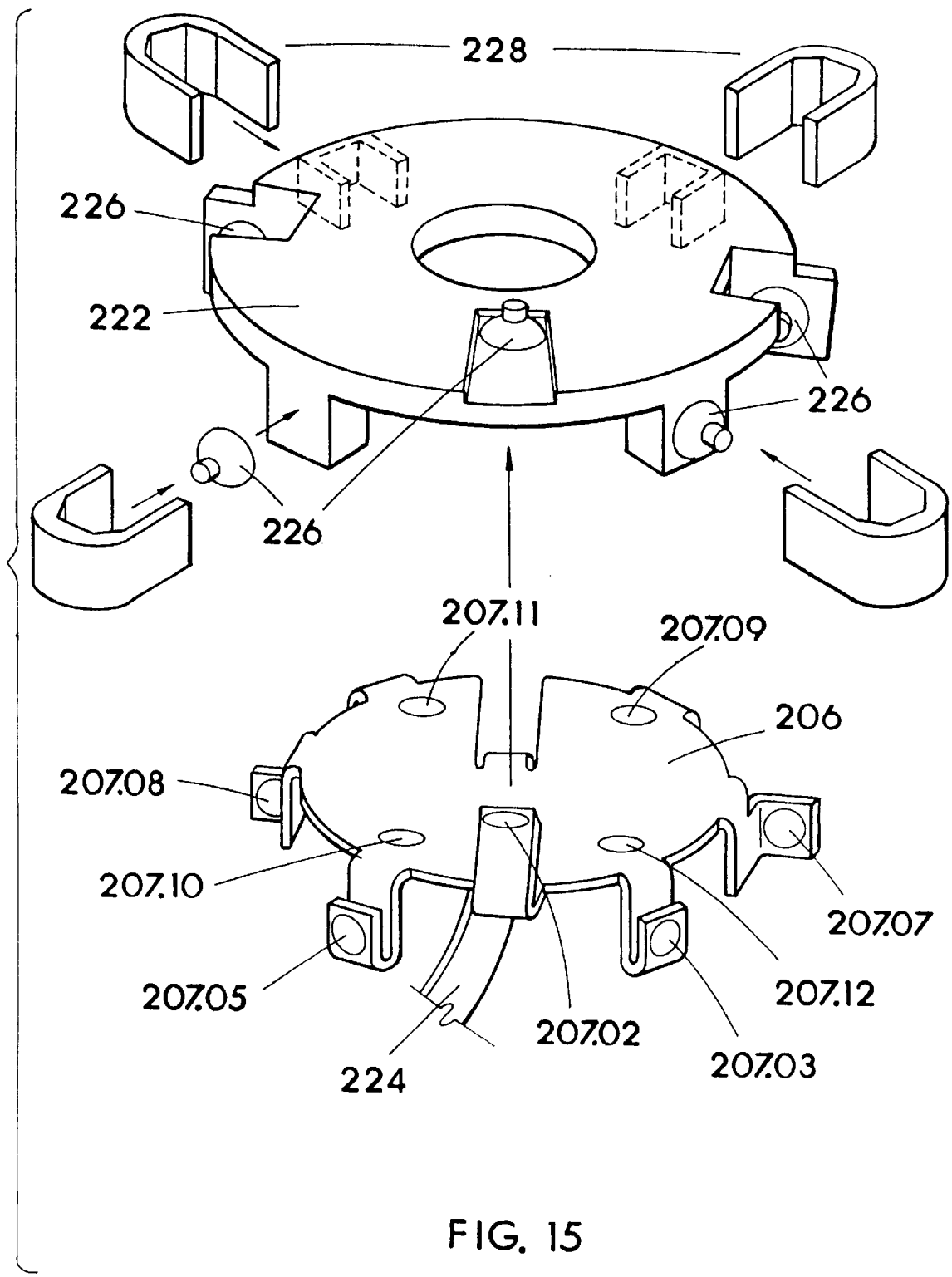
FIG. 15 shows a membrane sensor sheet in the folded 3-D configuration.

Positioned to activate sensors 207.03 through 207.06, as shown in FIGS. 14 and 15, are sliding actuators which are impinged upon by the inside surface of the outer wall of handle 202.

Above member 222 is a yaw translator plate 230 with an oblong central cut out (as shown) and distending plate-like members are two oppositely disposed yaw activators 231 which extend, when assembled, down through the illustrated slots of member 222 to activate sensors 207.07 and 207.08 when handle 202 is rotated back and forth about the yaw axis.

On the upper surface of plate 230 are fixed or integrally molded pitch slide rails 232 which are oriented substantially parallel to the linear component of the pitch axis, and fit into and slide within female complementary pitch slide slots 234 which are molded into the underside of anti-rotating plate 236 which is located above plate 230 and sandwiched between plate 230 and upper handle part 202.2. Anti-rotating plate 236 is a plate like structure with an oblong-shaped central cutout and on the upper surface are molded roll slide slots 238 which are substantially aligned with the linear component of the roll axis and through which slide roll slide rails 240 which are integrally molded on the inside surface of upper handle part 202.2.

Within the assembled embodiment 200 located at the approximate center of handle 202 is pivot ball 208 which is fixed to shaft 204. Pivot ball 208 is immediately surrounded on top and sides by the recess within a linear yaw axis translator 242 which is a substantially rigid structure having an oblong-shaped horizontally protruding upper activating arm 244 (as shown) and on its lower portion are snap-fit feet 246 or other attaching means or structures for fixing a lower activating arm 248 to the bottom of translator 242, thus pivot ball 208 becomes trapped within the recess within translator 242 by the attachment of lower activating arm 248 forming a classic ball in socket joint, wherein translator 242 is free to rotate about ball 208 on all rotational axes but not free to move along any linear axis relative to ball 208 and shaft 204.

FIG. 14 shows membrane sensor sheet 206 in flat form as it would appear after being printed with conductive pads for sensors 207 and conductive circuit traces 256 but prior to being cut from sheet stock along cut line 254.

FIG. 15 shows a larger clearer view of membrane 206 and second carriage member 222, with membrane 206 in the folded configuration as it would fit on the membrane support sheet 222 and the rubber dome cap tactile resilient activators 226 where they would rest upon membrane 206 each one above a sensor 207.

Figure 16:
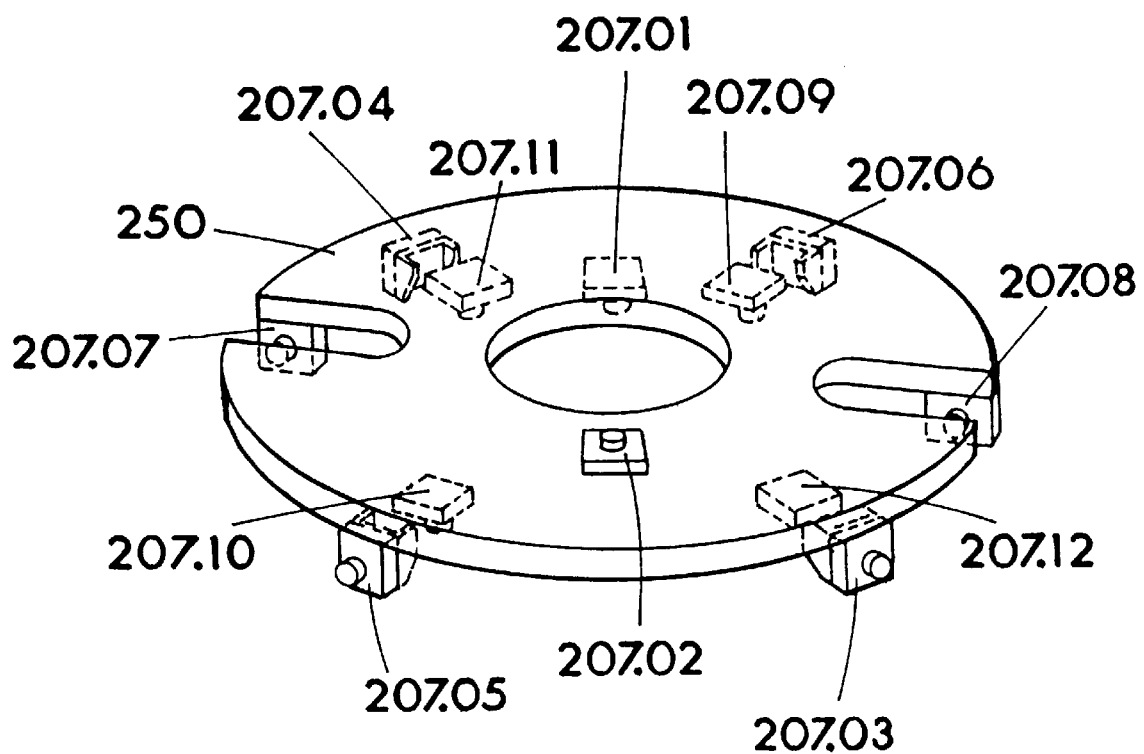
FIG. 16 shows all sensors in mechanical flat mount and right angle mount packages as they may be positioned on a rigid flat sheet, such as a circuit board sheet.

FIG. 16 shows all sensors 207 in mechanical packages having solder tangs that are solder mounted to the second carriage member, which in this case, specifically, is a rigid circuit board sheet 250. Sensors 207.01 through 207.12 are positioned essentially in the same locations as indicated in FIG. 13 and 14. The different sensor sheet technologies are shown to be interchangeable within the novel structuring of the invention. Substituting circuit board 250 into the embodiment shown in FIG. 13 replaces the parts shown in FIG. 15, specifically, membrane 206, second carriage member 222, sliding actuators 228 and rubber dome caps 226 can all be replaced by the structure of FIG. 16.

Whether on membrane sheet 206 or circuit board 250 specific sensors 207 are activated by the following movements and rotations with the respective structures described here:

linear input along the yaw axis in the positive direction (move up) causes sensor 207.01 to be activated by upper activating arm 244, linear input along the yaw axis in the negative direction (move down) causes sensor 207.02 to be activated by lower activating arm 248, linear input along the roll axis in the positive direction (move forward) causes sensor 207.03 to be activated by the inner surface of the outer wall of handle 202, (with rubber dome cap 226 and slide 228 on membrane variation), linear input along the roll axis in the negative direction (move back) causes sensor 207.04 to be activated by the inner surface of the outer wall of handle 202, (with rubber dome cap 226 and slide 228 on membrane variation), linear input along the pitch axis in the positive direction (move right) causes sensor 207.05, to be activated by the inner surface of the outer wall of handle 202, (with rubber dome cap 226 and slide 228 on membrane variation), linear input along the pitch axis in the negative direction (move left) causes sensor 207.06, to be activated by the inner surface of the outer wall of handle 202, (with rubber dome cap 226 and slide 228 on membrane variation), rotational input about the yaw axis in the positive direction (turn right) causes sensor 207.07 to be activated by yaw activator 231, rotational input about the yaw axis in the negative direction (turn left ) causes sensor 207.08, to be activated by yaw activator 231, rotational input about the roll axis in the positive direction (roll right) causes sensor 207.09 to be activated by the top edge of translator 214, rotational input about the roll axis in the negative direction (roll left) causes sensor 207.10 to be activated by the top edge of translator 214, rotational input about the pitch axis in the positive direction (look down) causes sensor 207.11 to be activated by the top edge of translator 214, rotational input about the pitch axis in the negative direction (look down) causes sensor 208.12 to be activated by the top edge of translator 214.

Figure 17:
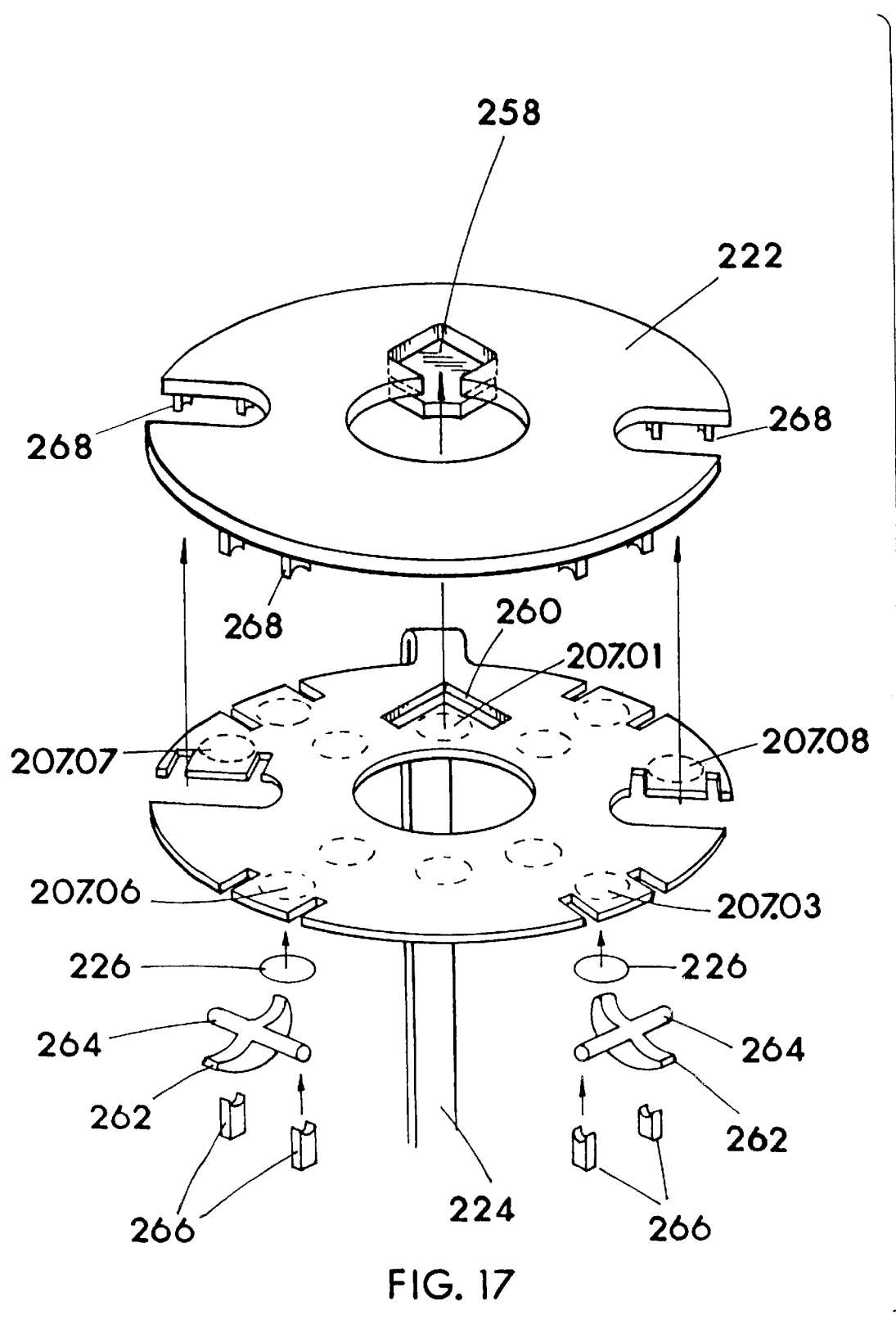
FIG. 17 shows a membrane sensor sheet in a variation where all 6 DOF (3D) sensors are positioned on a flat plane.

FIG. 17 shows membrane 206 in a variation where all 6 DOF (3D) sensors 207 are positioned on a flexible membrane sensor sheet and positioned on a single flat plane. All sensors are activated by structuring acting on membrane 206 from the lower side as membrane 206 is pressed up against the second carriage member 222, except for sensor 207.01 which is activated by structure from above pressing sensor 207.01 down against a recessed support shelf 258 which is integrally molded as part of plate member 222. Shelf 258 is molded in such a way as to leave at least one side, and as drawn two sides, open so that sensor 207.01 can be slid through the open side during assembly to rest on recessed support shelf 258. Sensor 207.01 having a cut-out 260 near at least two edges of sensor 207.01 thus allowing positioning of membrane 206 with all sensors 207 on an essentially single plane. Sensors 207.03 through 207.08 which were flexed into right angle positioning in the variation of FIGS. 13–15 are now all on the same plane and each is impinged upon and activated by right angle translation structuring shown as a rocker-arm activator 262 which pivots on an integrally molded cylindrically shaped fulcrum 264 which is held in position by saddle shaped upward protrusions 266 fixed to first carriage member 216 and saddle shaped downward protrusions 268 fixed to second carriage member 222. This right angle translation structuring works as follows: For example, if input member handle 202 is pressed to move along the roll axis in a positive manner then a flattened area along the inside surface of the outer wall of handle 202 impinges upon the lower portion of rocker-arm activator 262 causing activator 262 to pivot about fulcrum 264 and the upper part of activator 262 impinges upon tactile resilient activator 226 (shown here as a metallic dome cap) until sufficient force has built to allow tactile actuator 226 to "snap through" and come to bear upon and activate sensor 207.03. These structures do not have to have "snap through" or tactile turn-on resilient structuring to be fully functional, but this tactile turn-on resilient structuring is believed to be novel in 6 DOF controllers and highly advantageous in the feedback it offers to the user.

Figure 18:
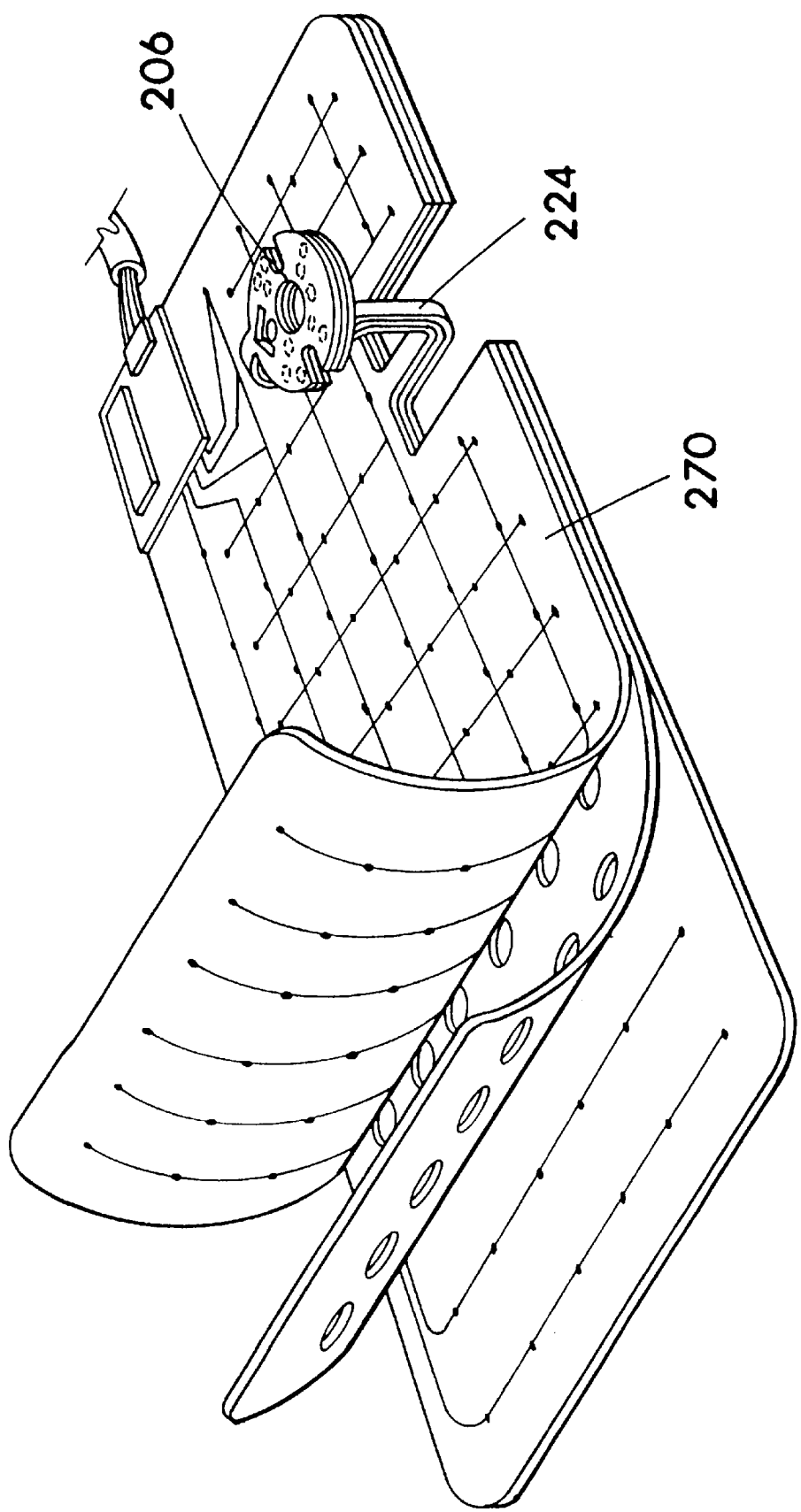
FIG. 18 shows structuring of the membrane sensor sheet as described in FIG. 17 as a novel appendage on an otherwise conventional membrane sensor sheet such as is found in a typical modern computer keyboard.

FIG. 18 shows structuring of membrane 206, as described in FIG. 17, integrated into an otherwise typical computer keyboard membrane 270 by connection of membrane tail 224 to keyboard membrane 270 (which may be structured of the common three layer membrane structuring, or single layer membrane structuring, or any other type). In this embodiment shaft 204 is fixed to keyboard housing 10 (shown in FIG. 19) and for assembly membrane 206 is rolled up and inserted through shaft 204 and then unrolled where it is positioned against member 222.

Figure 19:
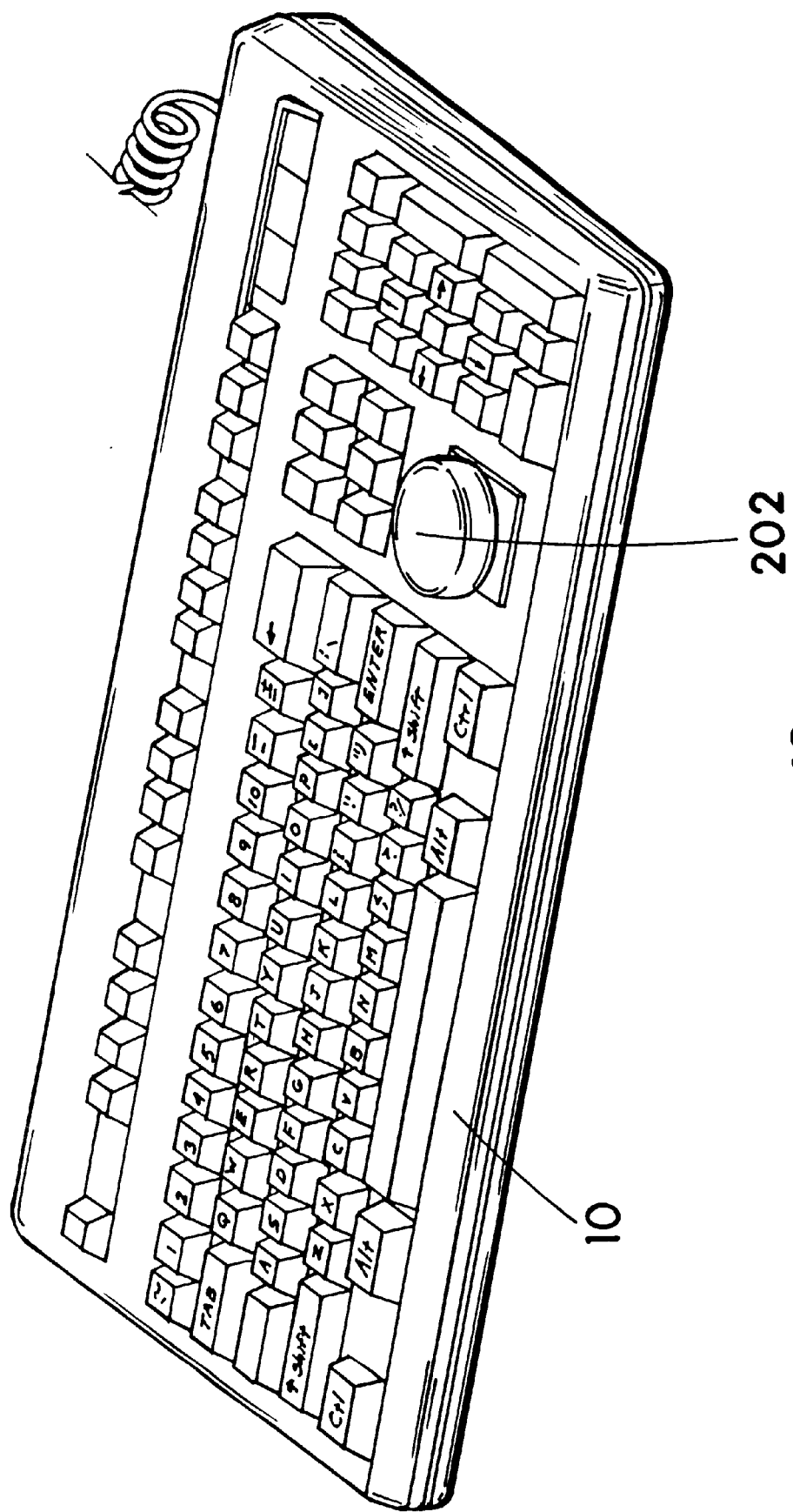
FIG. 19 shows an external view of a 6 DOF (3D) controller in accordance with the present invention positioned where the arrow key pad would be on an otherwise common computer keyboard housing.

FIG. 19 shows an external view of a 6 DOF (3D) handle 202 positioned where the arrow key pad would be on an otherwise common computer keyboard housing 10. With the current structuring many different positionings of a 6 DOF (3D) handle on a keyboard are possible, such as positioning handle 202 in the area normally occupied by the numeric keypad, or on an ergonomically designed keyboard having the large key bank of primarily alphabetic keys divided into two banks angled apart positioning of handle 202 between the two alphabetic key banks is a distinct possibility, etc. Further, in the common keyboard the 6 DOF (3D) operations can or cannot emulate keys such as the arrow keys when handle 202 is operated appropriately. An optimum keyboard may have proportional sensors built into the membrane and output both proportional and simple switched data. For example, an optimum keyboard may sense a certain handle 202 movement and send out both a scan code value representing an appropriate key stroke (such as an arrow key value) and the keyboard may also output a proportional value representing how intense the input operation is being made.

FIGS. 20–31 show another preferred embodiment exhibiting two planar structuring. Two planar design offers some advantages. Such a device still has all the benefits of a pure mechanically resolved device and with two planar execution additional benefits are realized, such as: the capability of exceptionally low profile design for integration into computer keyboards and hand held remote controllers, ready integration of finger operated buttons on the handle for operating sensors incorporated into the sensor sheet, space to place active tactile feedback means in a still small handle, etc. An example of an active tactile feedback means is an electric motor with shaft and offset weight within a handle for providing active tactile feedback, as shown in drawing FIG. 21.

Figure 20:
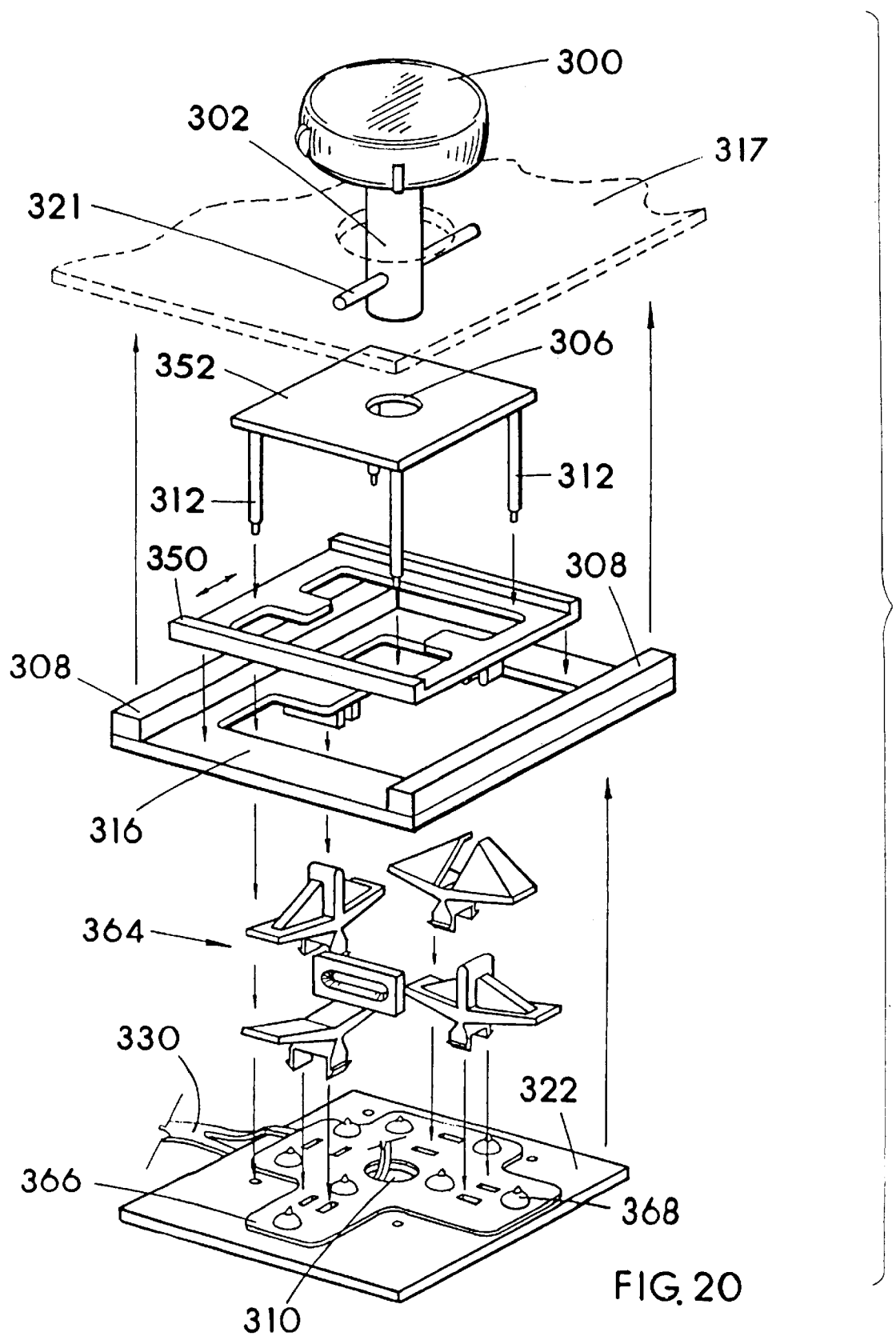
FIG. 20 shows an exploded view of a two-planar embodiment having rocker-arm actuators.
Figure 21:
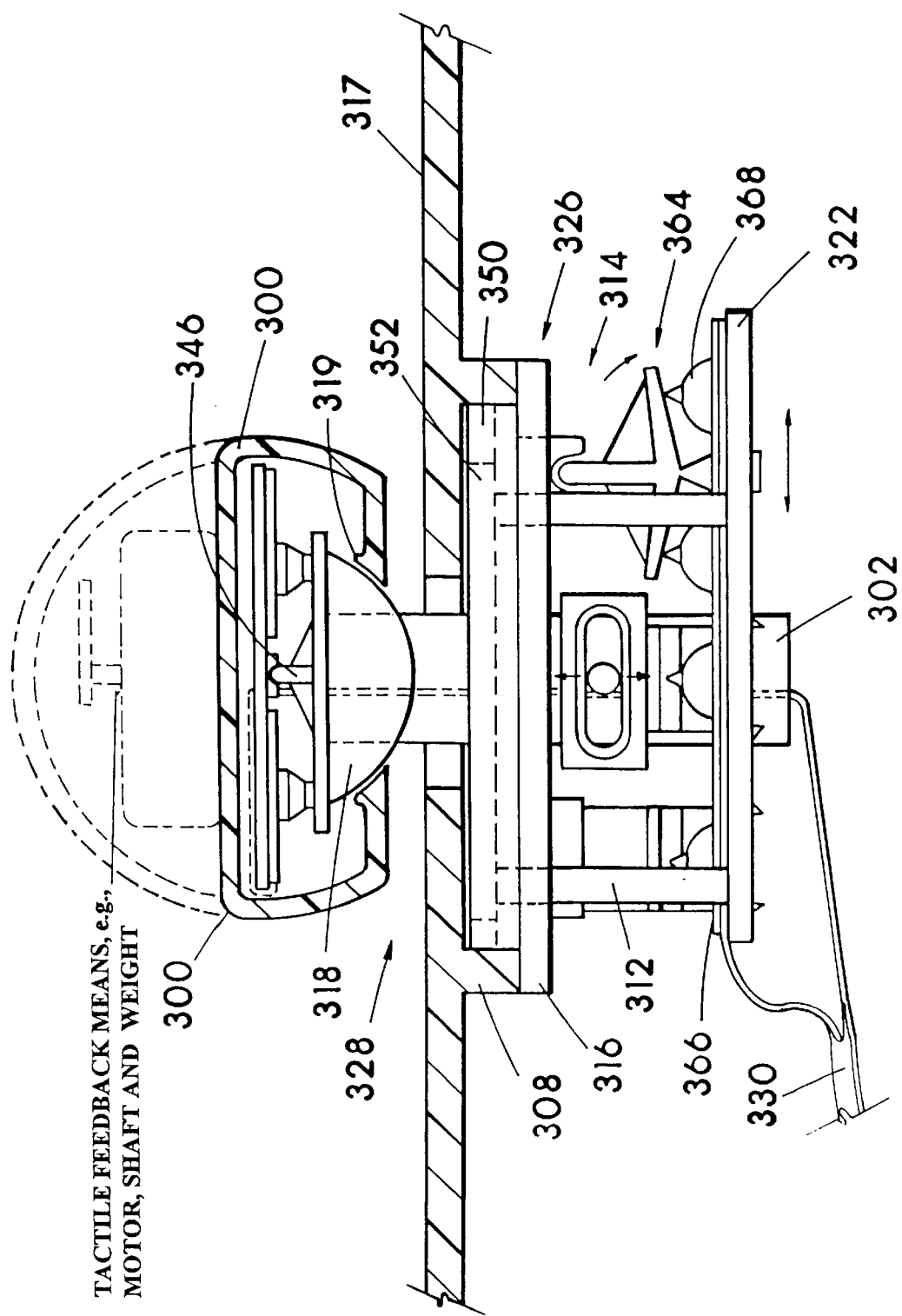
FIG. 21 shows a side view of the embodiment of FIG. 20.

Referring to FIG. 20, an input member which is shown as a hand manipulatable handle 300 is shown supported on a shaft 302. Shaft 302 extends into a base or reference member housing 317. Shaft 302 passes through a shaft guide first main hole 306 within a sliding plate or platform called a first platform 352. Shaft 302 further passes through a shaft guide second main hole 310 located in a second platform 322. FIG. 21 shows Platform 322 fixedly attached to connecting structure shown as legs 312 which are fixed to first platform 352, thus platform 322, connecting structure 312 and platform 352 cooperate together forming the structure of a carriage 314.

First platform 352 is slidably retained along a first axis by a sliding plate called an anti-rotating plate 350 which is slidably retained along a second axis by at least one housing guide 308 which is fixed to housing 317. First platform 352 and plate 350 are further constrained by retaining shelf 316 and housing 317 from linear movement along the yaw or third axis. Thus plate 350, guide 308, housing 317, and shelf 316 cooperate to form a carriage support structure 316 in which platform 352 (and thus also carriage 314) is prohibited from significantly rotating on any axis, and also is allowed to linearly move significantly along the first and second axes (pitch and roll axes) but is prohibited from significant movement along the third axis, relative to housing 317.

Within carriage 314, and platforms 352, 322, holes 306 and 310 cooperate to offer sufficient fit in the passage of shaft 302 to provide advantageous structural cooperation in two substantial ways. The first is the provision of an anti-tilting structure 324 which prevents shaft 302 from significant tilting (rotating about the first or second axes) relative to carriage 314. The second is provision of two-axes structure where any and all linear movement along parallel to the first and second axes (linear along length of pitch and roll axes) by shaft 302 is coupled to equivalent movement along parallel to the first and second axes of carriage 314.

A second endward region of shaft 302 as shown in FIG. 21 is shaped with a male partial spherical shape 318 which slideably contacts a complimentary female partial spherical shape 319 which is part of handle 300, and shaft 302 also comprises a male pivot protrusion having a pivot or rotational point located approximately central to handle 300 and approximately at the center of the spherical partial section shapes. Protrusion 346 provides a pivot point for handle 300 and may mate to a female pivot receptacle. Thus handle 300 can be rotational relative to shaft 302 yet coupled for all linear movement along parallel to the first and second axes with equivalent linear movement of shaft 302 and also two-axes structure 326, therefore the above mentioned members connecting handle 300 to shaft 302, and shaft 302 to carriage 314 serve as a handle support structure 328 in which handle 300 is coupled for equivalent movement with carriage 314 along parallel to the first and second axes.

On carriage 314 are rocker-arm structures 364 shown mounted on second platform 322. Rocker-arm structures 364 convert movement of carriage 314 relative to housing 317 to a resilient thermoplastic rubber (TPR) sheet 366 formed with a plurality of "tactile" resilient dome cap structures 368. Resilient sheet 366 and second platform 322 sandwich sensors supported on a membrane sensor sheet 330.

Figure 22:
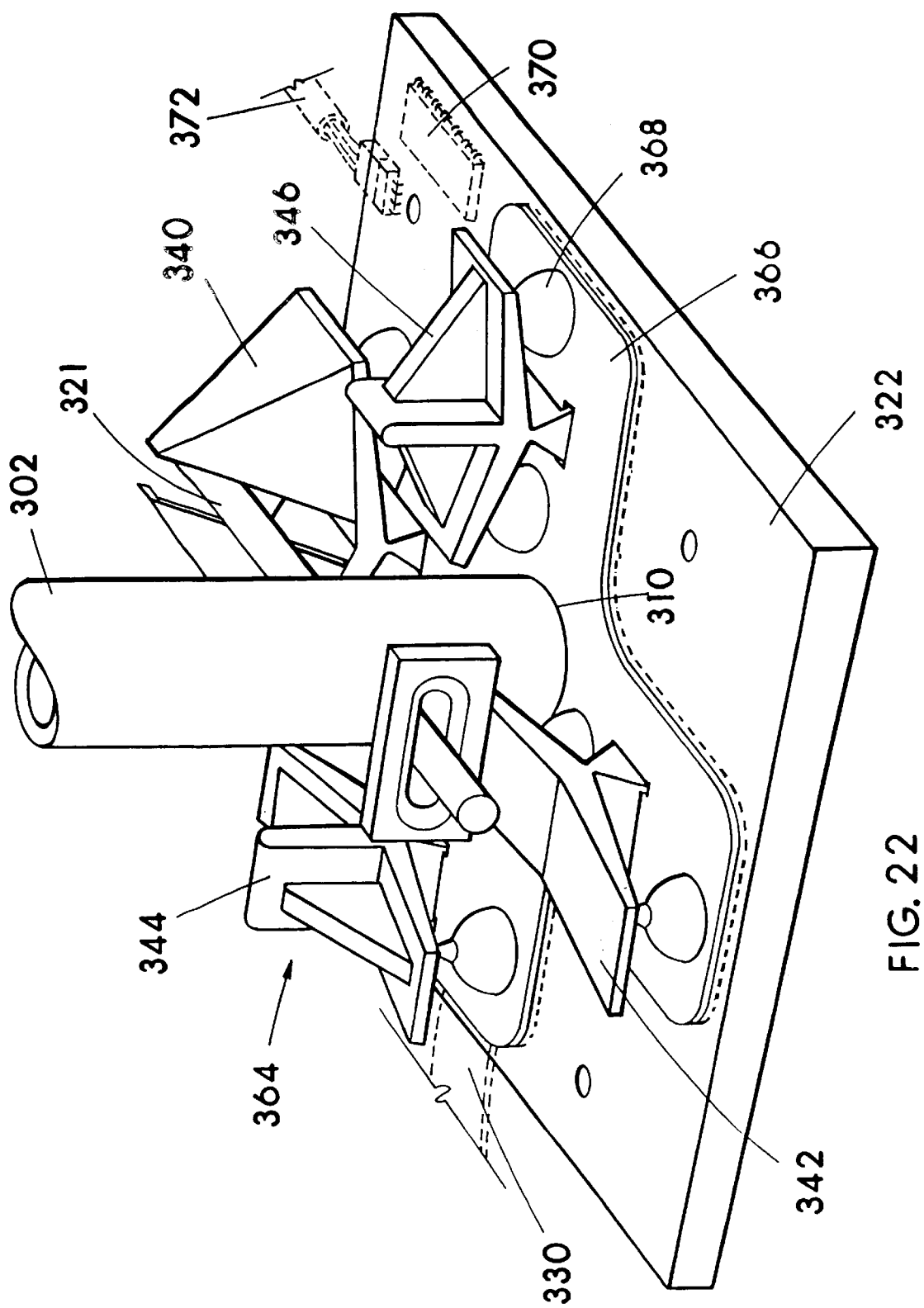
FIG. 22 shows a perspective view of the rocker-arm actuators of the embodiment of FIGS. 20–21.

FIG. 22 shows the positioning of four rocker-arm structures 364 as they are mounted on second carriage part 322 which is shown as a substantially flat plate that might be manufactured as a traditional printed circuit board sheet bearing on-board sensors and containing on-board active electronic circuitry 370 and a cable 372 for routing data to a graphics display device, or as a flat rigid plate-like structure supporting a flexible membrane sensor sheet 330. Shown on top of and essentially parallel to plate 322 is rubber sheet 366 having a multiplicity of tactile resilient rubber dome cap type actuators 368.

Figure 24:
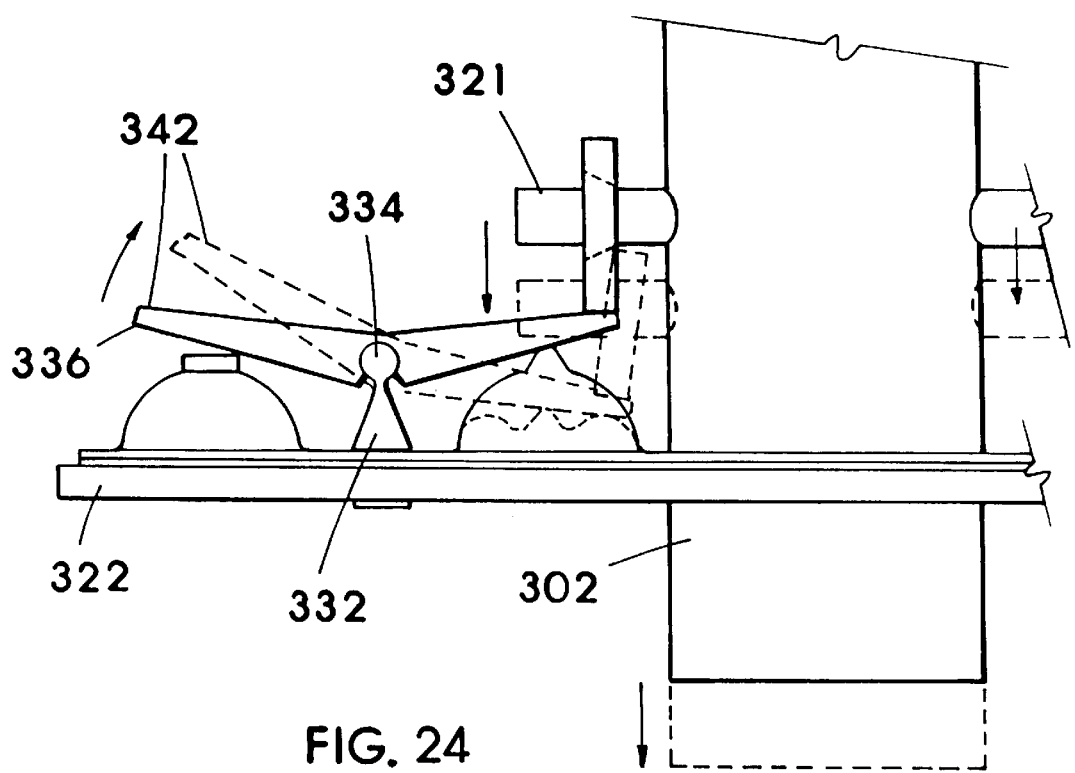

Rocker-arm structures 364 have at least the following structure: a mounting structure 332, which is structure essentially fixed to carriage 314 and is illustrated as a snap-fit design having two legs which snap into slots within plate 322; a fulcrum 334, illustrated in all figures as a living hinge located at the top of mounting structure 332 except in FIG. 24 where fulcrum 334 is illustrated as a more traditional cylindrical bore-and-core type hinge; at least one sensor actuating arm 336, and in all drawings rocker-arm structures 364 are illustrated as commonly having two arms for actuating two sensors one on each side of mount 332, except in drawings 26 and 27 where are illustrated one-armed variants; and finally rocker-arm structures 364 have a super-structure 338 by which the rocker-arm is activated or caused to move against and actuate the associated sensor(s). Super-structure 338 is the distinctive part of the different two armed rocker-arm types shown in FIGS. 20–22, of which are a V-slot type 340, an H-slot type 342, and a T-bone type 345 of which there are two rocker-arms being approximately identical but oriented perpendicular to one another and being called a first t-bone 344 and a second t-bone 346 rocker-arm actuators.

Figure 23:
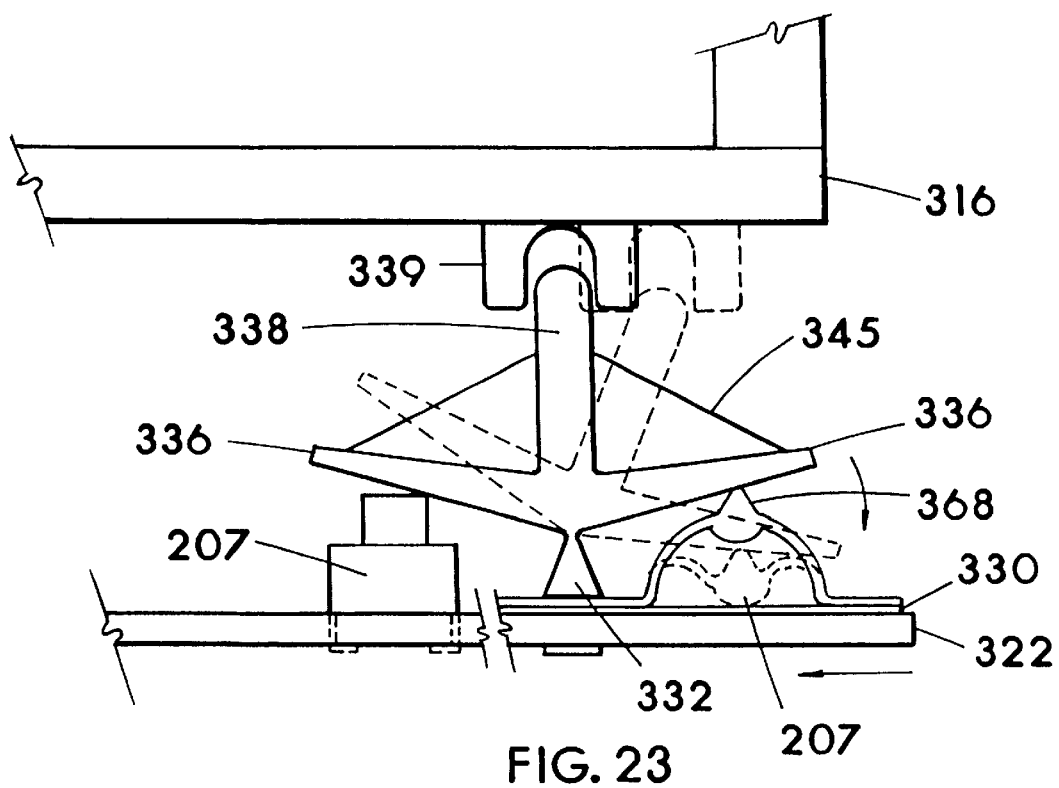

FIG. 23 shows T-bone actuator 345 mounted to plate 322 by mounting structure 352 and pivoting (shown actuating sensor in dashed lines) about fulcrum 334 shown as a living hinge which is connected to the bottom of two oppositely disposed actuating arms 336 above which is fixed super-structure 338 which is activated into motion by a activating receptacle 339 that is fixed to the reference member base or housing 10 by way of retaining shelf 316. Under the opposite side of actuator 345 from dome cap 368 (which is shown in dashed lines as being depressed and thus actuating sensor 207 located on flexible membrane sensor sheet 330) is illustrated a packaged mechanical sensor 207 soldered to a flat circuit board sheet. Thus, FIGS. 22 and 23 clearly show how the same inventive structurings can translate mechanical or physical inputs to either a flexible membrane sensor sheet or to a rigid circuit board sensor sheet.

FIG. 24 shows H-slot actuator 342 as it is activated by shaft pin 321 which is fixed within shaft 302. As shaft 302 moves vertically or along the yaw or third axis then so in unison moves shaft pin 321 and actuator 342.

A first end of shaft pin 321 passes through a beveled slot within super structure 338 of rocker-arm H-slot type 342 in which the slot is approximately perpendicular to the third axis and the length of shaft 302, so that when shaft 302 and shaft pin 321 move along the third axis rocker-arm 342 is moved in kind with one arm descending to compress its respective resilient dome cap 368 and upon collapse of dome cap 368 the respective underlying sensor is actuated, as shown in FIG. 24. Of course movement of shaft 302 in the opposite direction along the third axis likewise actuates the opposite complimentary sensor of the sensor pair. Rotation within operational limits of shaft 302 about its cylindrical center or approximately about the third axis simply causes shaft pin 321 to move within the slot and does not activate the H-type rocker-arm 342.

FIG. 25 shows activation of V-slot actuator 340. A second end of shaft pin 321 passes through a slot of V-slot rocker-arm 340 which is activated in the converse of the above H-slot rocker arm 342. Movement of shaft 302 along the third or yaw axis simply causes shaft pin 321 to move within the slot and not actuate V-type rocker-arm 340, but rotation about the third axis causes shaft pin 321 to activate rocker-arm 340 in the following manner. Rotational motion of shaft 302 conveyed to shaft pin 321 activates rocker-arm 340 causing compression of dome cap 368 and stimulation of the sensor located on the membrane. Super structure 338 of rocker-arm 340 has a slot in structure slanting away from shaft 302. This is to accommodate the increasing movement of pin 321 as it may change in distance from fulcrum 334 when shaft 302 is moved along the third axis. Thus the slope of the slot compensates for varying effectiveness of shaft pin 321 so that rotation of shaft about the third axis causes rotationally equivalent activation of rocker-arm 340 regardless of the distance shaft pin 321 is from fulcrum 334 of rocker-arm 340.

FIGS. 26 and 27 show space savings structuring for the area of second platform 322. This space savings may be valuable in tightly constricted areas such as integration of the invention into computer keyboards and hand held remote control devices. The layout of second platform 322 as illustrated in FIGS. 20–22 is shown by a dashed line indicating the original larger perimeter 370 the area of the newer smaller platform 322 shown by solid line 372 and first t-bone rocker-arm 346 has been divided into two separate one-armed type 348 actuators each with its own mount 332, fulcrum 334, sensor actuating arm 336, and super structure 338.

Figure 28:
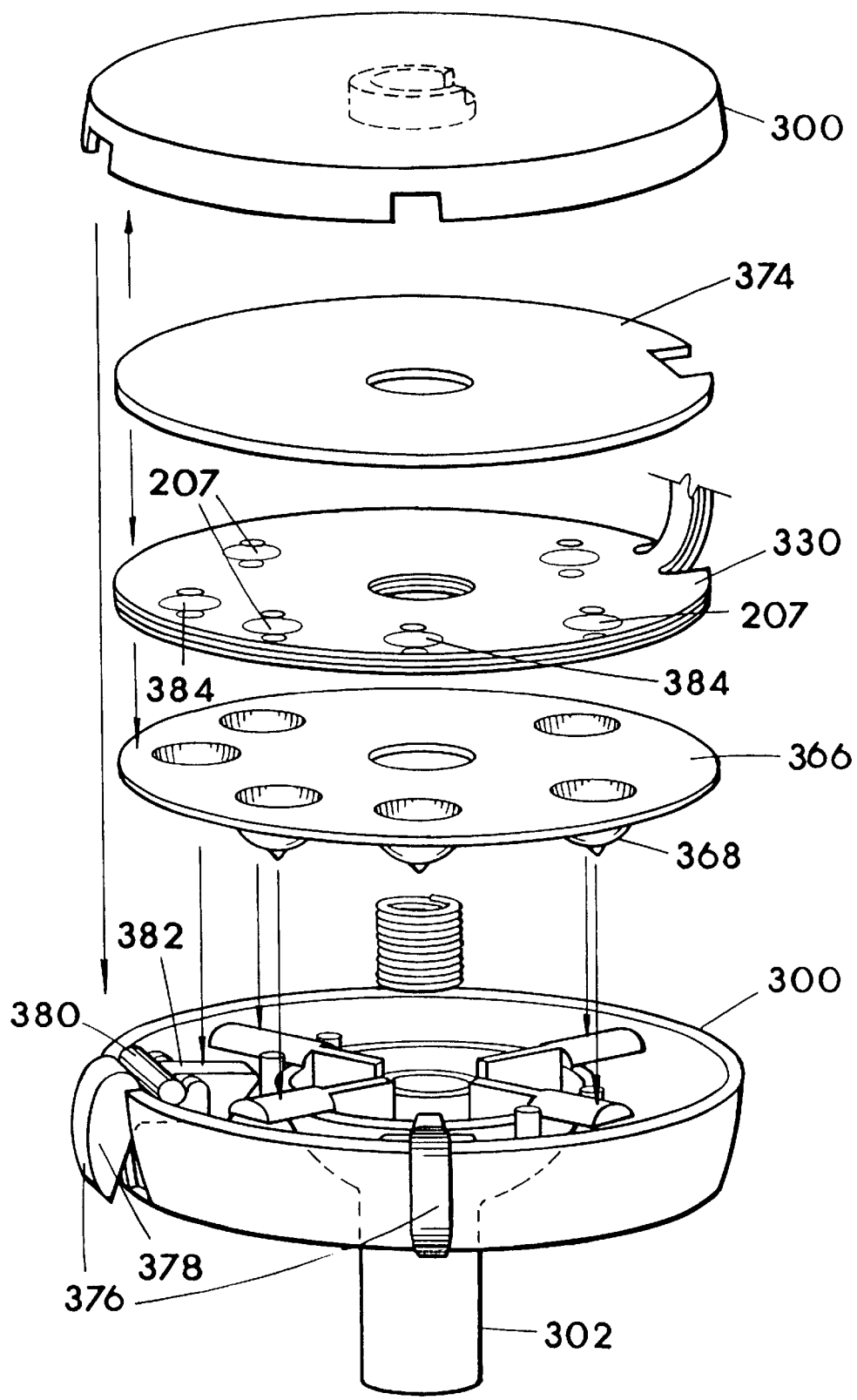
FIG. 28 shows an exploded view of the handle of the embodiment of FIGS. 20 and 21.

FIG. 28 shows structuring within handle 300 for support and activation of sensors 207 supported on sensor membrane sheet 330 which may be supported within the inside upper portion of handle 300 or as shown here supported by a rigid support sheet 374 the appendage of membrane 330 passes through shaft 302. Also shown here are two buttons 378 for operation by the user's fingers. Buttons 378 have an exterior activating surface area 378 which can be depressed by the user's finger(s) causing button structure 376 to rotate about an integrated cylindrical fulcrum 380 which rests within saddle supports fixed to handle 300. The pivoting motion of button 376 causes the internal sensor actuating part 382 to rise against resilient dome cap 368 and activate sensor(s) 384. This button structuring is similar to that shown in FIG. 17 with the exception that the structuring of FIG. 17 is completely internal while this design has the button externally operated for additional input (other than 6 DOF (3D) input) by the user's finger(s).

Figure 29:
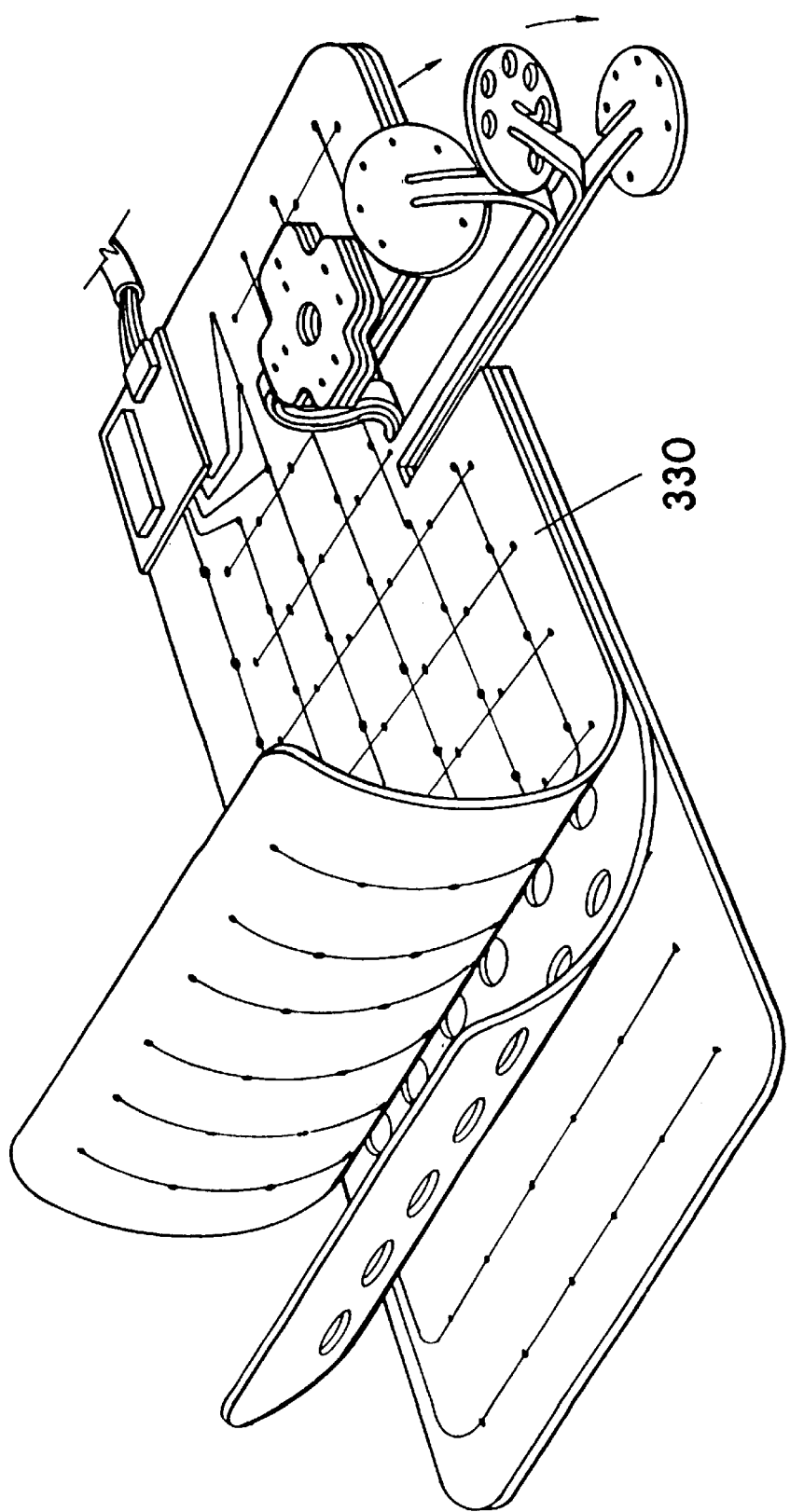
FIG. 29 shows an otherwise typical computer keyboard membrane with custom appendages to fit into and be actuated by the structures of the embodiment shown in FIGS. 20–28 located in the arrow pad region of an otherwise typical computer keyboard.

FIG. 29 shows a sensor membrane 330 of a three layer traditional computer keyboard type, but with the inventive exception of having two additional appendages designed for fitting into the two planar structure design shown in FIGS. 20–28 for incorporation in a keyboard as shown in FIG. 19. The appendage having the longer attachment and a rounded head passes from inside the keyboard housing 10 up through the shaft and into the handle and the other appendage resides on carriage part 322 within housing 10.

Figure 30:
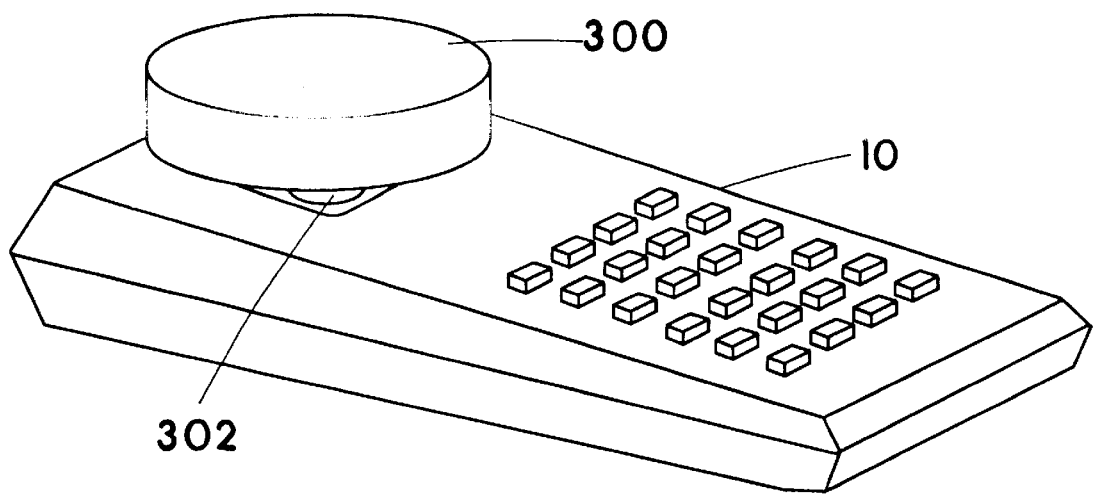
FIG. 30 shows a perspective view of a 6 DOF (3D) handle integrated into an otherwise typical remote control device such as are used to control TVs, VCRs, Cable Boxes, and some computers, etc.

FIG. 30 shows 6 DOF (3D) input member handle 300 integrated with shaft 302 fixed to housing 10 of an otherwise normal wireless remote control device, such as for operating a television, or other device, etc.

Figure 31:
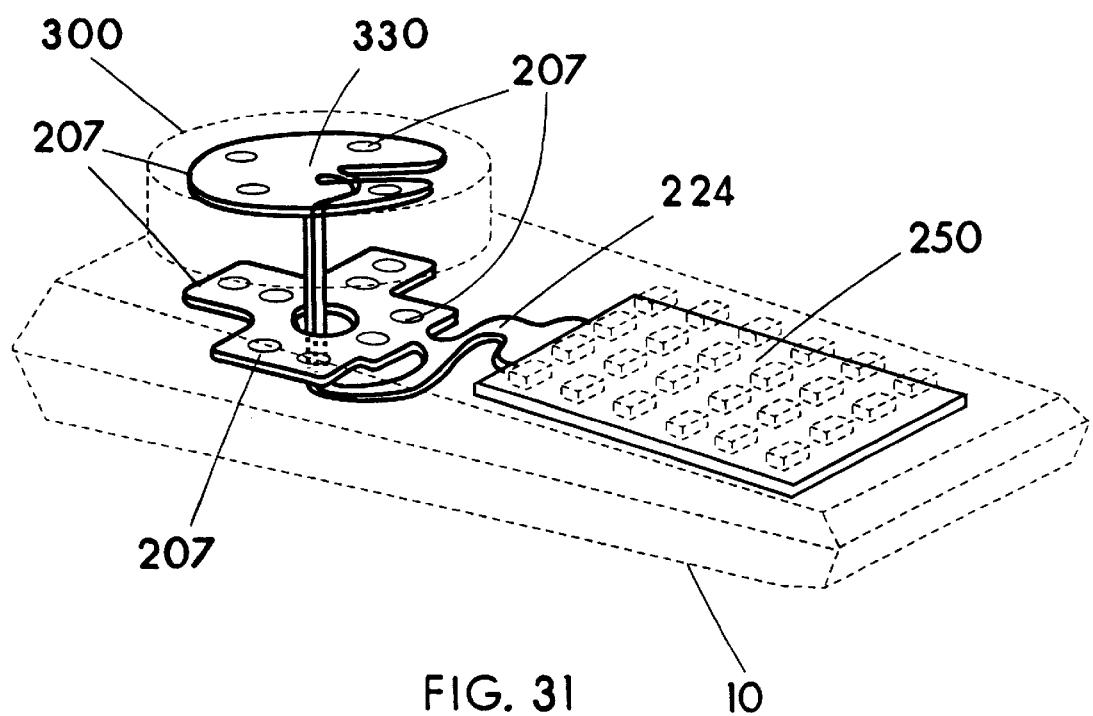
FIG. 31 shows a perspective view of the device of FIG. 30 in dashed lines and an internal view of a membrane shaped to fit the embodiment shown in FIGS. 20–29.
Figure 32:
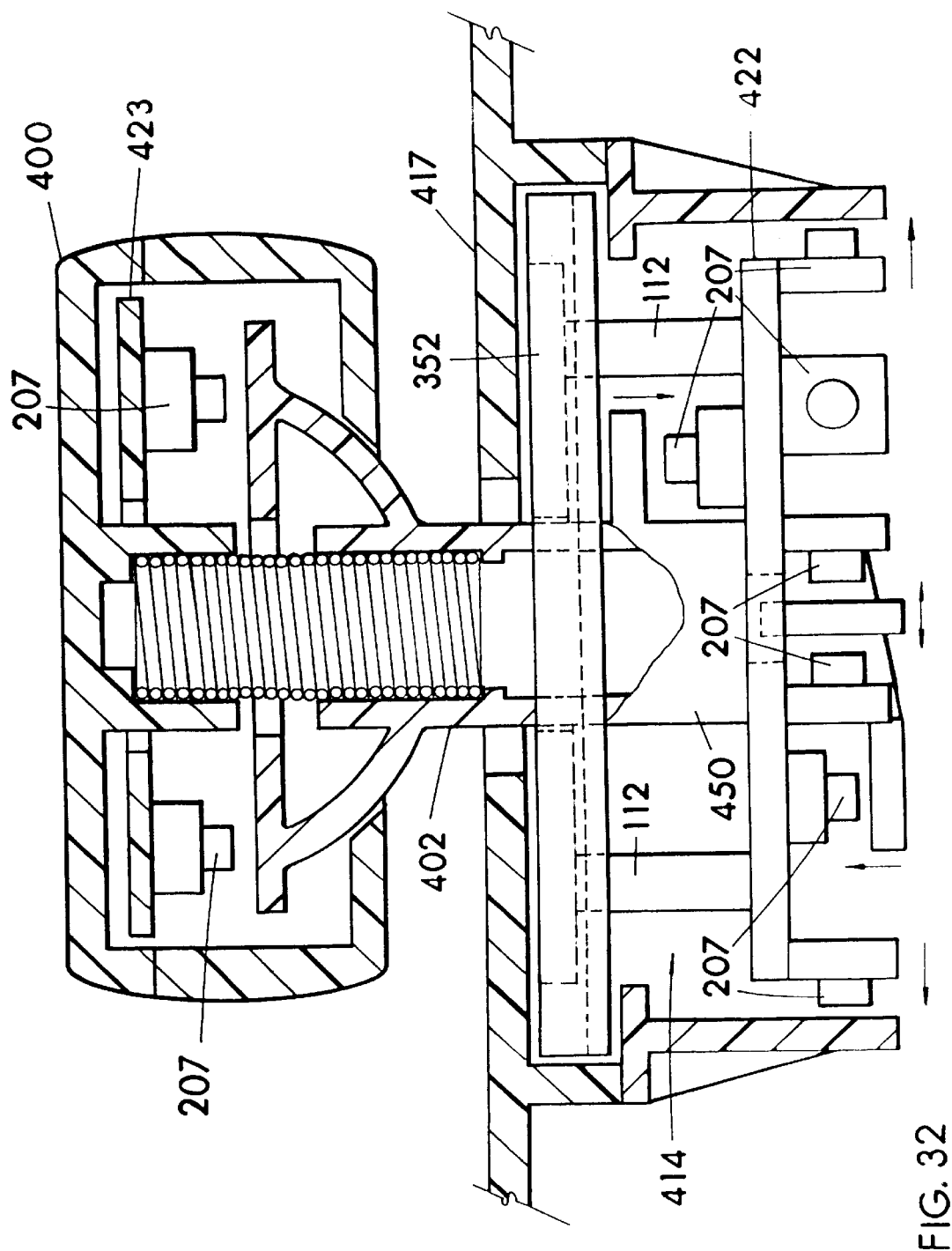
FIG. 32 shows a side view of a 6 DOF (3D) two planar device using one circuit board per plane for support of sensors and electronics with eight sensors located on a plane in the base and four sensors located on a plane in the handle.

FIG. 31 shows the device of FIG. 30 in dashed lines showing an internal view of a likely form for membrane sensor sheet 330. Membrane sheet 330 is shown connected to a circuit board sensor sheet 250 that commonly is positioned under the normal input keys and also contains electronic circuitry. Membrane tail 224 connects from sheet 250 to the greater body of membrane 330 which in this case is shown as a two planar type as shown in FIGS. 20–28. This arrangement of sensors on two planes is quite ideal for many uses. It allows the origin of all axes to remain within handle 300 and yet much of the mechanical resolving structure is moved down into housing 10 where space is more plentiful, thus handle 300 can be made even smaller and even lower in profile, if desired. Additionally, auxiliary secondary input buttons (select, fire buttons, special function keys, etc.) are readily integrated in an economical and rugged fashion for operation by the user's finger(s).

Figure 33:
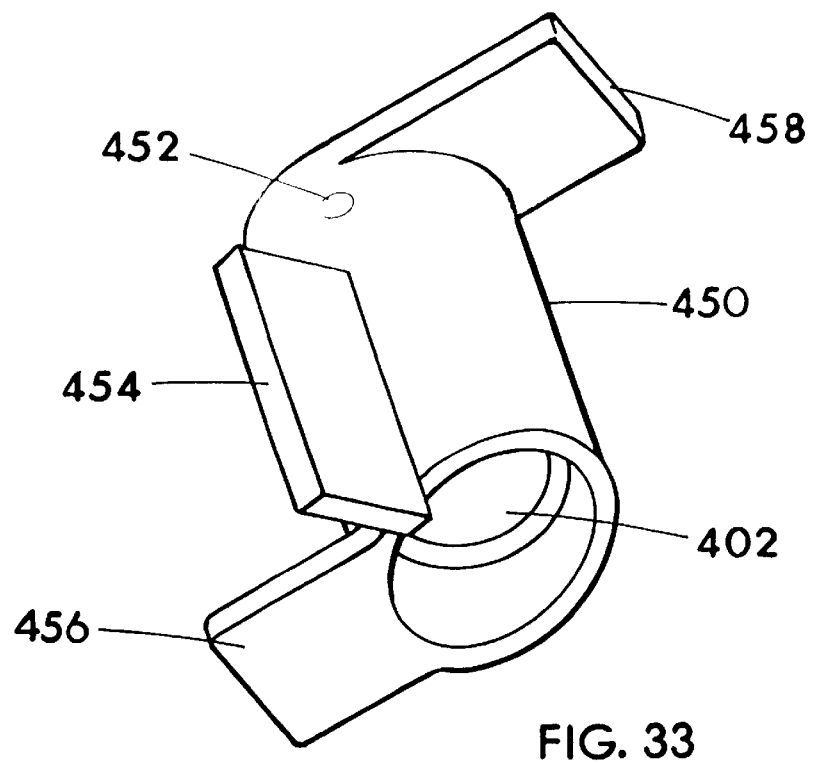
FIG. 33 shows a perspective view of a third axis translation component for the embodiment shown in FIG. 32.
Figure 34:
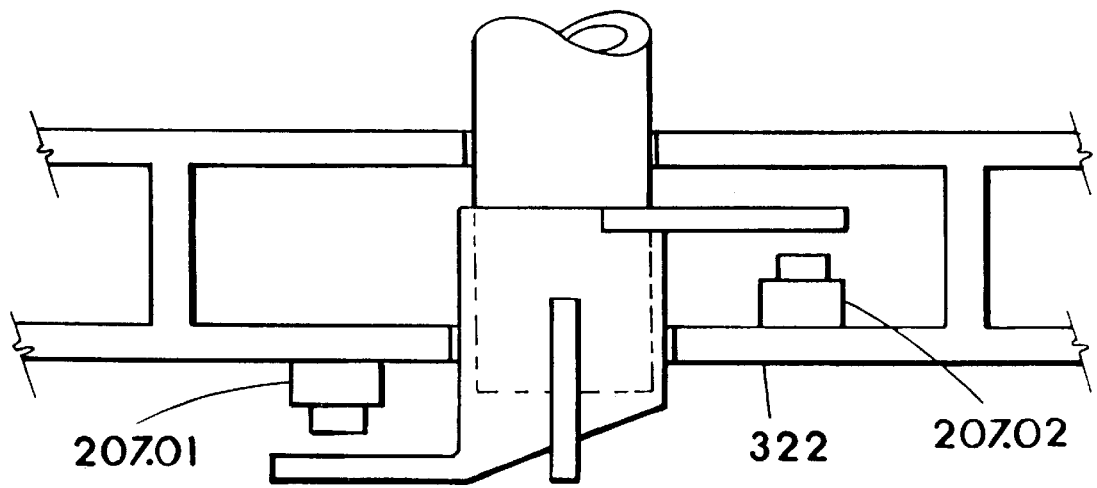
FIG. 34 shows a side view of the component of FIG. 34 in a carriage.
Figure 35:
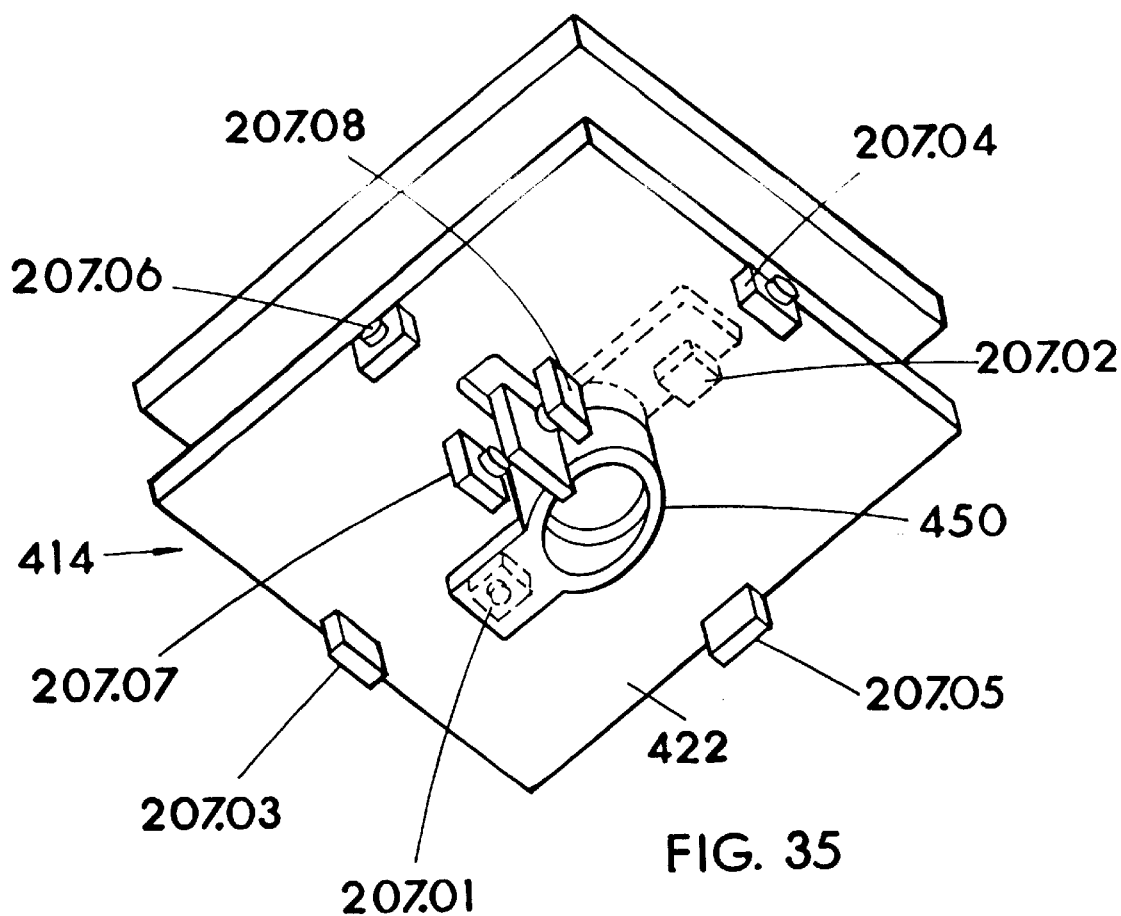
FIG. 35 shows a perspective view of the components shown in FIGS. 32–34.

FIGS. 33–35 show a preferred embodiment of the two planar design without using rocker arms and having packaged sensors 207 shown here as simple mechanical flat-mount and right-angle-mount switch packages, mounted on second carriage part 322 which, in this embodiment, is a circuit board to which the sensor packages are soldered, and also the sensor packages are solder mounted on a second circuit board 423 within handle 400. This embodiment has some parts and structures that are similar to equivalent parts in earlier embodiments such as a hand operable input member shown as a handle 400 supported on a shaft 402 which extends into a housing which serves as a reference member or base 417 where it interfaces with carriage 414. Carriage 414 is supported by a similar carriage support structuring and carriage 414 has platform 352 with distending legs 112 which connect to second carriage part 422 which, in this embodiment, is specifically a circuit board carrying eight sensors for interpretation of four axes.

Specifically shown in FIG. 33 is a 3rd axis actuator part 450 which has a specific structuring that allows all sensor mountings on the circuit board to be fully functional with flat and right-angle-mount mechanical sensor packages. Actuator part 450 is integrated to the end of shaft 402 that is in communication with carriage 414. Actuator 450 may be integrated with shaft 402 as a single, injection-molded part or actuator part 400 may be a separate molded part fit over the end of shaft 402 and secured to shaft 402 by a pin 452 passing through both shaft 402 and actuator part 450. Actuator part 450 has at least a 3rd axis rotational actuator 454 which is a plate-like member fixed to actuator part 450 and extending outward in a plane having substantially the 3rd (yaw) axis as a member of that plane so that when shaft 402 rotates in either direction about the 3rd axis, actuator part 454 moves through space, actuating the appropriate right-angle-mount sensors indicating a 3rd axis rotational movement in either the positive or negative direction. Actuator part 450 has a 3rd axis negative (yaw—move down) linear actuator 458 and a 3rd axis positive (yaw—move up) linear actuator 456 which also are fixed to actuator part 450 and extend outward from part 450 perpendicular to the 3rd axis and substantially aligned with a plane parallel to the 1st and 2nd axes, so that when shaft 402 moves along the 3rd axis in a positive direction, actuator 456 activates the appropriate flat mount sensor indicating linear movement along the 3rd axis in a positive direction, and when shaft 402 moves along the 3rd axis in a negative direction, actuator 458 activates the appropriate flat mount sensor indicating linear movement along the 3rd axis in a negative direction.

Figure 36:
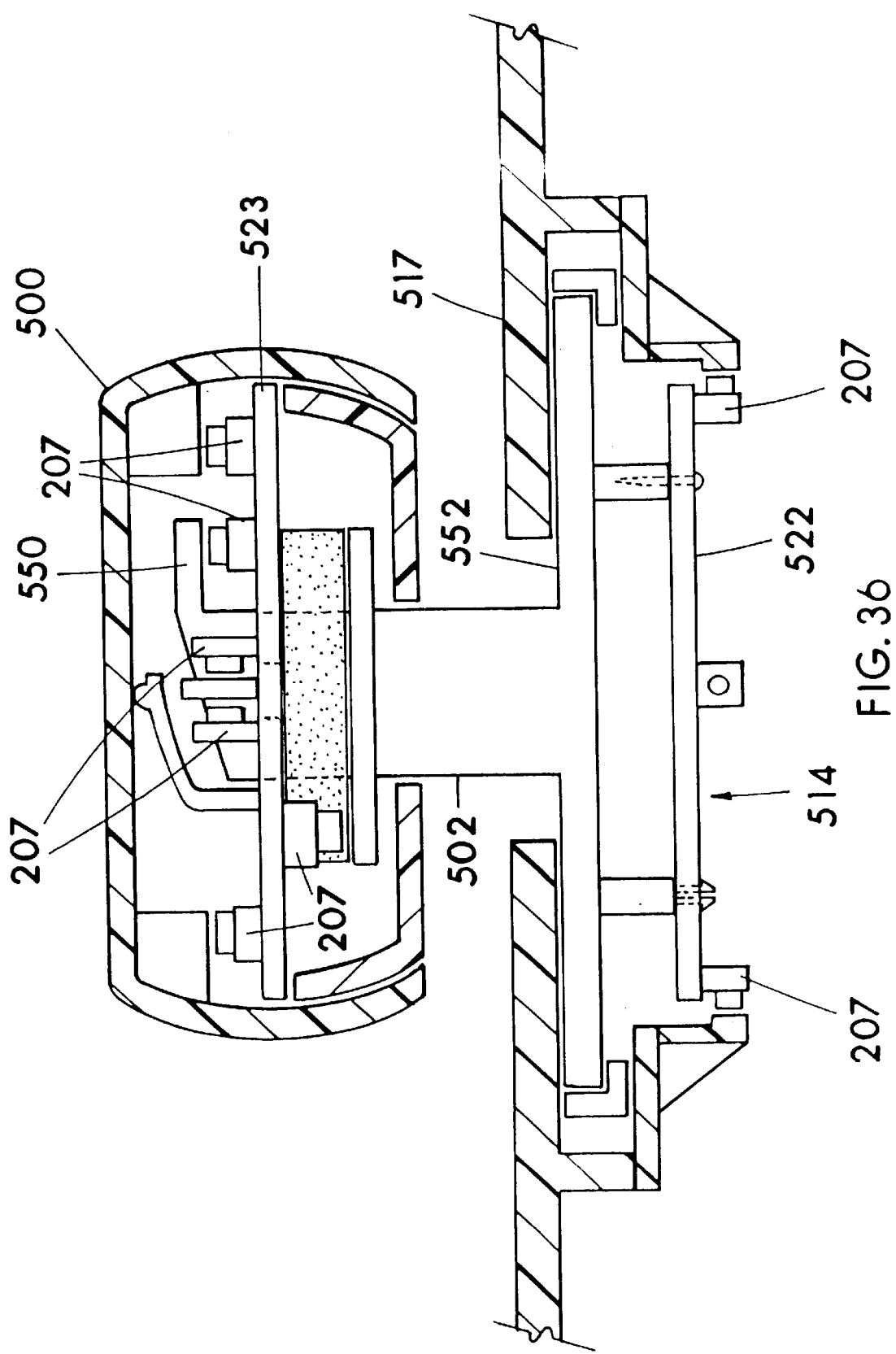
FIG. 36 shows a side view of a two planar embodiment using circuit boards but having substantially different sensor placements and structuring, with eight sensors located on a plane in the handle and four sensors on a plane in the base.

FIG. 36 shows a final preferred embodiment having some similar structures to earlier embodiments, especially those shown in FIGS. 32–35, with the primary exception that in this embodiment eight sensors are located within the hand operable input member handle 500 and only four sensors are located within the reference member housing 517. In this embodiment a similar carriage 514 is located within housing 517 but shaft 502 is fixed to plate 552 of carriage 514 so that shaft 502 is free to move only linearly within a plane perpendicular to the 3rd (yaw) axis. A part shaped almost identically to part 450 is fixed at the top of shaft 502. Sensors 207 within handle 500 are mounted to circuit board 523.

In the interest of brevity, it is appreciated that after study of the earlier embodiments one skilled in the art will be able to easily construct the full structuring of the embodiment of FIG. 36 from this full illustration without an overly extensive written description.

Figure 37:
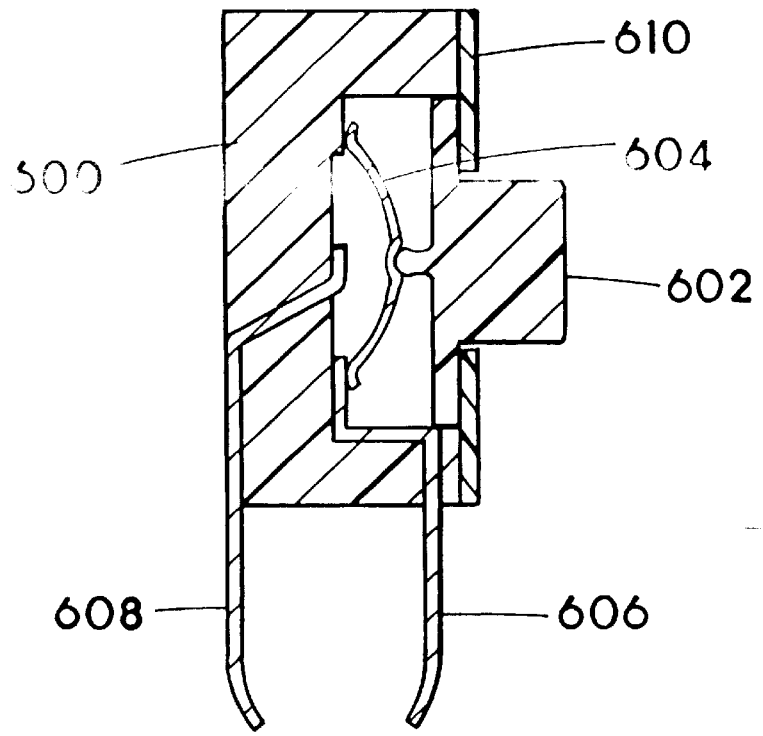
FIG. 37 shows a side cross-section view of a typical right angle solder mount sensor package for a momentary-On switch sensor.

FIG. 37 shows a right angle simple switched sensor package as is commonly available in the industry. It is comprised of a non-conductive rigid plastic body 600 supported by electrically conductive solder mounting tangs 606 and 608 which are typically made of metal. Electrically conductive tang 606 passes from the exterior of body 600 to the interior where it resides in a generally peripheral position of an internal cavity of body 600, and electrically conductive tang 608 passes from the exterior of body 600 to the interior where it resides in a generally central position of the internal cavity. Positioned over the internal portions of tangs 606 and 608 is a metallic dome cap 604 having resilient momentary "snap-through" characteristics. Metallic dome cap 604 typically resides in electrical contact with tang 606 on the periphery and typically not in contact with centrally positioned tang 608. Positioned to depress dome cap 604 is a plunger 602 which is generally made on non-conductive rigid plastic material. Dome cap 604 and plunger 602 are typically held in place by a thin metallic plate 610 which is fixed to body 600 by plastic melt riveting or other means. Plate 610 has an aperture large enough for a portion of plunger 602 to protrude to pressed upon by an outside force and thus to depress conductive dome cap past a tactile snap-through threshold and down onto centrally disposed conductive tang 608, thus completing an electrically closed circuit between tangs 606 and 608.

Figure 38:
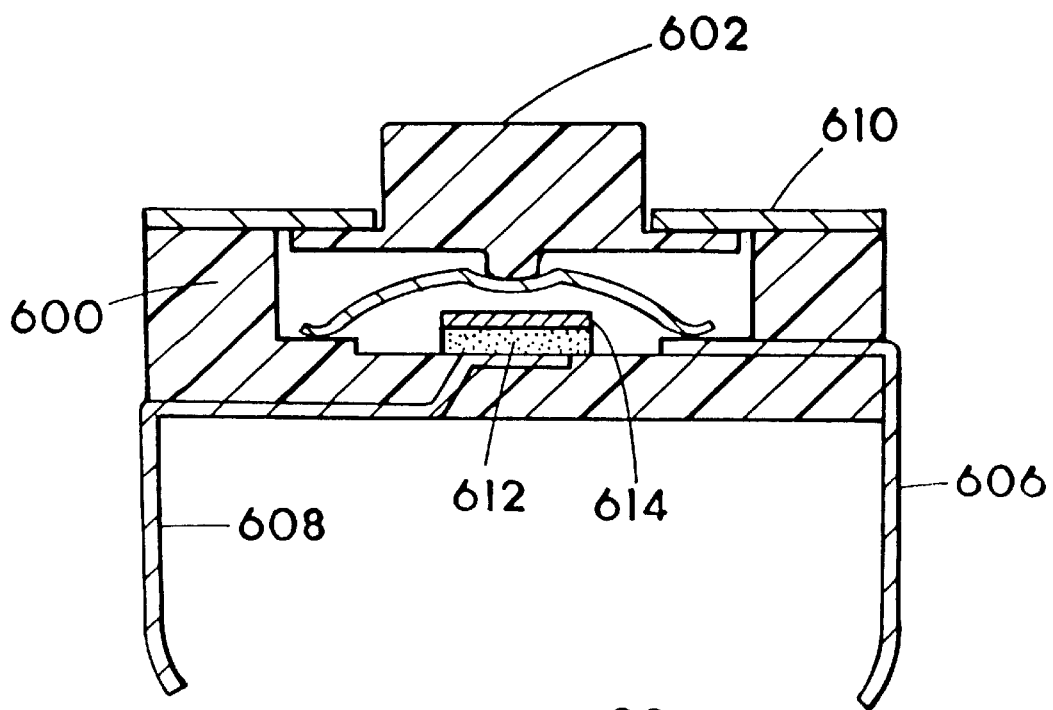
FIG. 38 shows a side cross-section view of a horizontal or flat solder mount sensor package containing a proportional pressure sensitive element internally.

FIG. 38 shows an even more typical sensor package body 600 in that it is horizontally mounted, which is the most common style. But the sensor of FIG. 38 has an additional very important element. In the inner cavity of body 600 and fixed above, and electrically in connection with, centrally positioned conductive tang 608 is a pressure sensitive electrical element 612, which may have a conductive metallic plate 614 fixed to the upper surface of element 612 for optimal operation. Of course, this same design can be integrated into the sensor of FIG. 37. Pressure element 612 is constructed of a pressure sensitive material, such as for example, molybdenum disulfide granules of approximately 600 grit size mixed with a base material such as silicon rubber in, respectively, an 80-20 as taught in U.S. Pat. No. 3,806,471 issued to inventor Robert J. Mitchell on Apr. 23, 1974, ratio, or other pressure sensitive electrically regulating materials. I believe that integration of pressure sensitive technology into a tactile-snap through sensor package is novel and of great advantage in 6 DOF (3D) controllers as shown herein and described in my earlier 6 DOF (3D) controller patent applications.

Figure 39:
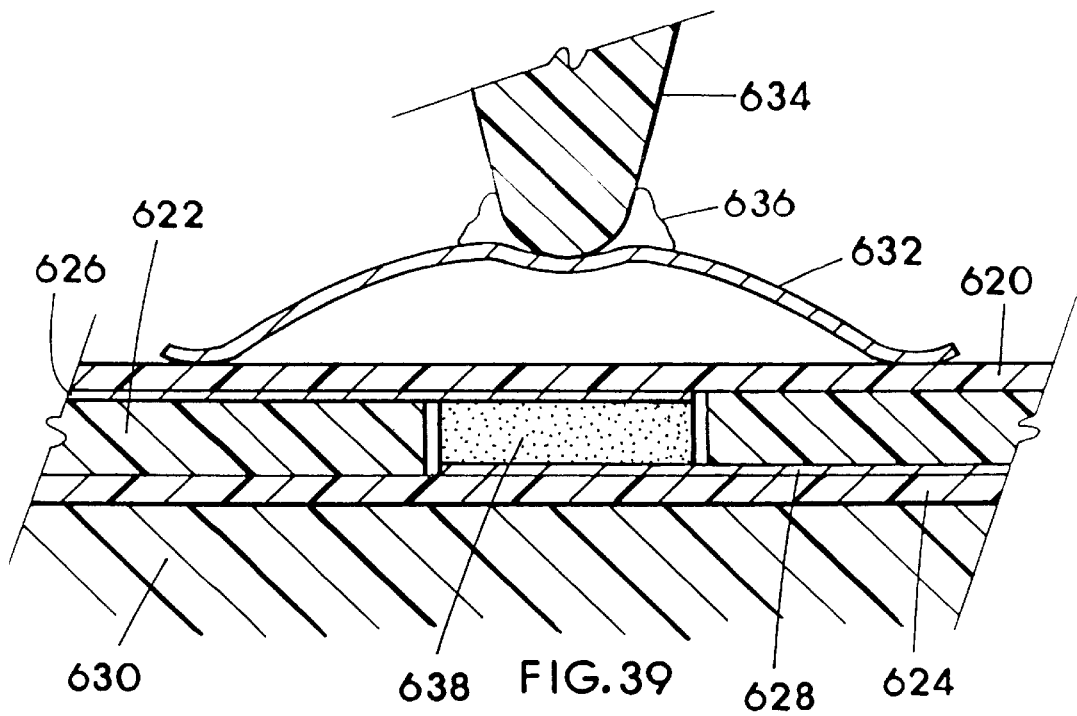
FIG. 39 shows a side cross-section view of a proportional membrane sensor having a metallic dome cap actuator in the non-activated position.
Figure 40:
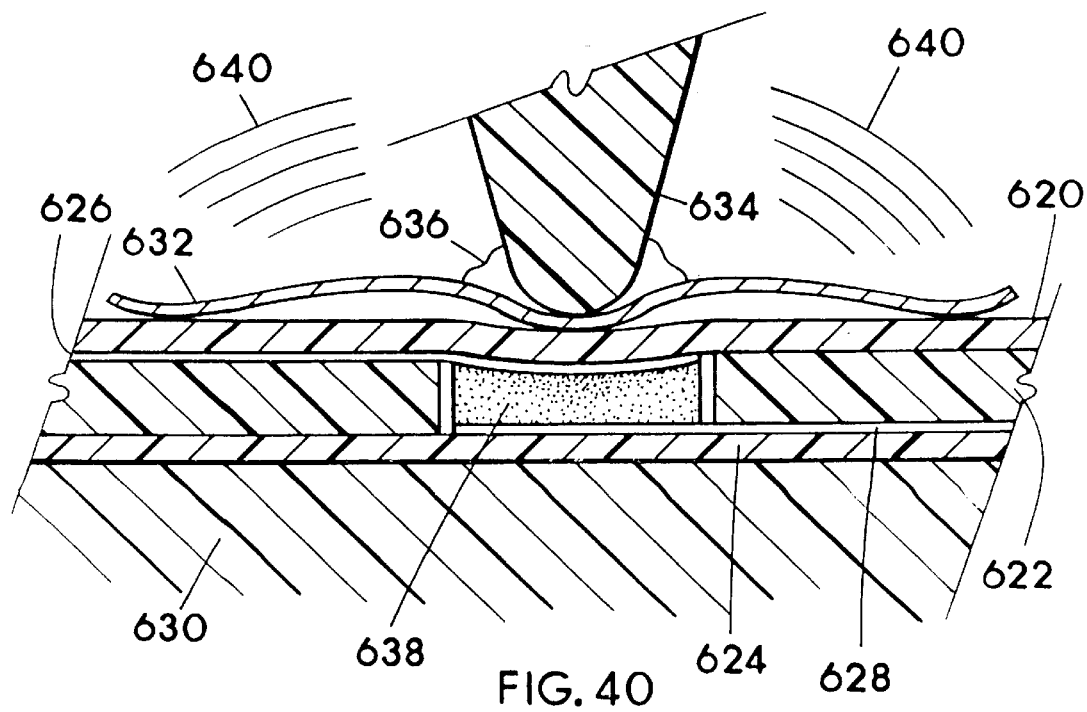
FIG. 40 shows a side cross-section view of a proportional membrane sensor having a metallic dome cap actuator in the activated position.

FIGS. 39 and 40 show cross-section views, respectively, of a non-actuated and an actuated flexible planar three layer membrane comprised of an upper electrically non-conductive membrane layer 620, a mid electrically non-conductive membrane layer 622 and a lower electrically non-conductive membrane layer 624 all positioned essentially parallel to each other with upper layer 620 having an electrically conductive trace 626 on its lower side and lower layer 624 having an electrically conductive trace 628 on its upper side with mid layer 622 normally isolating the traces except in the central switching or sensing region where mid layer 622 has an aperture. In a traditional three layer flexible membrane sensor the aperture in mid layer 622 is empty allowing upper layer 620 to be depressed flexing down until electrically conductive trace 626 comes into contact with electrically conductive trace 628 of lower layer 624 and completes an electrical connection, as is commonly known in the prior art. The membrane layers are supported upon a generally rigid membrane support structure 630 such as a rigid plastic backing plate.

The membrane sensor shown is novel with the inclusion of a pressure-sensitive electrically regulating element 638 disposed in the sensing region, filling the traditionally empty aperture of mid layer 622. Pressure element 638 remains in electrical contact with broad conductive areas of conductive traces 626 and 628 at all times. Pressure element 638 may be of a type having ohmic or rectifying granular materials (such as 600 grit molybdenum disulfide granules 80–98%) in a buffering base matter (such as silicon rubber 2–20%) as described in U.S. Pat. No. 3,806,471 issued to inventor Robert J. Mitchell on Apr. 23, 1974, or other pressure sensitive electrically regulating technology as may exist and is capable of being integrated with membrane sheet technology.

Also I believe it is novel to use a metallic "snap-through" resilient dome cap 632 with for its excellent tactile turn-on feel properties in combination with membrane sensors and especially with membrane pressure sensors as shown, where metallic dome cap 632 resides on top of upper membrane layer 620 and is shown held in place by silicon adhesive 636 adhering dome cap 632 to any generic actuator 634. Generic actuator 634 may be the actuating surface area of any part which brings pressure to bear for activation of a sensor, for example, actuator 634 might be a nipple shaped protrusion on the underside of rocker arm actuator arms 336 on the embodiment of FIGS. 20–31, etc. Vibration lines 640 indicate an energetic vibration emanating outward either through support 630 or actuator 634 as a mechanical vibration transmitted through the connected parts to the user's hand, or as air vibrations perceived by the user's ear, and indicating the "snap-through" turn-on/off sensation of resilient dome cap 632 as it impinges upon and activates the sensor. With twelve possible singular input operations, and a very large number of combined input operations the user perceivable tactile sensation indicating sensor activation is of high value to the operator of the device.

Figure 41:
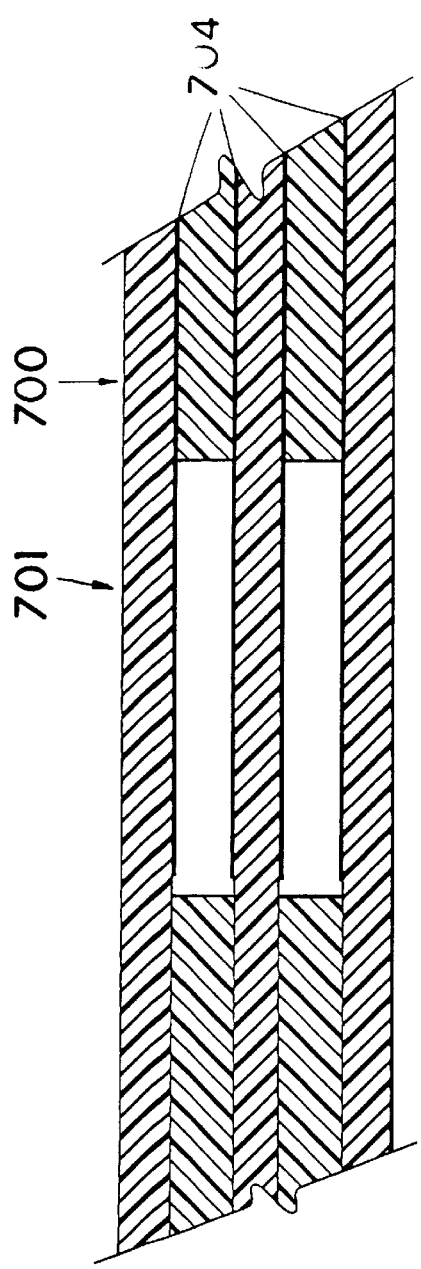
FIG. 41 shows a side cross-section view of a compound membrane sensor having multiple simple On/Off switched elements piggy backed one on top of another.

FIG. 41 shows a compound membrane sensor sheet 700 containing a multiple-layer staged sensor 701. Staged sensor 701 is comprised by layering, one on top of the other, more than one traditional simple membrane switch and sharing layering which can be used in common. For example, the top layer of the lower sensor and the bottom layer of the top sensor can be combined using both sides of the common layer to full avail, thus two three layer sensors are combined into one five layer sensor, etc. Staged sensor 701 can be useful in measuring increased activating force of the impinging activator coming down on sensor 701 from above with sufficient force first activates the upper sensor and with sufficient additional force then activates the second sensor, and so on. Many layered sensors are possible.

Figure 42:
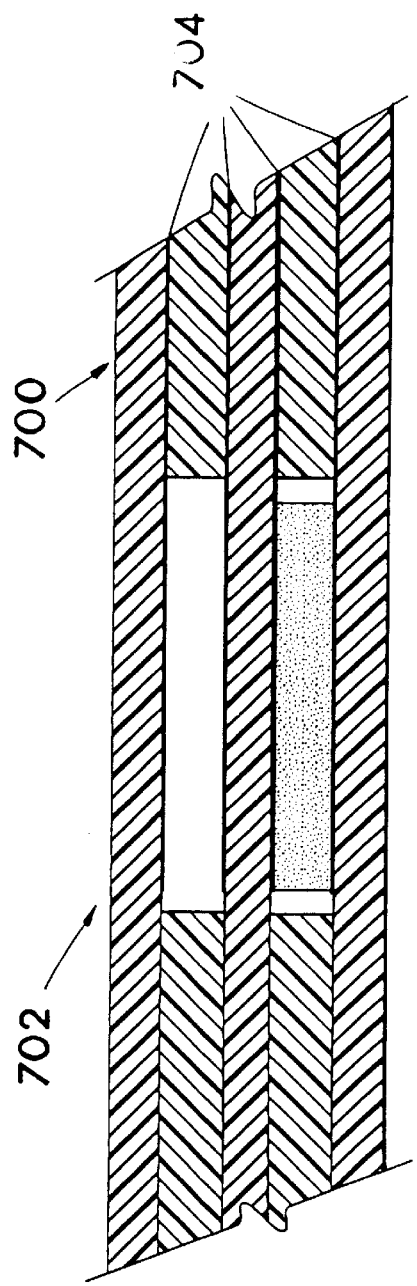
FIG. 42 shows a side cross-section view of a compound membrane sensor having both a simple On/Off switched element and a proportional element which are simultaneously activated.

FIG. 42 shows a compound membrane sensor sheet 700 containing a compound sensor 702 which in essence is a commonly known simple switched membrane sensor on top of my novel proportional membrane sensor as described in the embodiment of FIGS. 39 and 40, with the two respective sensors sharing the middle sheet so that two three sheet sensors are combined into one five sheet sensor. In combination with earlier drawings and descriptions herein, and the commonly known prior art the compound sensor shown here becomes self descriptive to one skilled in the art.

Some commonly known simple switched sensors use only a single sheet rather than three sheets, with the single sheet having both conductive traces sharing one surface area and the resilient dome cap having a conductive element which when depressed connects the conductive traces. One skilled in the art will also appreciate that the novel compound sensor 702 may be made with less than five sheets using such technology and judicious routing of conductive traces.

Both the simple switched portion and the proportional portion of sensor 702 are activated approximately simultaneously when an activator impinges upon sensor 702 with the simple switched sensor indicating an on state and the proportional sensor indicating how much force is being brought to bear on sensor 702.

A novel sensor of this type, having both a simple switched and a proportional component in combination with my novel keyboard integrated devices, such as those shown in FIGS. 18, 19 and 29 demonstrate the design of having a 6 DOF (3D) controller which outputs both a scan code (keyboard type information) and a proportional signal. This could be very useful in any multiple-axes controller. Outputting both scan codes and proportional signals (possibly to separate keyboard and serial ports) could be of substantial value because for all pre Windows 95 machines virtually all 3-D graphics programs already have software drivers to be driven by scan codes (with programmable key maps) so that the 3-D software can controlled by common keyboards. Outputting this data type allows my 6 DOF (3D) controllers to interface with existing software that is controllable by scan codes. Outputting both of these data types is not dependent on this compound sensor rather it is simply demonstrated here. Information gathered from any proportional sensor can be massaged into these two different data output types which are believed to be novel in regard to output of multiple-axes controller devices and specifically for 6 DOF (3D) devices.

Figure 43:
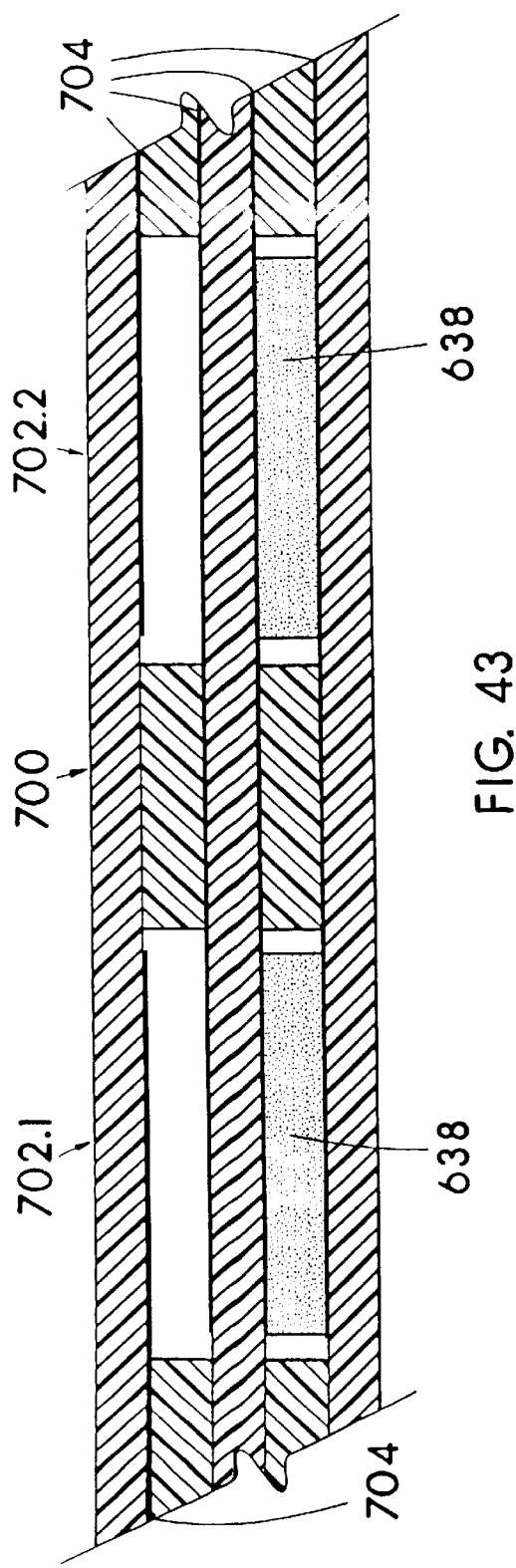
FIG. 43 shows a side cross-section view of two compound sensors of the type shown in FIG. 42 arranged to create a single bi-directional proportional sensor.

FIG. 43 shows a pair of compound sensors 702 integrated into compound sensor sheet 700, the compound sensor on the left side is identified as sensor 702.1 and the compound sensor on the right side is identified as sensor 702.2. Sensor pairs are valuable because a 6 DOF (3D) device has 6 axes which are interpreted bi-directionally (move along the axis to the left or right, but not both simultaneously). Simple switches and the pressure sensors so far shown are uni-directional sensors so ideally a pair of unidirectional sensors are used to describe each axis, thus six pair of uni-directional sensors (twelve individual sensors) can describe six degrees of freedom. Unidirectional sensors are highly desirable both from and cost stand point and from a superior functional stand point, because they allow a natural null or play space for accommodating inaccuracies of the human hand and for optimally accommodating the passive turn-on tactile feedback where the user can feel the different axes turn on and off with manipulation of the input member as described earlier herein.

The pair of sensors 702.1 and 702.2 offer advantage, for example, in a computer keyboard embodiment where the simple switched portions may emulate key inputs and the proportional portions may serve to create sophisticated 6

DOF (3D) outputs. Further, for some applications an incremental output (simple switched) is more desirable than a proportional output. sensor 702 provides both types of output in hardware. Finally, the compound sensor pair offers structure to lessen the necessary electronics requirement for reading the unidirectional proportional sensors. As shown if FIG. 43 the simple switched portions have electrical connections 704 which make the switches electrically distinct from each other, but the proportional sensor portions have electrical connections 704 which are in parallel, thus the proportional sensor portions are not electrically distinct one from the other. The simple switched portion yields information about which direction along or about an axis and the proportional sensors yield information representing intensity. Thus allowing only one analog channel to read two unidirectional proportional sensors, and correspondingly, only six analog channels to read twelve unidirectional sensors. A savings in electronic circuit complexity.

Figure 44:
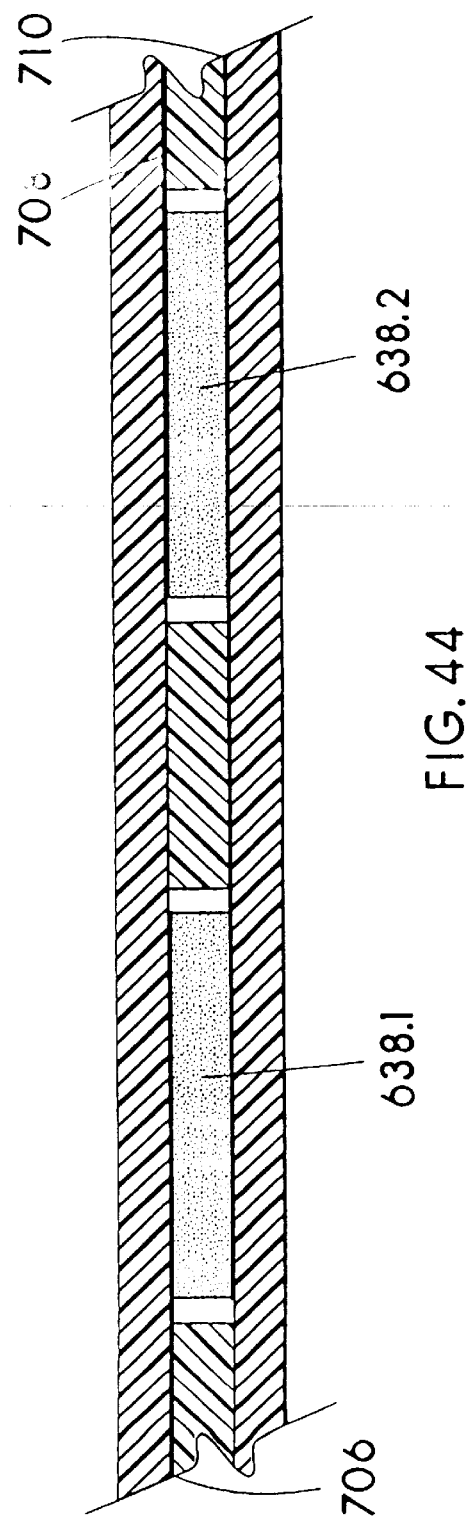
FIG. 44 shows a side cross-section view of two unidirectional proportional sensors electrically connected to form a single bi-directional sensor with a central null area.

FIG. 44 shows proportional sensors 638.1 and 638.2 in a paired relationship within a membrane structure. Sensors 638.1 and 638.2 have in common a center electrical connection 710 which connects to one side of both sensors 638.1 and 638.2 of the pair. Each individual sensor has a second and distinct electrical connection, being for sensor 638.1 electrical connection 706 and for sensor 638.2 electrical connection 708. The sensors are essentially in a center taped arrangement, so that the center connection 710 can be read with one analog to digital converter yielding bi-directional information, if, for example, connection 706 carries a substantial voltage and connection 708 is grounded. Thus the mechanical and cost advantages of unidirectional proportional sensors is utilized with economical electrical circuitry.

Figure 45:
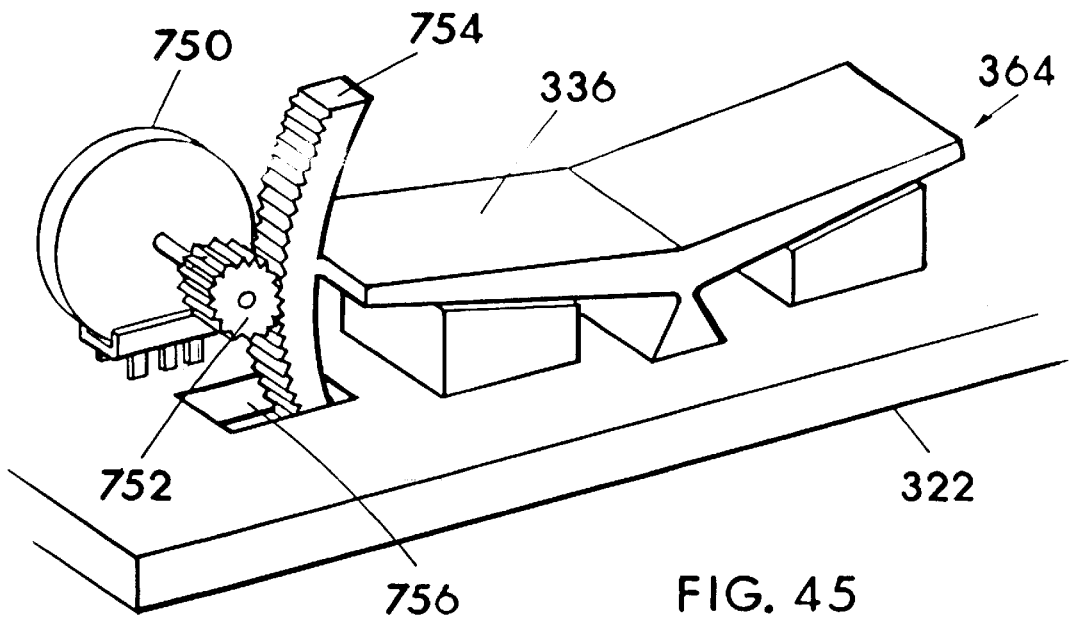
FIG. 45 shows a perspective view of a generic rocker arm actuator operating a bi-directional rotary sensor.
Figure 46:
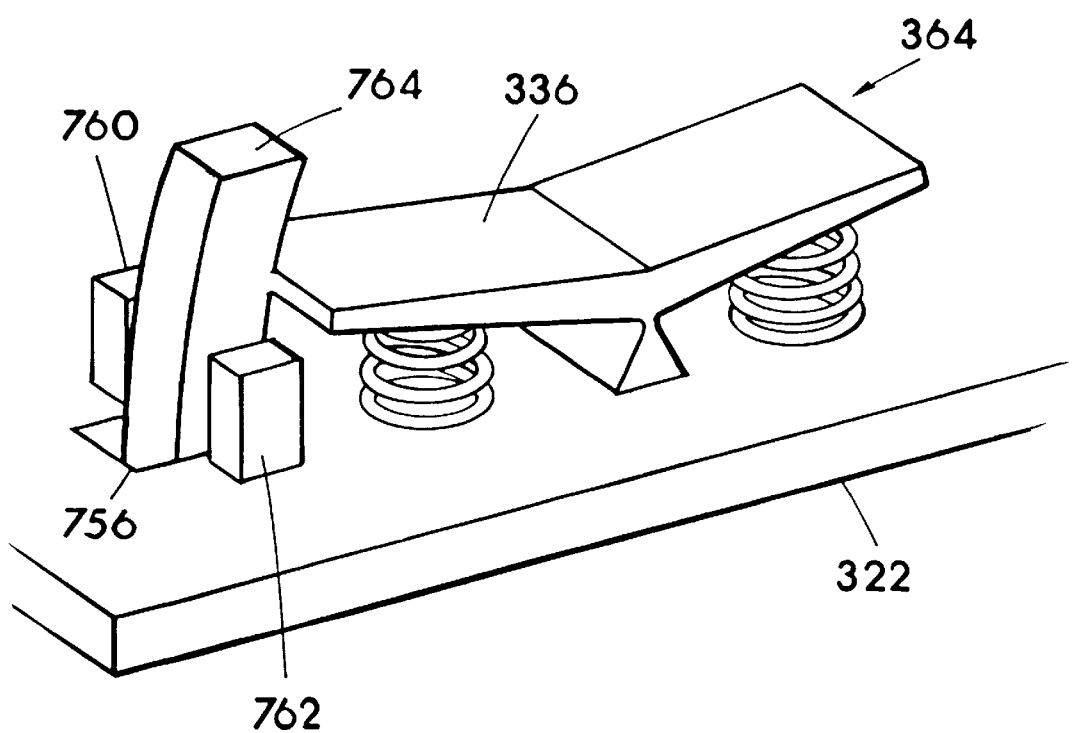
FIG. 46 shows a perspective view of a generic rocker arm actuator operating a bi-directional optical sensor.
Figure 47:
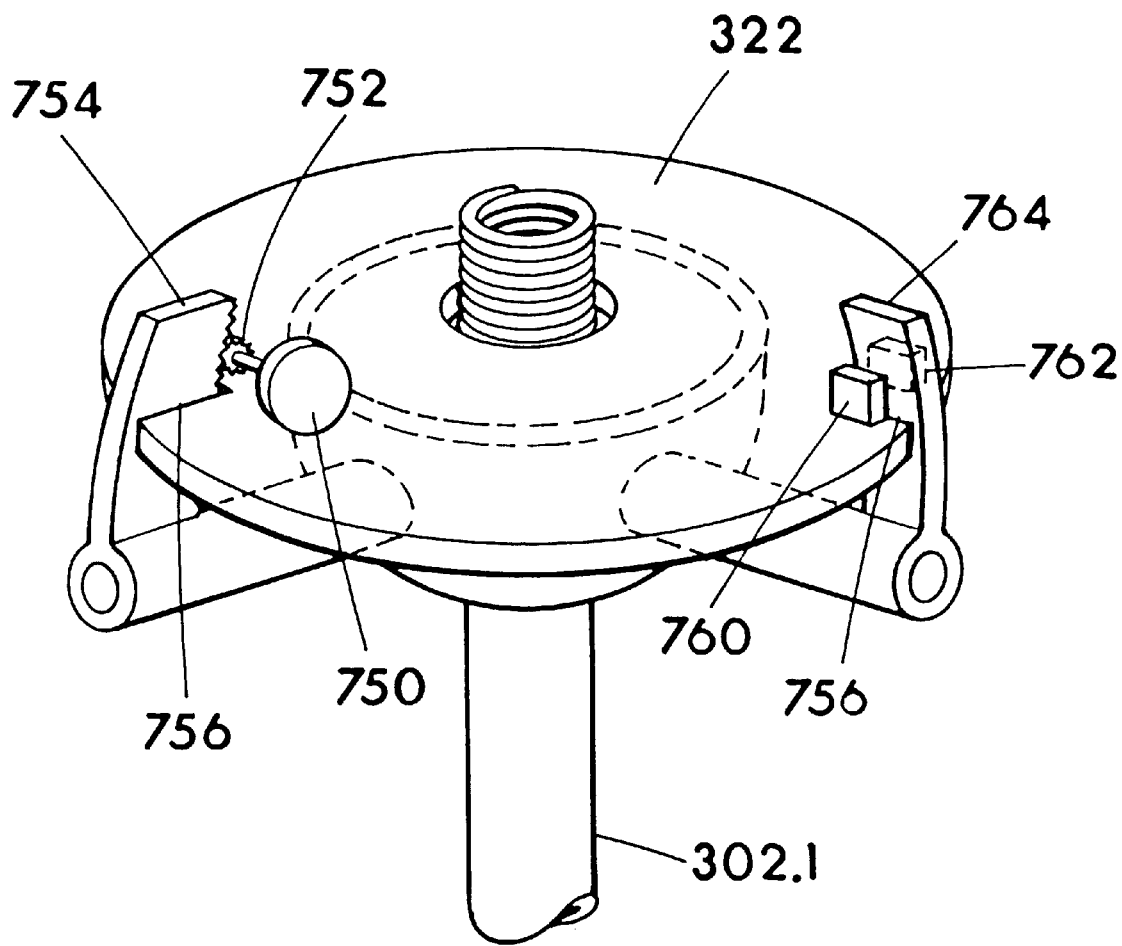
FIG. 47 shows a perspective view of the sensors of FIGS. 45 and 46 as they can be embodied within a handle.

FIGS. 45–47 show bi-directional sensors mounted on circuit board sheet means for creating 6 DOF (3D) functional structures with previously described structures of the embodiment of FIGS. 20–28, thus for full 6 DOF (3D) operability six bi-directional sensors would be used. The embodiment shown in FIGS. 1–3 specifically shows a nine sensor 6 DOF (3D) embodiment with three bi-directional rotational sensors and six uni-directional linear sensors. The embodiments shown in FIGS. 13–36 show twelve sensor 6 DOF (3D) embodiments with all sensors being unidirectional sensors.

FIGS. 45 and 46 show generic rocker-arm type actuators 364 mounted on circuit board 322. Actuators 364 are shown without a differentiating super-structure 338 because the illustrated novel bi-directional sensor application could serve on any or all of the actuators 364 in the embodiment shown in FIGS. 20–27.

FIG. 45 shows rocker-arm actuator 364 mounted on circuit board sheet 322 and a bi-directional sensor 750 such as a rotary encoder or potentiometer solder mounted to sheet 322 and operationally connected to rocker arm 336 by a rack and pinion type gear assembly with the rotary shaft to rotary sensor 750 bearing a small gear or pinion gear 752 which is activated by riding on an arced gear rack 754 fixed to one end of rocker-arm actuator 336 and passing freely through an aperture 756 in sheet 322.

FIG. 46 is similar to FIG. 45 except that the bi-directional sensor shown is an optical sensor having a light transmitting unit 760 and a light sensing unit 762 which are both solder mounted to circuit board sheet 322 and are separated by an arc shaped light regulating unit 764 such as a graduated optical filter or a shuttering device which is fixed to one end of a actuator arm 336.

FIG. 47 shows sensors of the same type as described in FIGS. 45 and 46 but with the exception that they are shown with structuring to operate within the handle such as in the embodiment shown in FIG. 28.

Figure 48:
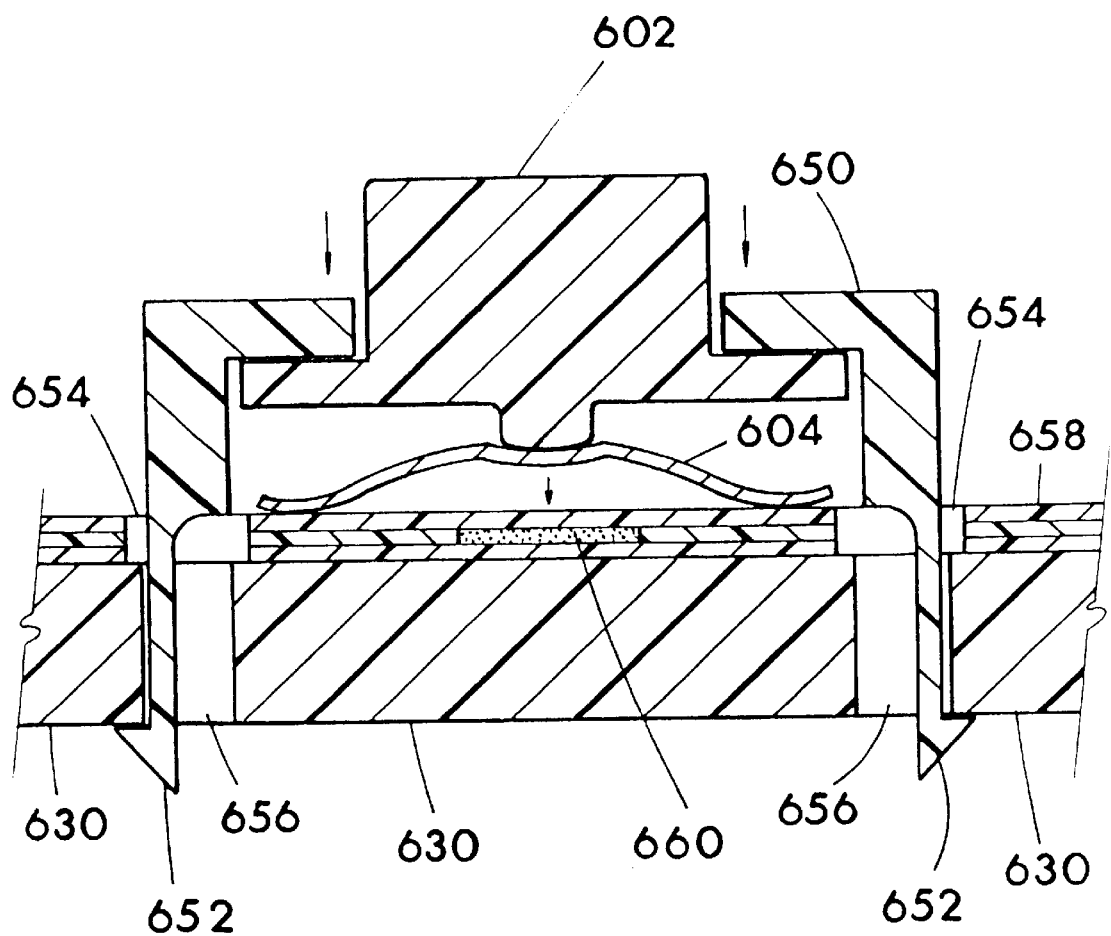
FIG. 48 shows a side cross-section view of a novel structure for anchoring a membrane sensor in position and also for holding sensor actuating structures in position.
Figure 49:
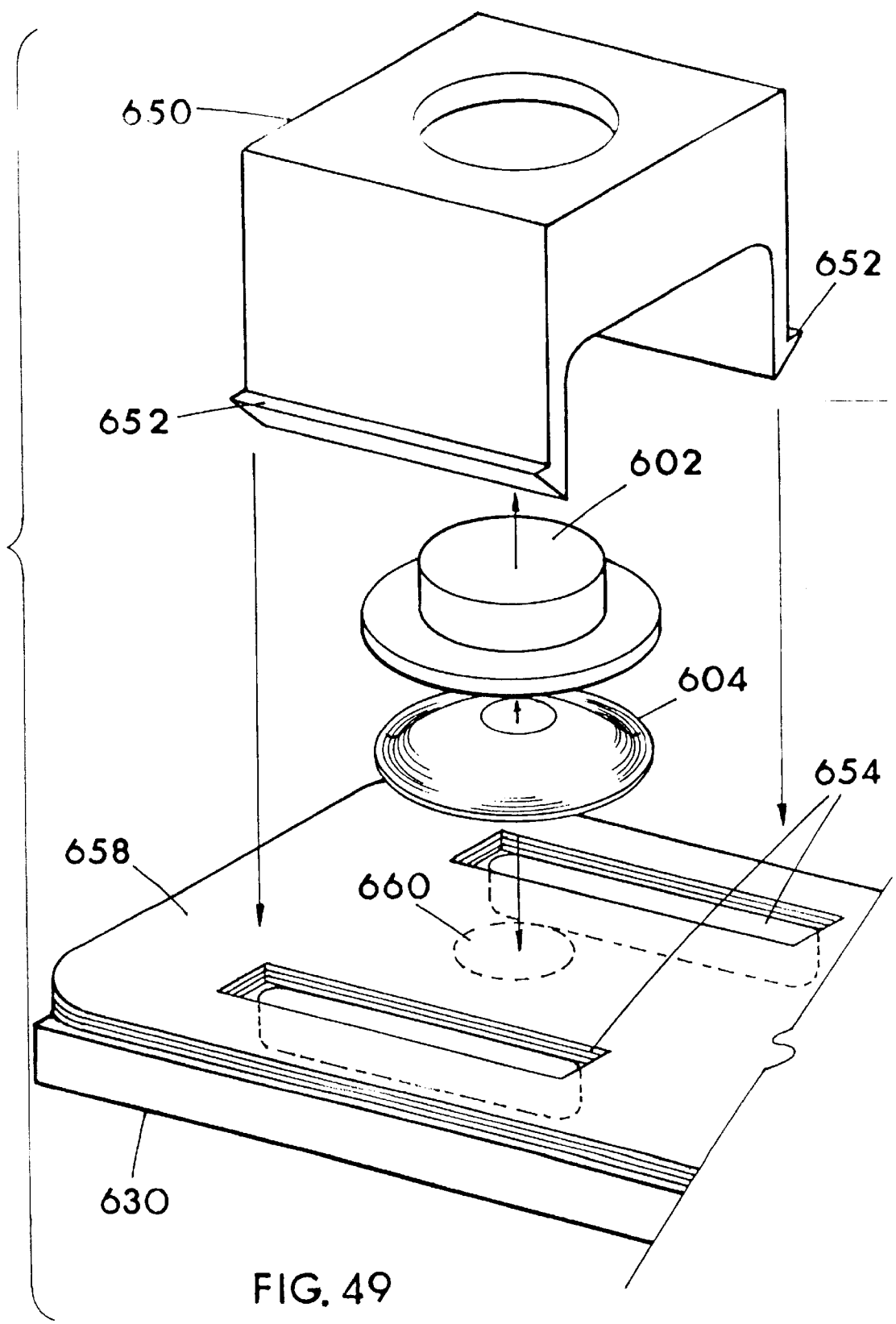
FIG. 49 shows an exploded view of the embodiment of FIG. 41.

FIGS. 48 and 49 respectively show a cross-section view and an exploded view of novel structuring for anchoring in a desired position a flexible membrane sensor sheet 658 or at least a portion of membrane sheet 658 carrying at least one sensor 660 and for retaining in operational positions structure appropriate for actuating mechanisms. Sensor 660 may be of either the common simple switched type or my novel pressure sensitive proportional membrane type. This embodiment is also for aligning and retaining sensor actuating structures, of which I believe, especially valuable are actuating structures of the resilient tactile type. A package member 650 is a housing like structure shown here with four side walls. Aligned along two of the opposing walls are downwardly distending snap-fit legs 652 having a hook-like snap-fit shape at the bottom most extremity. Package 652 might be made of an injection molded plastic such as a resin from the acetal family having excellent dimensional stability, rigidity and also resiliency for the bending of snap fit legs 652 during mounting of package 650 to a rigid support structure 630. The internal portion of package 650 is a cavity within which is retained at least an actuator shown here as a plunger 602 which is retained at least in part within housing package 650 by an upper or top portion of package 650 partially enclosing the package cavity but having an aperture through which extends a portion of plunger 602 for being depressed or activated by external forces. Resilient metallic dome cap 604 is also shown within the cavity and located between plunger 602 and membrane sensor 660 which is supported on rigid support structure 630. Rigid support structure 630 has two elongated apertures 656 sized to allow the passage during mounting and retention thereafter of snap-fit legs 652. Membrane 658, which may be any sensor bearing membrane, also has elongated apertures 654 positioned around a membrane sensor shown here as sensor 660. Apertures 654 being of size allowing the passage of snap fit legs 652.

The entire embodiment is assembled by positioning membrane sensor sheet 658 or at least the portion of membrane sensor sheet 658 bearing a sensor and apertures 654 along side of support structure 630 and aligning membrane apertures 654 with support structure apertures 656, then, with housing package 650 containing both plunger 602 and dome cap 604, pressing legs 652 through the aligned apertures thus fixing the membrane sensor and actuating plunger 602 in accurate and secure position for activation.

This novel membrane sensor anchoring and activating a structure may be useful for fixing into position a flexible membrane and associated sensor(s) in a wide variety of applications, not just for fixing a membrane having multiple relatively long arms to fit a widely-spread set of sensors within a 6 DOF (3D) device and for finger activated buttons which may be located elsewhere within the device, such as on either the handle housing or the base housing, etc. This structuring also offers tremendous advantage in many non 6 DOF applications where hand wiring is now common. For example, typical assembly of two axis joysticks involves hand wiring of numerous different finger and thumb operated switches at various different positions located within a handle and often includes additional switches located with the base of the joystick also. The hand wiring to these widely spread switch locations is error prone and expensive in labor, thus this process could be greatly advantaged by employment of flexible membrane based sensors, which is made possible by this novel structuring.

Figure 50:
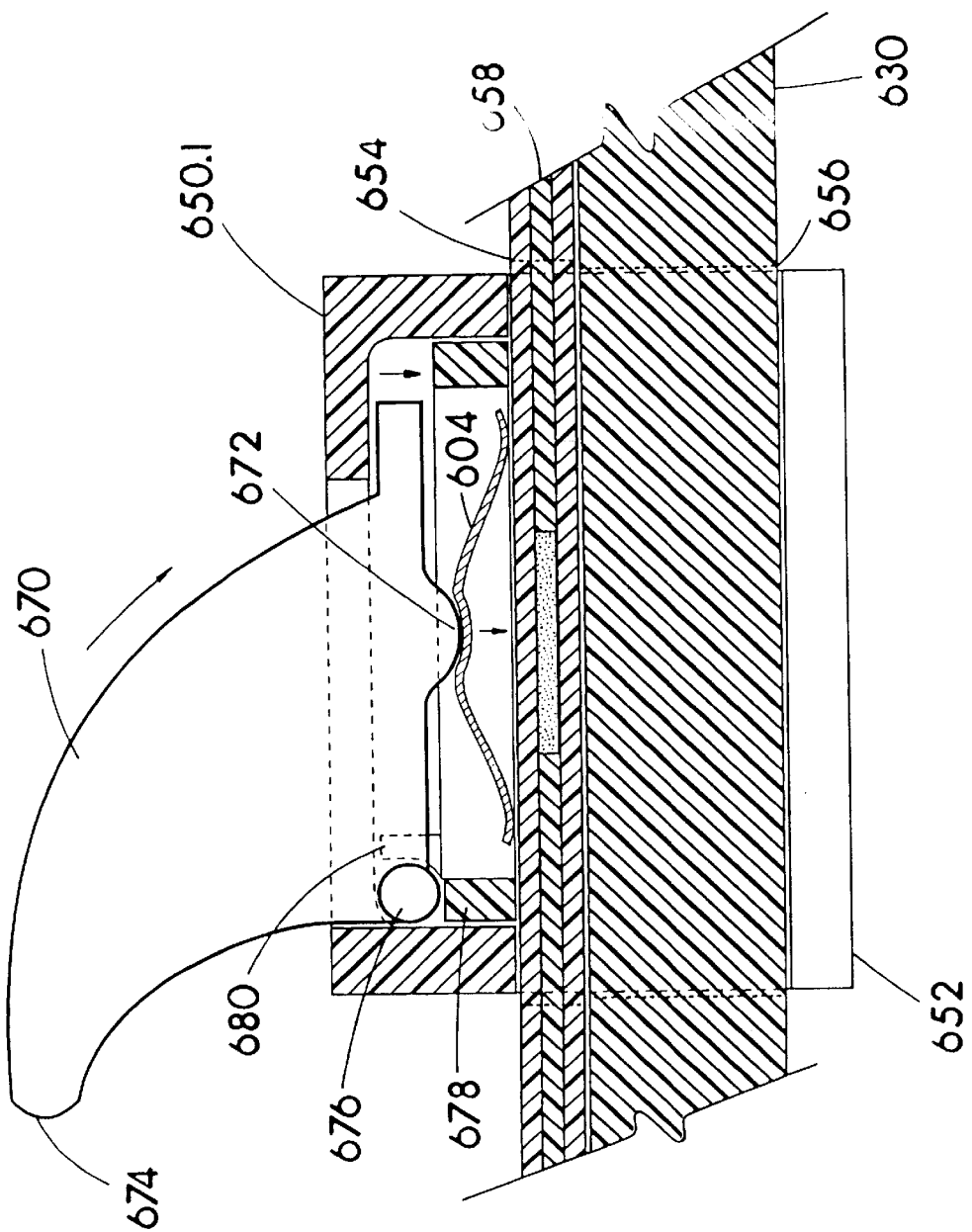
FIG. 50 shows a median cross-section view of the embodiment of FIGS. 48 and 49 but in a right angle variation.

FIG. 50 shows a right angle mount embodiment in common with the device of FIGS. 48 and 49. The right angle mount embodiment has a housing 650.1 formed much like housing 650 with the exception that the aperture in the upper surface is not necessarily round to accommodate passage of plunger 602 but rather the aperture may be slot-shaped to accommodate passage of a right angle actuator 670 which upon external activation pivots about a fulcrum 676. Right angle actuator 670 is structurally similar to the right angle translator parts shown in FIG. 17 as part 262, in FIG. 27 as part 348 and in FIG. 28 as part 376. Specifically actuator 670 has an externally exposed actuating nub 674 which is impinged upon by an actuating part in a manner essentially parallel to mounting 630 thus pivoting about fulcrum 676 and causing an internal actuating nub 672 to impinge downward upon dome cap 604. Fulcrum 676 is held in place within housing 650.1 by a retainer 678 which may be essentially ring like and with protrusions 680 which provide a saddle for pivotal retainment of fulcrum 676.

The anchoring and retaining embodiments shown in FIGS. 48–50 provide an optimal low-cost of manufacture embodiment where ever membrane sheet based sensors are shown in the current teaching and can also operate to equal advantage providing structuring and translating for sensors based on circuit board sheets.

Although I have very specifically described best modes and preferred structures and use of the invention, it should be understood that many changes in the specific structures and modes described and shown in my drawings may clearly be made without departing from the true scope of the invention.

What I claim as my invention is:

1. A physical-to-electrical converter; comprising:
    a manual input member with associated sensors, said input member moveable on at least two axes; and
    a plurality of finger depressible buttons with associated sensors; and
    at least one sheet connecting to the sensors of said input member, and said at least one sheet connecting to the sensors of said finger depressible buttons;
    said at least one sheet comprising at least
        a flexible membrane sheet,
            said flexible membrane sheet having a first portion thereof residing in a first plane, said flexible membrane sheet bent and having a second portion thereof residing in a second plane;
        an electric motor with shaft and offset weight are within a handle of said converter for providing active tactile feedback; and
        at least one of the finger depressible buttons is associated with a sensor which is a pressure-sensitive variable sensor for providing a proportional signal, whereby depression of said at least one of the finger depressible buttons provides a proportional signal representing the level of depressive pressure applied.

2. An image controller comprising:
    an input member with associated sensors, said input member moveable on at least two axes; and
    a plurality of finger depressible buttons with associated sensors; and
    at least one sheet connecting to the sensors of said input member, and said at least one sheet connecting to the sensors of said finger depressible buttons;
    said at least one sheet comprising at least
        a flexible membrane sheet,
            said flexible membrane sheet having a first portion thereof residing in a first plane, said flexible membrane sheet having a second portion thereof residing in a second plane.

3. An image controller according to claim 2 in which
    at least one of said sensors reside on said first plane, and
    at least one of said sensors reside on said second plane.

4. An image controller according to claim 3 in which said image controller is connected to an image generation device.

5. An image controller according to claim 4 in which said image generation device includes a television based electronic game.

6. An image controller according to claim 3 in which at least one of the finger depressible buttons is structured with a resilient dome cap; said resilient dome cap is structured to provide a tactile feedback to a human hand.

7. An image controller according to claim 6 in which a plunger is positioned above said dome cap, said plunger comprising a non-conductive rigid plastic material; and an electric motor with shaft and offset weight are within a handle of said controller for providing active tactile feedback.

8. An image controller according to claim 2 in which said at least one of the finger depressible buttons is associated with a pressure-sensitive variable sensor for providing a proportional signal, whereby depression of said at least one of the finger depressible buttons provides a proportional signal representing the level of depressive pressure applied.

9. An image controller according to claim 2 in which said at least one sheet comprises said flexible membrane sheet connected to
    a second sheet.

10. An image controller according to claim 9 in which said second sheet is a circuit board.

11. An image controller according to claim 9 in which said second sheet is a rigid membrane support structure.

12. An image controller according to claim 10 in which said at least one sheet comprises said flexible membrane sheet further supported by a third sheet, said third sheet is a rigid membrane support structure.

13. An image controller according to claim 12 in which said at least one of the finger depressible buttons is associated with a pressure-sensitive variable sensor for providing a proportional signal, whereby depression of said at least one of the finger depressible buttons provides a proportional signal representing the level of depressive pressure applied.

14. An image controller comprising:
    an input member with associated sensors for manual manipulation, said input member moveable on at least two axes; and
    a plurality of finger depressible buttons with associated sensors; and
    at least one flexible sheet connecting to the sensors of said input member, and said at least one flexible sheet connecting to the sensors of said finger depressible buttons;
    said at least one flexible sheet having a first portion thereof residing in a first plane, said at least one flexible sheet having a second portion thereof residing in a second plane; and
    active tactile feedback means for providing vibration to be felt by a hand operating said controller.

15. An image controller according to claim 14 in which at least one of the finger depressible buttons is structured with a resilient dome cap.

16. An image controller according to claim 15 in which said image controller is connected to an image generation device.

17. An image controller according to claim 16 in which said image generation device includes a television based electronic game.

18. An image controller according to claim 17 wherein said active tactile feedback means comprises an electric motor with shaft and offset weight positioned within a handle portion of said controller.

19. An image controller according to claim 18 in which a plunger is positioned above said dome cap, said plunger comprising a non-conductive rigid plastic material.

20. An image controller according to claim 14 in which said at least one of the finger depressible buttons is associated with a pressure-sensitive variable sensor for providing a proportional signal, whereby depression of said at least one of the finger depressible buttons provides a proportional signal representing the level of depressive pressure applied; and said active tactile feedback means comprises an electric motor with shaft and offset weight within a handle portion of said controller.

21. An image controller according to claim 14 in which said at least one flexible sheet is connected to a second sheet.

22. An image controller according to claim 21 in which said second sheet is a circuit board.

23. An image controller according to claim 21 in which said second sheet is a rigid support structure for said flexible membrane sheet.

24. An image controller according to claim 23 in which said at least one of the finger depressible buttons is associated with a pressure-sensitive variable sensor for providing a proportional signal, whereby depression of said at least one of the finger depressible buttons provides a proportional signal representing the level of depressive pressure applied; and said active tactile feedback means comprises an electric motor with shaft and offset weight within a handle portion of said controller.

* * * * *